United States Patent
Du et al.

(10) Patent No.: US 11,675,322 B2
(45) Date of Patent: Jun. 13, 2023

(54) PREDICTIVE BUILDING CONTROL SYSTEM WITH DISCOMFORT THRESHOLD ADJUSTMENT

(71) Applicant: Johnson Controls Technology Company, Auburn Hills, MI (US)

(72) Inventors: Fang Du, Milwaukee, WI (US); Michael J. Wenzel, Oak Creek, WI (US); Mohammad N. Elbsat, Milwaukee, WI (US)

(73) Assignee: JOHNSON CONTROLS TECHNOLOGY COMPANY, Auburn Hills, MI (US)

( * ) Notice: Subject to any disclaimer, the term of this patent is extended or adjusted under 35 U.S.C. 154(b) by 0 days.

(21) Appl. No.: 17/338,351

(22) Filed: Jun. 3, 2021

(65) Prior Publication Data

US 2021/0285671 A1     Sep. 16, 2021

Related U.S. Application Data

(63) Continuation-in-part of application No. 16/943,955, filed on Jul. 30, 2020, now Pat. No. 11,371,739, (Continued)

(51) Int. Cl.
    *G05B 13/02*     (2006.01)
    *G05B 13/04*     (2006.01)
    (Continued)

(52) U.S. Cl.
    CPC ............ *G05B 13/048* (2013.01); *F24F 11/63* (2018.01); *F24F 11/64* (2018.01); *G05B 13/027* (2013.01); *F24F 2120/00* (2018.01)

(58) Field of Classification Search
    CPC .. F24F 11/30; F24F 11/63; F24F 11/64; F24F 2120/00; F24F 2120/20; F24F 11/46;
    (Continued)

(56) References Cited

U.S. PATENT DOCUMENTS

| 6,145,751 A | 11/2000 | Ahmed |
| 7,580,775 B2 | 8/2009 | Kulyk et al. |

(Continued)

FOREIGN PATENT DOCUMENTS

| CA | 2957726 A1 | 3/2016 |
| CA | 3043996 A1 | 2/2018 |

(Continued)

OTHER PUBLICATIONS

Astrom. "Optimal Control of Markov Decision Processes with Incomplete State Estimation," J. Math. Anal. Appl., 1965, 10, pp. 174-205.

(Continued)

*Primary Examiner* — Chun Cao
(74) *Attorney, Agent, or Firm* — Foley & Lardner LLP

(57) ABSTRACT

A method for controlling HVAC equipment for a building includes generating, based on historical building data, a discomfort tolerance defining an acceptable amount of occupant discomfort, determining a first value of an environmental condition at which the occupant discomfort is predicted to exceed the discomfort tolerance in a first direction, determining a second value of the environmental condition at which the occupant discomfort is predicted to exceed the discomfort tolerance in a second direction opposite the first direction, and controlling the HVAC equipment to maintain the environmental condition between the first value and the second value.

22 Claims, 26 Drawing Sheets

Related U.S. Application Data which is a continuation-in-part of application No. 15/953,319, filed on Apr. 13, 2018, now Pat. No. 10,845,083.

(60) Provisional application No. 62/883,508, filed on Aug. 6, 2019, provisional application No. 62/489,975, filed on Apr. 25, 2017.

(51) Int. Cl.
  *F24F 11/63* (2018.01)
  *F24F 11/64* (2018.01)
  *F24F 120/00* (2018.01)

(58) Field of Classification Search
  CPC ......... F24F 11/58; F24F 11/65; G05B 13/027; G05B 13/048; G05B 15/02; G05B 2219/2614
  See application file for complete search history.

(56) References Cited

U.S. PATENT DOCUMENTS

| | | |
|---|---|---|
| 7,894,946 B2 | 2/2011 | Kulyk et al. |
| 8,370,283 B2 | 2/2013 | Pitcher et al. |
| 8,457,802 B1 | 6/2013 | Steven et al. |
| 8,527,108 B2 | 9/2013 | Kulyk et al. |
| 8,527,109 B2 | 9/2013 | Kulyk et al. |
| 8,903,554 B2 | 12/2014 | Stagner |
| 8,918,223 B2 | 12/2014 | Kulyk et al. |
| 9,110,647 B2 | 8/2015 | Kulyk et al. |
| 9,429,923 B2 | 8/2016 | Ward et al. |
| 9,436,179 B1 | 9/2016 | Turney et al. |
| 9,447,985 B2 | 9/2016 | Johnson |
| 9,703,339 B2 | 7/2017 | Kulyk et al. |
| 9,977,447 B2 | 5/2018 | Al-Mohssen et al. |
| 10,094,586 B2 | 10/2018 | Pavlovski et al. |
| 10,108,215 B2 | 10/2018 | Al-Mohssen et al. |
| 10,139,877 B2 | 11/2018 | Kulyk et al. |
| 10,175,681 B2 | 1/2019 | Wenzel et al. |
| 10,282,796 B2 | 5/2019 | Elbsat et al. |
| 10,324,483 B2 | 6/2019 | Elbsat |
| 10,359,748 B2 | 7/2019 | Elbsat et al. |
| 10,364,996 B2 | 7/2019 | Zhao et al. |
| 10,389,136 B2 | 8/2019 | Drees |
| 10,554,170 B2 | 2/2020 | Drees |
| 10,564,610 B2 | 2/2020 | Drees |
| 10,700,942 B2 | 6/2020 | Hamilton et al. |
| 10,761,547 B2 | 9/2020 | Risbeck et al. |
| 10,845,083 B2 | 11/2020 | Turney |
| 10,871,756 B2 | 12/2020 | Johnson et al. |
| 10,876,755 B2 | 12/2020 | Martin |
| 10,908,578 B2 | 2/2021 | Johnson et al. |
| 10,921,768 B2 | 2/2021 | Johnson et al. |
| 11,156,978 B2 | 10/2021 | Johnson et al. |
| 2007/0143045 A1 | 6/2007 | MacGregor |
| 2007/0227721 A1* | 10/2007 | Springer ............ G05D 23/1931 165/291 |
| 2009/0112369 A1* | 4/2009 | Gwerder ............ G05D 23/1923 700/277 |
| 2009/0210081 A1 | 8/2009 | Sustaeta et al. |
| 2010/0179704 A1 | 7/2010 | Ozog |
| 2010/0262298 A1 | 10/2010 | Johnson et al. |
| 2011/0071952 A1 | 3/2011 | Gaffney et al. |
| 2011/0087381 A1 | 4/2011 | Hirato et al. |
| 2011/0208365 A1 | 8/2011 | Miller |
| 2012/0215362 A1 | 8/2012 | Stagner |
| 2012/0232701 A1 | 9/2012 | Carty et al. |
| 2012/0259469 A1 | 10/2012 | Ward et al. |
| 2013/0085614 A1 | 4/2013 | Wenzel et al. |
| 2013/0339080 A1 | 12/2013 | Beaulieu et al. |
| 2013/0345889 A1 | 12/2013 | Osogami et al. |
| 2014/0142904 A1 | 5/2014 | Drees et al. |
| 2014/0277756 A1* | 9/2014 | Bruce ................ G05D 23/1902 700/276 |
| 2014/0358291 A1* | 12/2014 | Wells ................. G05B 15/02 700/276 |
| 2015/0027681 A1* | 1/2015 | Ragland ................. F24F 11/30 165/250 |
| 2015/0057820 A1 | 2/2015 | Kefayati et al. |
| 2015/0081107 A1* | 3/2015 | Graham ................. F24F 11/30 700/276 |
| 2015/0316901 A1 | 11/2015 | Wenzel et al. |
| 2015/0316902 A1 | 11/2015 | Wenzel et al. |
| 2015/0316903 A1 | 11/2015 | Asmus et al. |
| 2015/0316907 A1 | 11/2015 | Elbsat et al. |
| 2015/0316946 A1 | 11/2015 | Wenzel et al. |
| 2016/0218505 A1 | 7/2016 | Krupadanam et al. |
| 2016/0281607 A1 | 9/2016 | Asati et al. |
| 2016/0305678 A1 | 10/2016 | Pavlovski et al. |
| 2016/0313751 A1 | 10/2016 | Risbeck et al. |
| 2016/0356515 A1 | 12/2016 | Carter |
| 2016/0377306 A1 | 12/2016 | Drees et al. |
| 2017/0102162 A1 | 4/2017 | Drees et al. |
| 2017/0102433 A1 | 4/2017 | Wenzel et al. |
| 2017/0102434 A1 | 4/2017 | Wenzel et al. |
| 2017/0102675 A1 | 4/2017 | Drees |
| 2017/0103483 A1 | 4/2017 | Drees et al. |
| 2017/0104332 A1 | 4/2017 | Wenzel et al. |
| 2017/0104336 A1 | 4/2017 | Elbsat et al. |
| 2017/0104337 A1 | 4/2017 | Drees |
| 2017/0104342 A1 | 4/2017 | Elbsat et al. |
| 2017/0104343 A1 | 4/2017 | Elbsat et al. |
| 2017/0104344 A1 | 4/2017 | Wenzel et al. |
| 2017/0104345 A1 | 4/2017 | Wenzel et al. |
| 2017/0104346 A1 | 4/2017 | Wenzel et al. |
| 2017/0104449 A1 | 4/2017 | Drees |
| 2017/0268795 A1 | 9/2017 | Yamamoto et al. |
| 2017/0366414 A1 | 12/2017 | Hamilton et al. |
| 2018/0004171 A1 | 1/2018 | Patel et al. |
| 2018/0004172 A1 | 1/2018 | Patel et al. |
| 2018/0034272 A1 | 2/2018 | Schmidt et al. |
| 2018/0113482 A1 | 4/2018 | Vitullo |
| 2018/0180314 A1 | 6/2018 | Brisette et al. |
| 2018/0196456 A1 | 7/2018 | Elbsat |
| 2018/0197253 A1 | 7/2018 | Elbsat et al. |
| 2018/0203961 A1 | 7/2018 | Aisu et al. |
| 2018/0224814 A1 | 8/2018 | Elbsat et al. |
| 2018/0341255 A1 | 11/2018 | Turney et al. |
| 2019/0020220 A1 | 1/2019 | Lian et al. |
| 2019/0066236 A1 | 2/2019 | Wenzel |
| 2019/0129403 A1 | 5/2019 | Turney et al. |
| 2019/0271978 A1 | 9/2019 | Elbsat et al. |
| 2019/0295034 A1 | 9/2019 | Wenzel et al. |
| 2019/0311332 A1 | 10/2019 | Turney et al. |
| 2019/0325368 A1 | 10/2019 | Turney et al. |
| 2019/0338973 A1 | 11/2019 | Turney et al. |
| 2019/0338974 A1 | 11/2019 | Turney et al. |
| 2019/0338977 A1 | 11/2019 | Turney et al. |
| 2019/0347622 A1 | 11/2019 | Elbsat et al. |
| 2019/0354071 A1 | 11/2019 | Turney et al. |
| 2020/0088427 A1* | 3/2020 | Li ........................ G05B 13/042 |
| 2020/0090289 A1 | 3/2020 | Elbsat et al. |
| 2020/0096985 A1 | 3/2020 | Wenzel et al. |
| 2020/0166230 A1 | 5/2020 | Ng et al. |
| 2020/0191427 A1 | 6/2020 | Martin |
| 2020/0200423 A1 | 6/2020 | Gervais |
| 2020/0284458 A1 | 9/2020 | Yoshida et al. |

FOREIGN PATENT DOCUMENTS

| | | |
|---|---|---|
| CN | 1855141 A | 11/2006 |
| CN | 103917928 A | 7/2014 |
| CN | 104833063 A | 8/2015 |
| CN | 104850013 A | 8/2015 |
| CN | 105320118 A | 2/2016 |
| CN | 105929687 A | 9/2016 |
| CN | 106066077 A | 11/2016 |
| CN | 106817909 A | 6/2017 |
| CN | 109980638 A | 7/2019 |
| CN | 11895625 A | 11/2020 |
| EP | 3 186 687 A4 | 7/2017 |
| EP | 3 447 258 A1 | 2/2019 |
| EP | 3 497 377 A1 | 6/2019 |

(56) References Cited

FOREIGN PATENT DOCUMENTS

| JP | H05-126380 A | 5/1993 |
|---|---|---|
| JP | 2010-078447 A | 4/2010 |
| JP | 2015-095215 A | 5/2015 |
| WO | WO-2011/072332 A1 | 6/2011 |
| WO | WO-2013/063581 A1 | 5/2013 |
| WO | WO-2017/062896 A1 | 4/2017 |

OTHER PUBLICATIONS

Aynur, "Variable refrigerant flow systems: A review." Energy and Buildings, 2010, 42.7, pp. 1106-1112.

Bittanti et al., Adaptive Control of Linear Time Invariant Systems: The "Bet on the Best" Principle, Communications in Information and Systems, 2006, 6.4, pp. 299-320.

Chan et al., "Estimation of Degradation-Based Reliability in Outdoor Environments," Statistics Preprints, Jun. 19, 2001, 25, 33 pages.

Chen et al., "Control-oriented System Identification: an H1 Approach," Wiley-Interscience, 2000, 19, Chapters 3 & 8, 38 pages.

Chu et al., "Predictive maintenance: The one-unit replacement model," International Journal of Production Economics, 1998, 54.3, pp. 285-295.

Chua et al., "Achieving better energy-efficient air conditioning—a review of technologies and strategies," Applied Energy, 2013, 104, pp. 87-104.

Crowder et al., "The Use of Degradation Measures to Design Reliability Test Plans." World Academy of Science, Engineering and Technology, International Journal of Mathematical, Computational, Physical, Electrical and Computer Engineering, 2014, 8, 18 pages.

E Costa et al., "A multi-criteria model for auditing a Predictive Maintenance Programme," European Journal of Operational Research, Sep. 29, 2011, 217.2, pp. 381-393.

Emmerich et al., "State-of-the-Art Review of CO2 Demand Controlled Ventilation Technology and Application," NISTIR, Mar. 2001, 47 pages.

Feng et al., "Model Predictive Control of Radiant Slab Systems with Evaporative Cooling Sources," Energy and Buildings, 2015, 87, pp. 199-210.

Freire et al., "Predictive controllers for thermal comfort optimization and energy savings," Energy and Buildings, 2008, vol. 40, No. 7, pp. 1353-1365.

Fu et al., "Predictive Maintenance in Intelligent-Control-Maintenance-Management System for Hydroelectric Generating Unit," IEEE Transactions on Energy Conversion, Mar. 2004, 19.1, pp. 179-186.

George et al., "Time Series Analysis: Forecasting and Control," Fifth Edition, John Wiley & Sons, 2016, Chapters 4-7 and 13-15, 183 pages.

Grall et al., "Continuous-Time Predictive-Maintenance Scheduling for a Deteriorating System," IEEE Transactions on Reliability, Jun. 2002, 51.2, pp. 141-150.

Hardt et al., "Gradient Descent Learns Linear Dynamical Systems," Journal of Machine Learning Research, 2018, 19, pp. 1-44.

Helmicki et al. "Control Oriented System Identification: a Worst-case/deterministic Approach in H1," IEEE Transactions on Automatic Control, 1991, 36.10, pp. 1163-1176.

Hong et al. "Development and Validation of a New Variable Refrigerant Flow System Model in Energyplus," Energy and Buildings, 2016, 117, pp. 399-411.

Hong et al., "Statistical Methods for Degradation Data With Dynamic Covariates Information and an Application To Outdoor Weathering Data," Technometrics, Nov. 2014, 57.2, pp. 180-193.

International Search Report and Written Opinion on International Patent Application No. PCT/US2018/021185 dated Jun. 20, 2018. 14 pages.

International Search Report and Written Opinion on International Patent Application No. PCT/US2018/027657 dated Jul. 6, 2018. 13 pages.

International Search Report and Written Opinion on PCT/US2020/045237, dated Nov. 10, 2020, 18 pages.

International Search Report and Written Opinion on PCT/US2020/045238, dated Oct. 26, 2020, 14 pages.

Kelman et al., "Bilinear Model Predictive Control of a HVAC System Using Sequential Quadratic Programming," Proceedings of the IFAC World Congress, Sep. 2, 2011, 6 pages.

Kharoufeh et al., "Semi-Markov Models for Degradation-Based Reliability," IIE Transactions, May 2010, 42.8, pp. 599-612.

Kingma et al,. "Adam: A Method for Stochastic Optimization," International Conference on Learning Representations (ICLR), 2015, 15 pages.

Li et al., "Reliability Modeling and Life Estimation Using an Expectation Maximization Based Wiener Degradation Model for Momentum Wheels" IEEE Transactions on Cybernetics, May 2015, 45.5, pp. 969-977.

Ljung et al., "Theory and Practice of Recursive Identification," vol. 5. JSTOR, 1983, Chapters 2, 3 & 7, 80 pages.

Ljung, editor. "System Identification: Theory for the User," 2nd Edition, Prentice Hall, Upper Saddle River, New Jersey, 1999, Chapters 5 and 7, 40 pages.

Ma et al., "Model Predictive Control for the Operation of Building Cooling Systems", IEEE Transactions on Control Systems Technology, May 2012, 20:3, pp. 796-803.

Nevena et al., "Data center cooling using model-predictive control," 32nd Conference on Neural Information Processing Systems, 2018, 10 pages.

Nwankpa et al., "Activation Functions: Comparison of Trends in Practice and Research for Deep Learning," Engineering, University of Strathclyde, Glasgow, UK, 2018, 20 pages.

Office Action on JP 2019-556840, dated Jan. 5, 2021, 5 pages.

Pan et al., "Reliability modeling of degradation of products with multiple performance characteristics based on gamma processes," Reliability Engineering & System Safety, 2011, 96.8, pp. 949-957.

Peng et al., "Bayesian Degradation Analysis with Inverse Gaussian Process Models Under Time-Varying Degradation Rates," IEEE Transactions on Reliability, Mar. 2017, 66.1, pp. 84-96.

Peng et al., "Bivariate Analysis of Incomplete Degradation Observations Based On Inverse Gaussian Processes And Copulas," IEEE Transactions on Reliability, Jun. 2016, 65.2, pp. 624-639.

Peng et al., "Switching State-Space Degradation Model with Recursive Filter/Smoother for Prognostics Of Remaining Useful Life," IEEE Transactions on Industrial Informatics, Feb. 2019, 15.2, pp. 822-832.

Perez-Lombard et al., "A review on buildings energy consumption information," Energy and Buildings, 2008, 40.3, pp. 394-398.

Schiavon et al., "Dynamic predictive clothing insulation models based on outdoor air and indoor operative temperatures," 2013, Building and Environment, 59, pp. 250-260.

Shanker et al., "Effect of Data Standardization on Neural Network Training," Omega, Int. J. Mgmt. Sci., 1996, vol. 24, No. 4, pp. 385-397.

Srivastava et al., "Dropout: a simple way to prevent neural networks from overfitting," Journal of Machine Learning Research, 2014, vol. 15, No. 1, pp. 1929-1958.

Taleghani et al., "A review into thermal comfort in buildings," Renewable and Sustainable Energy Reviews, Oct. 2013, vol. 26, pp. 201--215.

Timplalexis et al., "Thermal Comfort Metabolic Rate and Clothing Inference," Centre for Research and Technology Hellas/Information Technologies Institute, Greece, Sep. 2019, pp. 690-699.

Wan et al., "Data Analysis and Reliability Estimation of Step-Down Stress Accelerated Degradation Test Based on Wiener Process," Prognostics and System Health Management Conference (PHM-2014 Hunan), Aug. 2014, 5 pages.

Wang et al., "Reliability and Degradation Modeling with Random or Uncertain Failure Threshold," Reliability and Maintainability Symposium, 2007, pp. 392-397.

Ward et al., "Beyond Comfort—Managing the Impact of HVAC Control on the Outside World," Proceedings of Conference: Air Conditioning and the Low Carbon Cooling Challenge, Cumberland Lodge, Windsor, UK, London: Network for Comfort and Energy Use in Buildings, http://nceub.org.uk, Jul. 27-29, 2008, 15 pages.

(56) References Cited

OTHER PUBLICATIONS

Xiao et al., "Optimal Design for Destructive Degradation Tests with Random Initial Degradation Values Using the Wiener Process," IEEE Transactions on Reliability, Sep. 2016, 65.3, pp. 1327-1342.
Xu et al., "Real-time Reliability Prediction for a Dynamic System Based on the Hidden Degradation Process Identification," IEEE Transactions on Reliability, Jun. 2008, 57.2, pp. 230-242.
Yang et al., "Thermal comfort and building energy consumption implications—a review," Applied Energy, 2014, 115, pp. 164-173.
Yudong et al., "Predictive Control for Energy Efficient Buildings with Thermal Storage: Modeling, Stimulation, and Experiments." IEEE Control Systems, Feb. 2012, 32.1, pp. 44-64.
Zhang et al., "A Novel Variable Refrigerant Flow (VRF) Heat Recovery System Model: Development and Validation," Energy and Buildings, Jun. 2018, 168, pp. 399-412.
Zhang et al., "An Age- and State-Dependent Nonlinear Prognostic Model for Degrading Systems," IEEE Transactions on Reliability, Dec. 2015, 64.4, pp. 1214-1228.
Zhang et al., "Analysis of Destructive Degradation Tests for a Product with Random Degradation Initiation Time," IEEE Transactions on Reliability, Mar. 2015, 64.1, pp. 516-527.
Zhou et al. "Asset Life Prediction Using Multiple Degradation Indicators and Lifetime Data: a Gamma-Based State Space Model Approach," 2009 8th International Conference on Reliability, Maintainability and Safety, Aug. 2009, 5 pages.
Zhou et al., "Reliability-centered predictive maintenance scheduling for a continuously monitored system subject to degradation," Reliability Engineering & System Safety, 2007, 92.4, pp. 530-534.
CN Office Action with Search Report on CN Appl. Ser. No. 201880040535.8 dated Apr. 26, 2022 (10 pages).
International Preliminary Report on Patentability on PCT Appl. Ser. No. PCT/US2020/045238 dated Feb. 17, 2022 (8 pages).
International Preliminary Report on patentability on PCT Appl. Ser. No. PCT/US2020/045237 dated Feb. 17, 2022 (11 pages).
Office Action on EP Appl. Ser. No. 18713481.2 dated Oct. 5, 2021 (9 pages).
Office Action on JP Appl. Ser. No. 2019-556840 dated Sep. 7, 2021 (12 pages).
Moon, Jin Woo, "Performance of ANN-based predictive and adaptive thermal-control methods for disturbances in and around residential buildings," Building and Environment, 2012, vol. 48, pp. 15-26.
EP Office Action on EP Appl. Ser. No. 18 722 818.4 dated Jun. 29, 2022 (6 pages).
JP Office Action on JP Appl. Ser. No. 2020-109855 dated Jul. 12, 2022, with English translation (7 pages).
Raza et al., "An Improved Neural Ensemble Framework for Accurate PV Output Power Forecast," Australasian Universities Power Engineering Conference—AUPEC2016, Sep. 25, 2016 (6 pages).
Wikipedia Entry: "Correlation," https://en.wikipedia.org/w/index.php?title=Correlation&oldid=1114178034; printed on Oct. 10, 2022 (12 pages).
Coolinglogic, "CoolingLogic: Up early, saving billions." URL: http://coolinglogic.com/documents/MarketingFlyer_FINAL_HiRes8.5x11.pdf, retrieved from internet Oct. 27, 2022 (1 page).
Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).
Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).
Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).
Johnson Heating and Cooling L.L.C., "Excel Rehabilitation Building Automation," URL: http://cooljohnson.com/Building-Automation-Systems-Michigan/Waterford-Michigan/Building-Automation-System-Excel.html, retrieved from internet Oct. 27, 2022 (2 pages).
Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).
Johnson Heating and Cooling L.L.C., "JLA Medical Building Building Automation," URL: http://cooljohnson.com/Building-Automation-Systems-Michigan/Waterford-Michigan/Building-Automation-System-JLA.html, retrieved from internet Oct. 27, 2022 (3 pages).
Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).
Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).
Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).
Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).
Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).
Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).
Johnson Heating and Cooling, Llc, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).
Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).
Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).
Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).
Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).
Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).
Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).

(56) References Cited

OTHER PUBLICATIONS

Johnson Solid State LLC, "Cooling Logic Overview," URL: http://coolinglogic.com/documents/CoolingLogic_Overview_High_Quality.mp4, retrieved from internet Oct. 27, 2022 (16 pages).

Johnson Solid State LLC, "So what is CoolingLogic™?" URL: http://coolinglogic.com/Coolinglogic-How-it-Works.html, retrieved from the internet Oct. 27, 2022 (3 pages).

Johnson, David, "A Method to Increase HVAC System Efficiency And Decrease Energy Consumption," White Paper: Johnson Solid State, LLC, URL: http://coolinglogic.com/documents/16102106_White_Paper_High_Resolution_Protected.pdf, Sep. 24, 2016 (51 pages).

Johnson, David, "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).

Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).

Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).

Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).

CN Office Action on CN Appl. Ser. No. 202080065078.5 dated Jan. 30, 2023 (13 pages).

\* cited by examiner

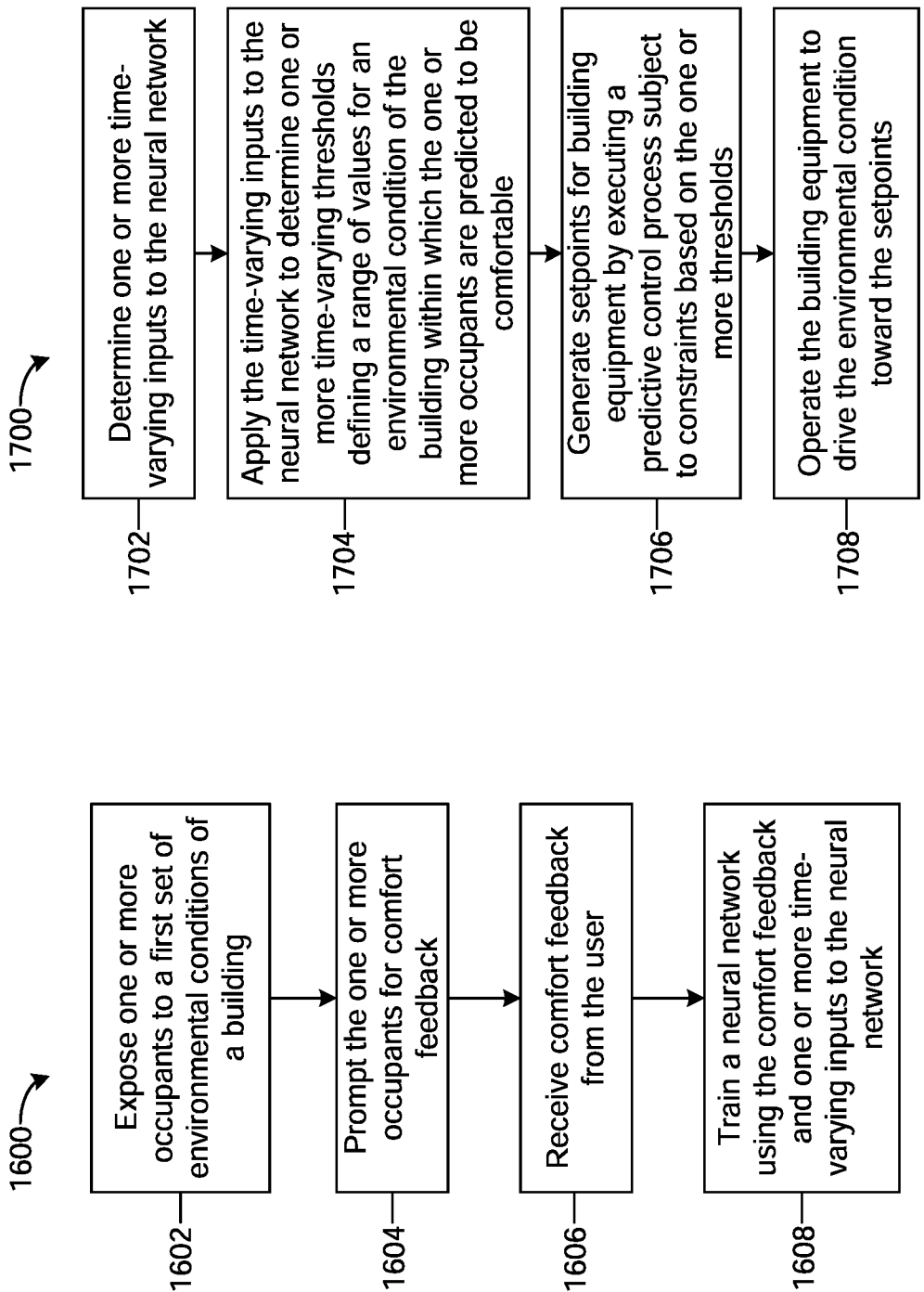

PREDICTIVE BUILDING CONTROL SYSTEM WITH DISCOMFORT THRESHOLD ADJUSTMENT

CROSS-REFERENCE TO RELATED PATENT APPLICATIONS

This application is a continuation-in-part of U.S. patent application Ser. No. 16/943,955, filed Jul. 30, 2020, which is a continuation-in-part of U.S. patent application Ser. No. 15/953,319, filed Apr. 13, 2018, which claims the benefit of and priority to U.S. Provisional Patent Application No. 62/489,975 filed Apr. 25, 2017. U.S. patent application Ser. No. 16/943,955 also claims the benefit of and priority to U.S. Provisional Application No. 62/883,508 filed Aug. 6, 2019. The entire disclosures of these applications are incorporated by reference herein.

BACKGROUND

The present disclosure relates generally to a predictive building control system that uses a predictive model to optimize the cost or amount of energy consumed by HVAC equipment. The present disclosure relates more particularly to a building control system that uses a neural network model to automatically generate constraints on the optimization of the predictive model. A challenge exists to strike a balance between reducing energy consumption and providing acceptable conditions for occupants of the building.

SUMMARY

One implementation of the present disclosure is a method for controlling HVAC equipment for a building. The method includes generating, based on historical building data, a discomfort tolerance defining an acceptable amount of occupant discomfort, determining a first value of an environmental condition at which the occupant discomfort is predicted to exceed the discomfort tolerance in a first direction, determining a second value of the environmental condition at which the occupant discomfort is predicted to exceed the discomfort tolerance in a second direction opposite the first direction, and controlling the HVAC equipment to maintain the environmental condition between the first value and the second value.

In some embodiments, the method also includes widening or narrowing the discomfort tolerance based on a number of user overrides of a setpoint for the environmental condition during the controlling the HVAC equipment. In some embodiments, the environmental condition is indoor air temperature. The determining steps may be performed using a neural network trained to predict the occupant discomfort for a plurality of indoor air temperatures comprising the first indoor air temperature and the second indoor air temperature. In some embodiments, the occupant discomfort is quantified as an expected size of a setpoint change by an occupant.

In some embodiments, generating the discomfort tolerance may include determining that a preset percentage of setpoint changes occur outside of the discomfort threshold. Generating the discomfort tolerance may include using a neural network model trained using the historical building data to determine an maximum acceptable predicted setpoint increase and a maximum acceptable predicted setpoint decrease defining the discomfort tolerance.

In some embodiments, the method includes collecting new building data while controlling the HVAC equipment and updating the discomfort tolerance based on a combination of the new building data and the historical building data. The method may include aggregating the combination of the new building data and the historical building data using a binning process. In some embodiments, the binning process includes defining a plurality of bins configured to retain a fixed number of data sets, wherein the historical building data is sorted into the plurality of bins, sorting the new building data into the plurality of bins, and discarding a subset of the historical building data from a bin of the plurality of bins in response to exceeding the fixed number of data sets for the bin. The binning process can include sorting data sets into a plurality of bins based on measurements of the environmental condition (e.g., measured indoor air temperatures) indicated in the data sets.

Another implementation of the present disclosure is a building system. The building system includes HVAC equipment operable to affect one or more environmental conditions and circuitry. The circuitry is configured to generate, based on historical building data, a discomfort tolerance defining an acceptable amount of occupant discomfort and satisfying or optimizing a predefined criterion, =determine a region of values of the one or more environmental conditions for which the occupant discomfort is predicted to be within the discomfort tolerance, and control the HVAC equipment to maintain the one or more environmental conditions within the region.

In some embodiments, the circuitry is further configured to widen or narrow the discomfort tolerance based on a number of user overrides of one or more setpoint for the one or more environmental conditions during the control of the HVAC equipment. In some embodiments, the circuitry is configured to determine the region using a neural network trained to quantify the occupant discomfort across a test region comprising the region.

In some embodiments, the occupant discomfort is quantified as an expected size of a setpoint change by an occupant. In some embodiments, the circuitry is configured to generate the discomfort tolerance by determining that a preset percentage of user overrides occur outside of the discomfort threshold. The circuitry may be configured to generate the discomfort tolerance using a neural network model trained using the historical building data to determine an maximum acceptable setpoint increase (e.g., maximum acceptable predicted setpoint increase) and a maximum acceptable setpoint decrease (e.g., maximum acceptable predicted setpoint decrease) defining the discomfort tolerance.

In some embodiments, the circuitry is further configured to collect new building data during the control of the HVAC equipment and update the discomfort tolerance based on a combination of the new building data and the historical building data. The circuitry may be further configured to aggregate the combination of the new building data and the historical building data using a binning process. The binning process can include sorting data sets into a plurality of bins based on measurements of the one or more environmental conditions (e.g., measured indoor air temperatures) indicated in the data sets.

Another implementation of the present disclosure is one or more non-transitory computer-readable media storing program instructions that, when executed by one or more processors, cause the one or more processors to perform operations. The operations include generating, based on historical building data, a discomfort tolerance defining an acceptable amount of occupant discomfort, determining a first value of an environmental condition at which the occupant discomfort is predicted to exceed the discomfort tolerance in a first direction, determining a second value of the environmental condition at which the occupant discomfort is predicted to exceed the discomfort tolerance in a second direction, and controlling HVAC equipment to maintain the environmental condition between the first value and the second value.

In some embodiments, the environmental condition is indoor air temperature, the first value of the environmental condition is a first indoor air temperature, and the second value of the environmental condition is a second indoor air temperature, and the determining operations are performed using a neural network trained to predict the occupant discomfort across a plurality of indoor air temperatures comprising the first value of the indoor air temperature and the second value of the indoor air temperature. In some embodiments, generating the discomfort tolerance comprises determining that a preset percentage of predicted setpoint changes occur outside of the discomfort threshold.

BRIEF DESCRIPTION OF THE DRAWINGS

FIG. 16 is a flowchart of a process for training a neural network, according to some embodiments.

FIG. 17 is a flowchart of a process for controlling building equipment to achieve predicted comfort for occupants, according to some embodiments.

DETAILED DESCRIPTION

Building and HVAC System

Figure 1:
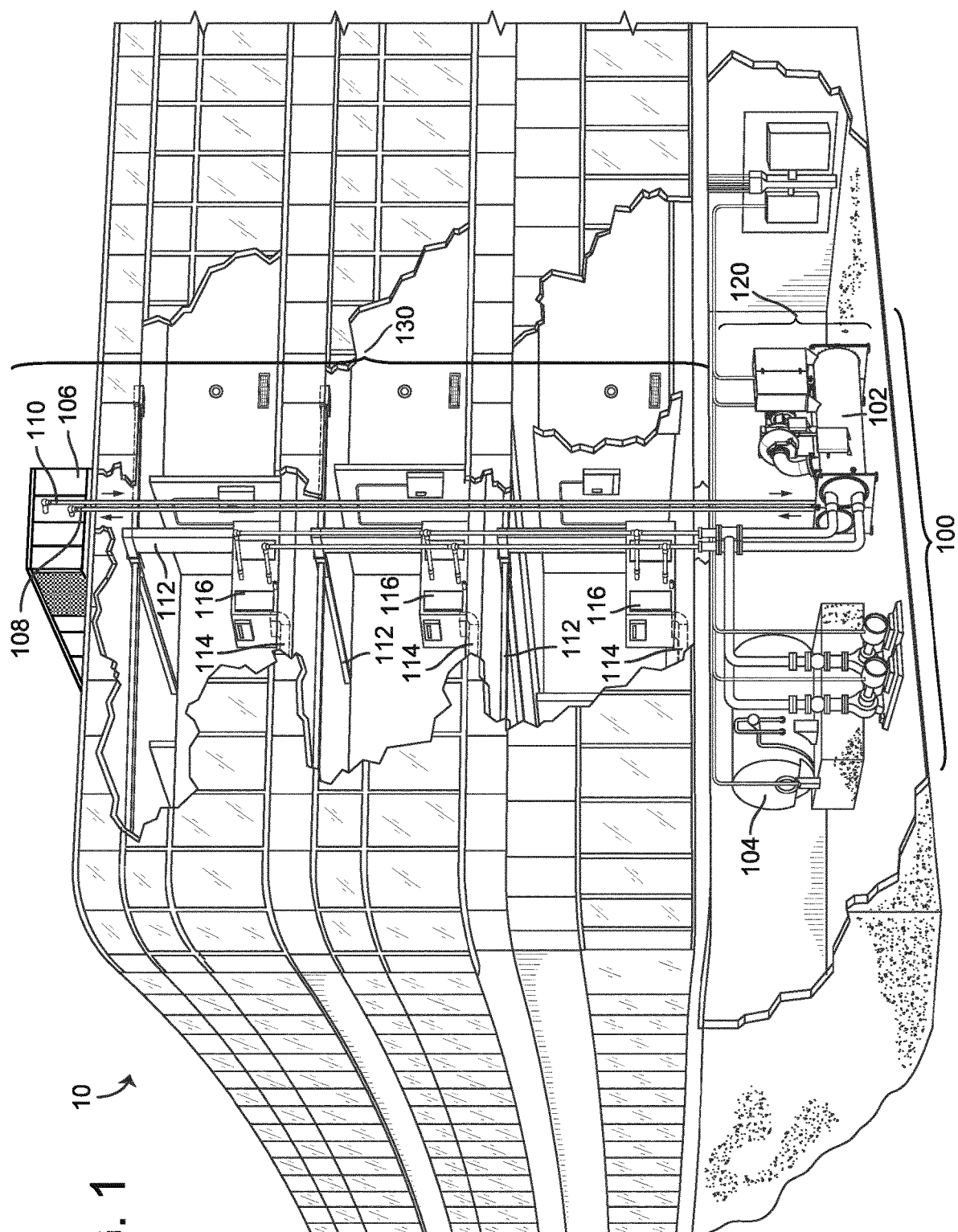
FIG. 1 is a drawing of a building equipped with a HVAC system, according to some embodiments.
Figure 2:
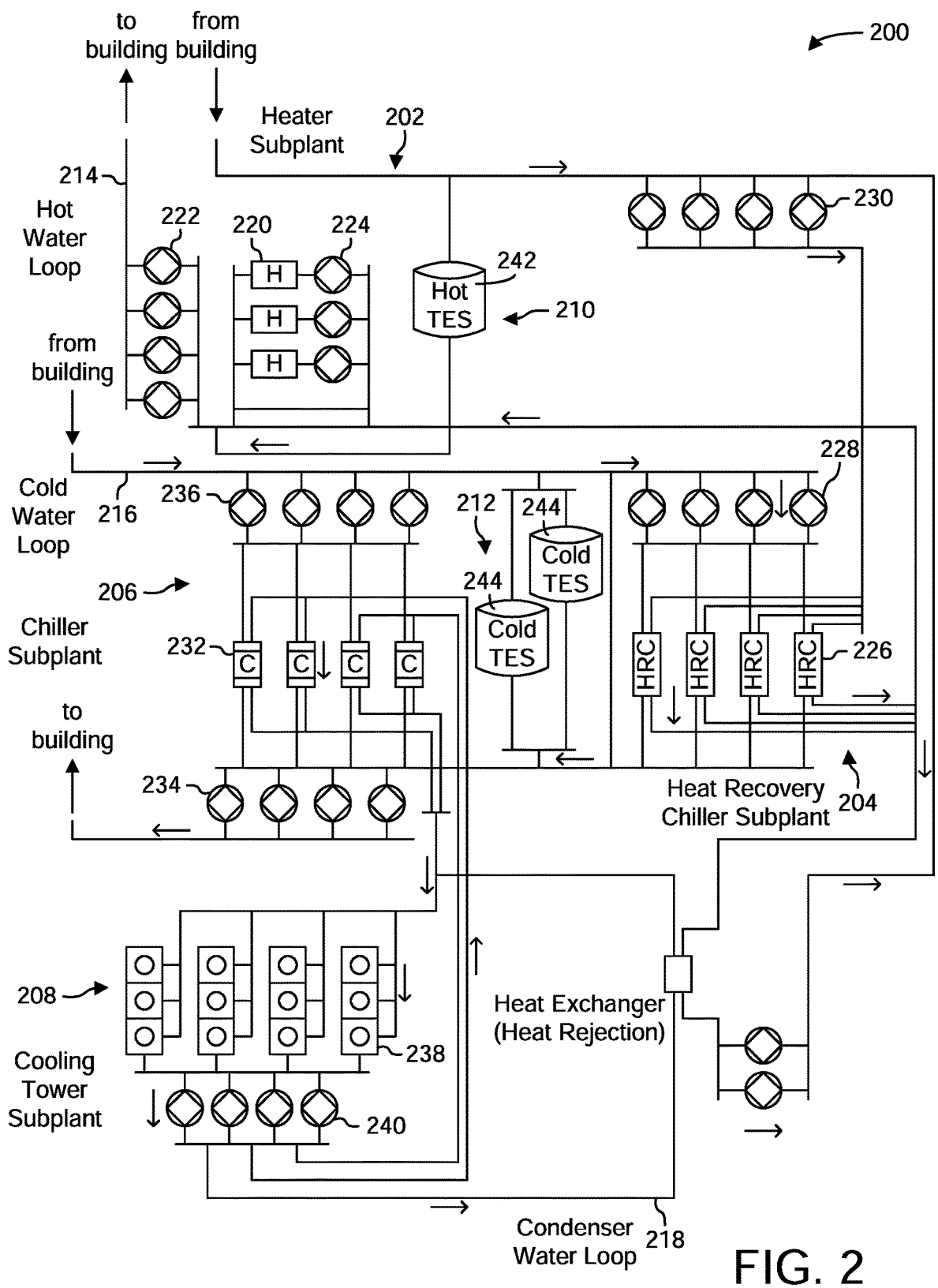
FIG. 2 is a schematic of a waterside system (e.g., a central plant) which can be used to provide heating or cooling to the building of FIG. 1, according to some embodiments.
Figure 3:
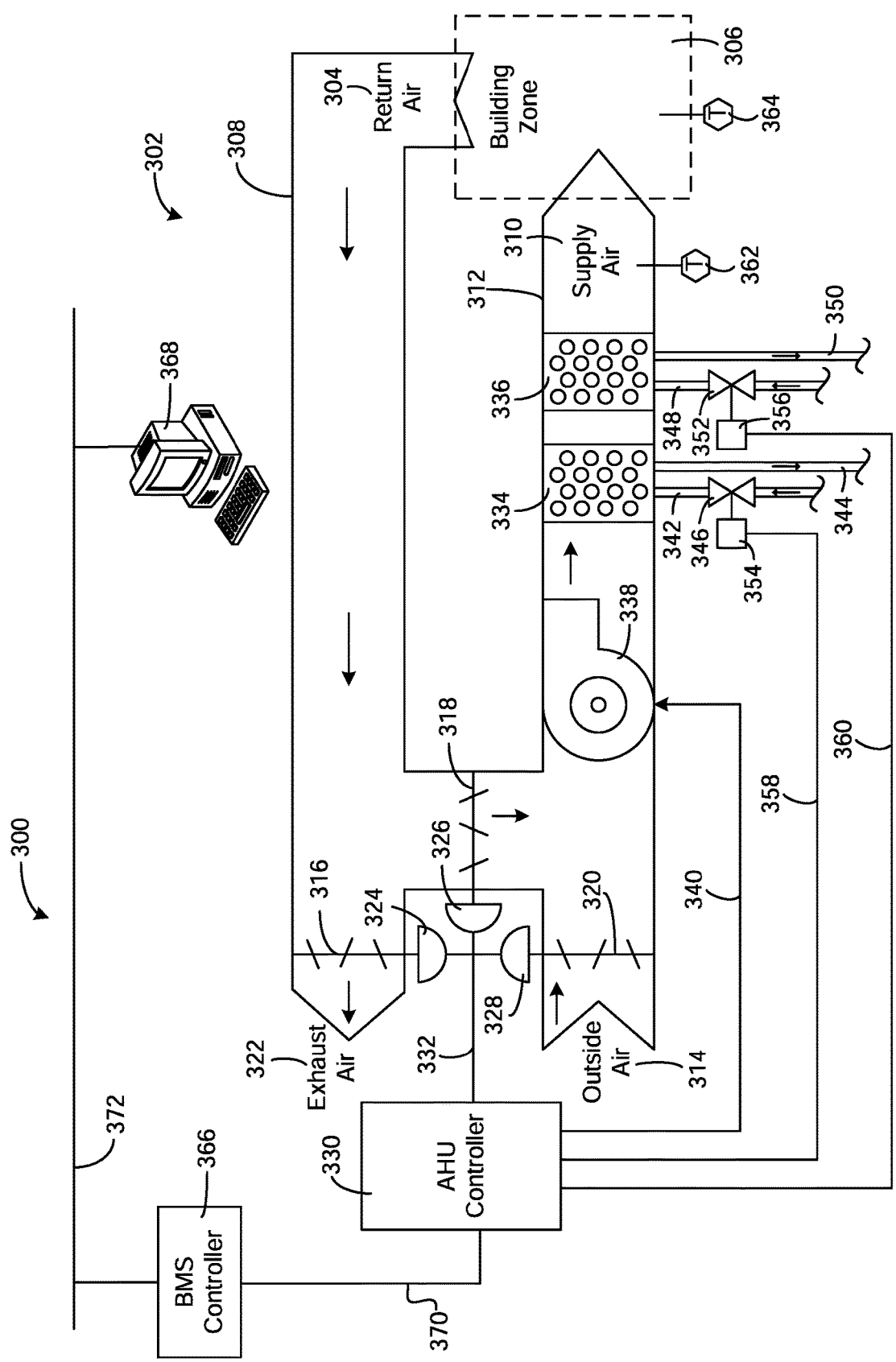
FIG. 3 is a block diagram of an airside system which can be used to provide heating or cooling to the building of FIG. 1, according to some embodiments.

Referring now to FIGS. 1-3, a building and HVAC system in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220.

Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Energy System with Predictive Control

Figure 4:
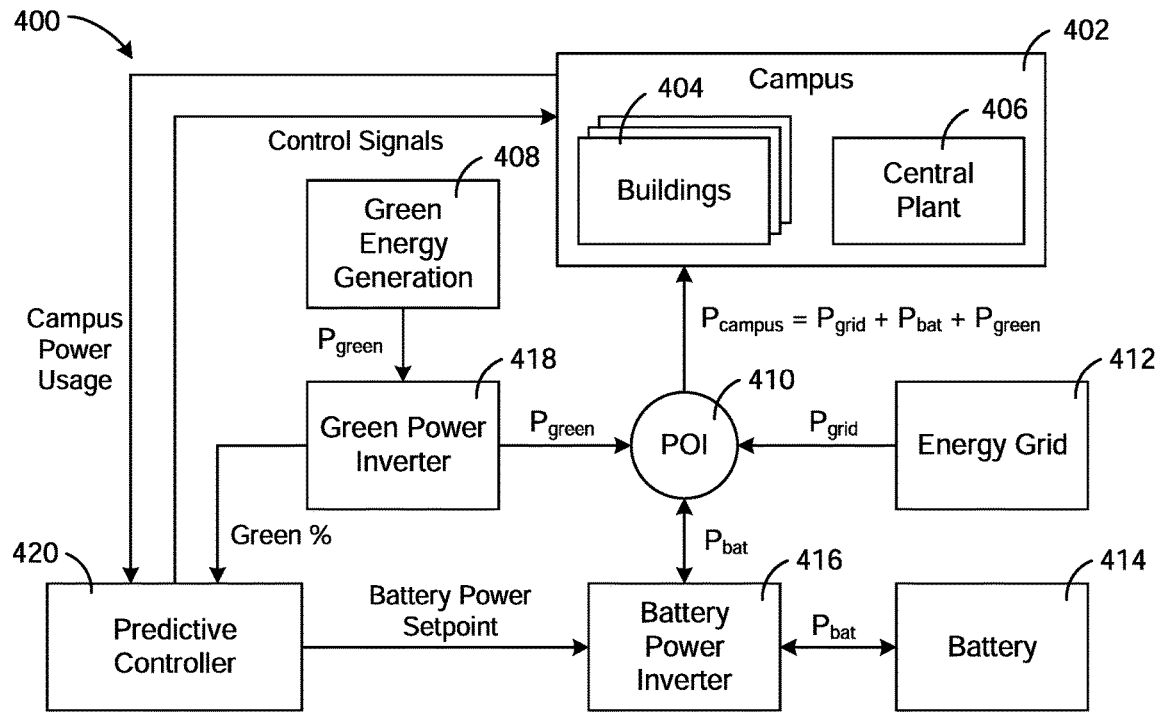
FIG. 4 is a block diagram of a building energy system with a predictive controller, according to some embodiments.
Figure 5:
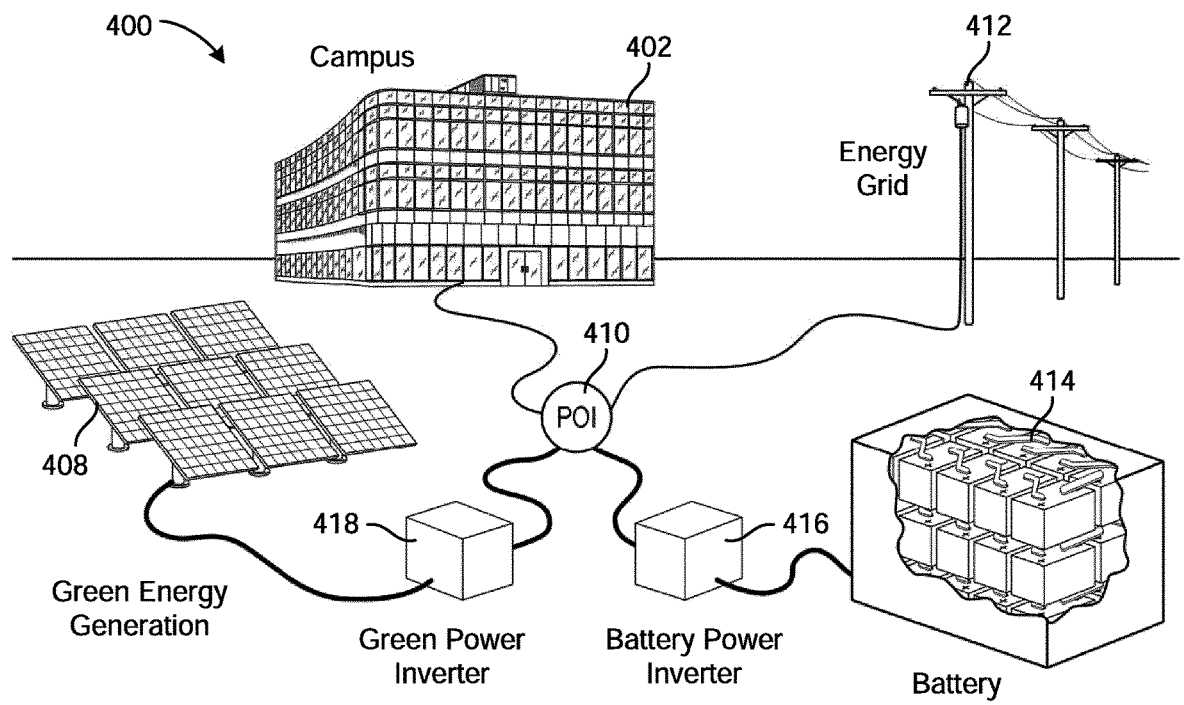
FIG. 5 is a drawing illustrating several components of the building energy system of FIG. 4, according to some embodiments.

Referring now to FIGS. 4-5, a building energy system 400 with predictive control is shown, according to some embodiments. Several of the components shown in system 400 may be part of HVAC system 100, waterside system 200, and/or airside system 300, as described with reference to FIGS. 1-3. For example, system 400 is shown to include a campus 402 including one or more buildings 404 and a central plant 406. Buildings 404 may include any of a variety of building equipment (e.g., HVAC equipment) configured to serve buildings 404. For example, buildings 404 may include one or more air handling units, rooftop units, chillers, boilers, variable refrigerant flow (VRF) systems, or other HVAC equipment operable to provide heating or cooling to buildings 404. Central plant 406 may include some or all of the components of waterside system 200 (e.g., a heater subplant 202, a heat recovery chiller subplant 204, a chiller subplant 206, a cooling tower subplant 208, a hot thermal energy storage (TES) subplant 210, and a cold thermal energy storage (TES) subplant 212, etc.). The equipment of central plant 406 (e.g., waterside equipment) can be used in combination with the equipment of buildings 404 (e.g., airside equipment) to provide heating or cooling to buildings 404.

Campus 402 can be powered by several different power sources including an energy grid 412, a battery 414, and green energy generation 408. Energy grid 412 may include an electric grid operated by an electric utility. The power provided by energy grid 412 is shown as $P_{grid}$. Green energy generation 408 can include any system or device that generates energy using a renewable energy source (i.e., green energy). For example, green energy generation 408 may include a photovoltaic field, a wind turbine array, a hydroelectric generator, a geothermal generator, or any other type of equipment or system that collects and/or generates green energy for use in system 400. The power provided by green energy generation 408 is shown as $P_{green}$. Battery 414 can be configured to store and discharge electric energy (i.e., electricity provided by energy grid 412 and/or green energy generation 408. The power provided by battery 414 is shown as $P_{bat}$, which can be positive if battery 414 is discharging or negative if battery 414 is charging.

Battery power inverter 416 may be configured to convert electric power between direct current (DC) and alternating current (AC). For example, battery 414 may be configured to store and output DC power, whereas energy grid 412 and campus 402 may be configured to consume and provide AC power. Battery power inverter 416 may be used to convert DC power from battery 414 into a sinusoidal AC output synchronized to the grid frequency of energy grid 412 and/or campus 402. Battery power inverter 416 may also be used to convert AC power from energy grid 412 into DC power that can be stored in battery 414. The power output of battery 414 is shown as $P_{bat}$. $P_{bat}$ may be positive if battery 414 is providing power to power inverter 416 (i.e., battery 414 is discharging) or negative if battery 414 is receiving power from power inverter 416 (i.e., battery 414 is charging).

Green power inverter 418 may also be configured to convert electric power between direct current (DC) and alternating current (AC). For example, green energy generation 408 may be configured to generate DC power, whereas campus 402 may be configured to consume AC power. Green power inverter 418 may be used to convert DC power from green energy generation 408 into a sinusoidal AC output synchronized to the grid frequency of energy grid 412 and/or campus 402.

In some instances, power inverters 416-418 receives a DC power output from battery 414 and/or green energy generation 408 and converts the DC power output to an AC power output that can be provided to campus 402. Power inverters 416-418 may synchronize the frequency of the AC power output with that of energy grid 412 (e.g., 50 Hz or 60 Hz) using a local oscillator and may limit the voltage of the AC power output to no higher than the grid voltage. In some embodiments, power inverters 416-418 are resonant inverters that include or use LC circuits to remove the harmonics from a simple square wave in order to achieve a sine wave matching the frequency of energy grid 412. In various embodiments, power inverters 416-418 may operate using high-frequency transformers, low-frequency transformers, or without transformers. Low-frequency transformers may convert the DC output from battery 414 or green energy generation 408 directly to the AC output provided to campus 402. High-frequency transformers may employ a multi-step process that involves converting the DC output to high-frequency AC, then back to DC, and then finally to the AC output provided to campus 402.

Point of interconnection (POI) 410 is the point at which campus 402, energy grid 412, and power inverters 416-418 are electrically connected. The power supplied to POI 410 from battery power inverter 416 is shown as $P_{bat}$. $P_{bat}$ may be positive if battery power inverter 416 is providing power to POI 410 (i.e., battery 414 is discharging) or negative if battery power inverter 416 is receiving power from POI 410 (i.e., battery 414 is charging). The power supplied to POI 410 from energy grid 412 is shown as $P_{grid}$, and the power supplied to POI 410 from green power inverter 418 is shown as $P_{green}$. $P_{bat}$, $P_{green}$, and $P_{grid}$ combine at POI 410 to form $P_{campus}$ (i.e., $P_{campus}=P_{grid}+P_{bat}+P_{green}$). $P_{campus}$ may be defined as the power provided to campus 402 from POI 410. In some instances, $P_{campus}$ is greater than $P_{grid}$. For example, when battery 414 is discharging, $P_{bat}$ may be positive which adds to the grid power $P_{grid}$ when $P_{bat}$ and $P_{grid}$ combine at POI 410. Similarly, when green energy generation 408 is providing power to POI 410, $P_{green}$ may be positive which adds to the grid power $P_{grid}$ when $P_{green}$ and $P_{grid}$ combine at POI 410. In other instances, $P_{campus}$ may be less than $P_{grid}$. For example, when battery 414 is charging, $P_{bat}$ may be negative which subtracts from the grid power $P_{grid}$ when $P_{bat}$ and $P_{grid}$ combine at POI 410.

Predictive controller 420 can be configured to control the equipment of campus 402 and battery power inverter 416 to optimize the economic cost of heating or cooling buildings 404. In some embodiments, predictive controller 420 generates and provides a battery power setpoint $P_{sp,bat}$ to battery power inverter 416. The battery power setpoint $P_{sp,bat}$ may include a positive or negative power value (e.g., kW) which causes battery power inverter 416 to charge battery 414 (when $P_{sp,bat}$ is negative) using power available at POI 410 or discharge battery 414 (when $P_{sp,bat}$ is positive) to provide power to POI 410 in order to achieve the battery power setpoint $P_{sp,bat}$.

In some embodiments, predictive controller 420 generates and provides control signals to campus 402. Predictive controller 420 may use a multi-stage optimization technique to generate the control signals. For example, predictive controller 420 may include an economic controller configured to determine the optimal amount of power to be consumed by campus 402 at each time step during the optimization period. The optimal amount of power to be consumed may minimize a cost function that accounts for the cost of energy consumed by the equipment of buildings 404 and/or central plant 406. The cost of energy may be based on time-varying energy prices defining the cost of purchasing electricity from energy grid 412 at various times. In some embodiments, predictive controller 420 determines an optimal amount of power to purchase from energy grid 412 (i.e., a grid power setpoint $P_{sp,grid}$) and an optimal amount of power to store or discharge from battery 414 (i.e., a battery power setpoint $P_{sp,bat}$) at each of the plurality of time steps. In some embodiments, predictive controller 420 determines an optimal power setpoint for each subsystem or device of campus 402 (e.g., each subplant of central plant 406, each device of building equipment, etc.). Predictive controller 420 may monitor the actual power usage of campus 402 and may utilize the actual power usage as a feedback signal when generating the optimal power setpoints.

Predictive controller 420 may include a tracking controller configured to generate temperature setpoints (e.g., a zone temperature setpoint $T_{sp,zone}$, a supply air temperature setpoint $T_{sp,sa}$, etc.) that achieve the optimal amount of power consumption at each time step. In some embodiments, predictive controller 420 uses equipment models for the equipment of buildings 404 and campus 402 to determine an amount of heating or cooling that can be generated by such equipment based on the optimal amount of power consumption. Predictive controller 420 can use a zone temperature model in combination with weather forecasts from a weather service to predict how the temperature of the building zone $T_{zone}$ will change based on the power setpoints and/or the temperature setpoints.

In some embodiments, predictive controller 420 uses the temperature setpoints to generate the control signals for the equipment of buildings 404 and campus 402. The control signals may include on/off commands, speed setpoints for fans, position setpoints for actuators and valves, or other operating commands for individual devices of campus 402. In other embodiments, the control signals may include the temperature setpoints (e.g., a zone temperature setpoint $T_{sp,zone}$, a supply air temperature setpoint $T_{sp,sa}$, etc.) generated by predictive controller 420. The temperature setpoints can be provided to campus 402 or local controllers for campus 402 which operate to achieve the temperature setpoints. For example, a local controller for an AHU fan within buildings 404 may receive a measurement of the supply air temperature $T_{sa}$ from a supply air temperature sensor and/or a measurement the zone temperature $T_{zone}$ from a zone temperature sensor. The local controller can use a feedback control process (e.g., PID, ESC, MPC, etc.) to adjust the speed of the AHU fan to drive the measured temperature(s) to the temperature setpoint(s). Similar feedback control processes can be used to control the positions of actuators and valves. The multi-stage optimization performed by predictive controller 420 is described in greater detail with reference to FIG. 6.

Predictive Controller

Figure 6:
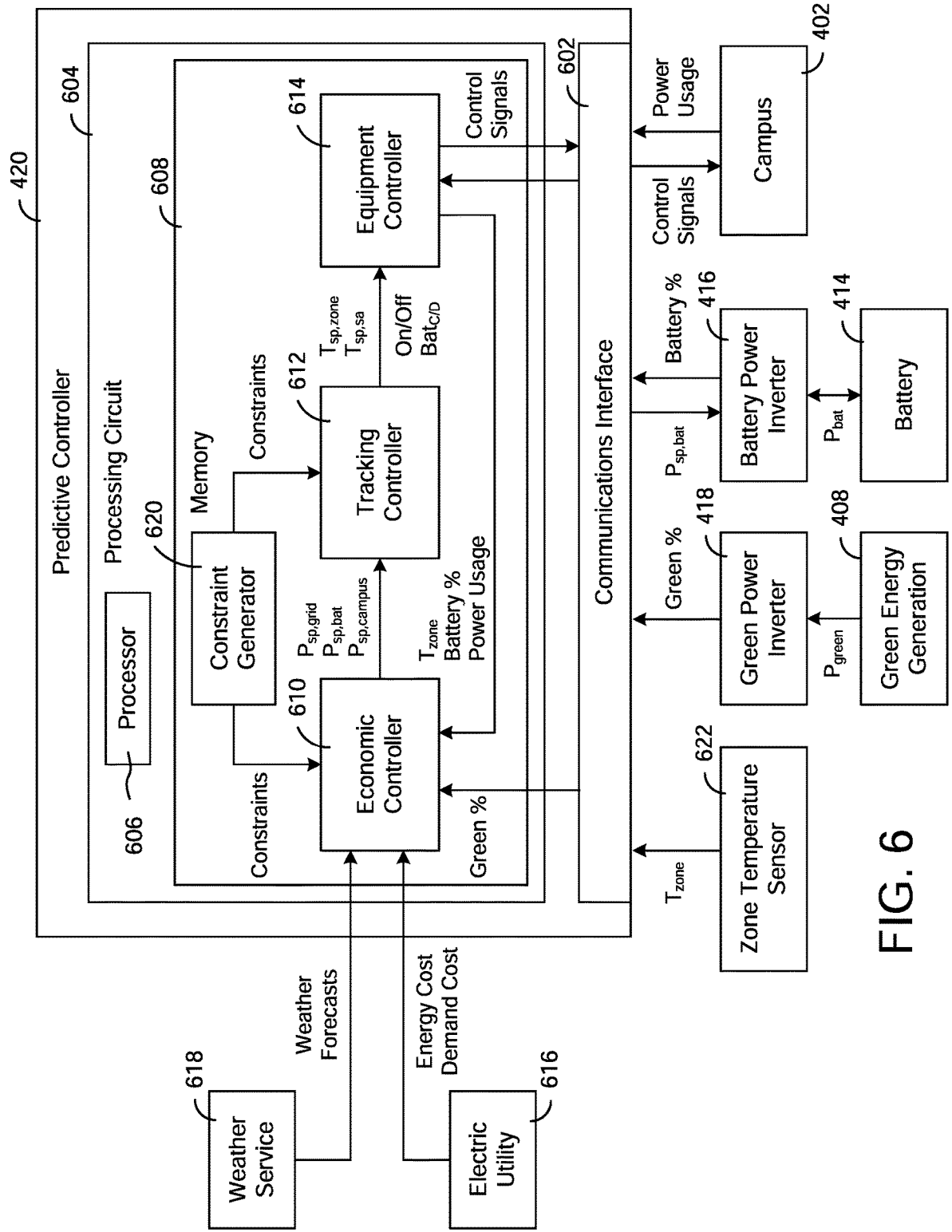
FIG. 6 is a block diagram illustrating the predictive controller of FIG. 4 in greater detail, according to some embodiments.

Referring now to FIG. 6, a block diagram illustrating predictive controller 420 in greater detail is shown, according to an exemplary embodiment. Predictive controller 420 is shown to include a communications interface 602 and a processing circuit 604.

Communications interface 602 may facilitate communications between predictive controller 420 and external systems or devices. For example, communications interface 602 may receive measurements of the zone temperature $T_{zone}$ from a zone temperature sensor 622 and measurements of the power usage of campus 402. In some embodiments, communications interface 602 receives measurements of the state-of-charge (SOC) of battery 414, which can be provided as a percentage of the maximum battery capacity (i.e., battery %). Similarly, communications interface 602 may receive an indication of the amount of power being generated by green energy generation 408, which can be provided as a percentage of the maximum green power generation (i.e., green %). Communications interface 602 can receive weather forecasts from a weather service 618 and predicted energy costs and demand costs from an electric utility 616. In some embodiments, predictive controller 420 uses communications interface 602 to provide control signals campus 402 and battery power inverter 416.

Communications interface 602 may include wired or wireless communications interfaces (e.g., jacks, antennas, transmitters, receivers, transceivers, wire terminals, etc.) for conducting data communications external systems or devices. In various embodiments, the communications may be direct (e.g., local wired or wireless communications) or via a communications network (e.g., a WAN, the Internet, a cellular network, etc.). For example, communications interface 602 can include an Ethernet card and port for sending and receiving data via an Ethernet-based communications link or network. In another example, communications interface 602 can include a WiFi transceiver for communicating via a wireless communications network or cellular or mobile phone communications transceivers.

Processing circuit 604 is shown to include a processor 606 and memory 608. Processor 606 may be a general purpose or specific purpose processor, an application specific integrated circuit (ASIC), one or more field programmable gate arrays (FPGAs), a group of processing components, or other suitable processing components. Processor 606 is configured to execute computer code or instructions stored in memory 608 or received from other computer readable media (e.g., CDROM, network storage, a remote server, etc.).

Memory 608 may include one or more devices (e.g., memory units, memory devices, storage devices, etc.) for storing data and/or computer code for completing and/or facilitating the various processes described in the present disclosure. Memory 608 may include random access memory (RAM), read-only memory (ROM), hard drive storage, temporary storage, non-volatile memory, flash memory, optical memory, or any other suitable memory for storing software objects and/or computer instructions. Memory 608 may include database components, object code components, script components, or any other type of information structure for supporting the various activities and information structures described in the present disclosure. Memory 608 may be communicably connected to processor 606 via processing circuit 604 and may include computer code for executing (e.g., by processor 606) one or more processes described herein. When processor 606 executes instructions stored in memory 608 for completing the various activities described herein, processor 606 generally configures predictive controller 420 (and more particularly processing circuit 604) to complete such activities.

Still referring to FIG. 6, predictive controller 420 is shown to include an economic controller 610, a tracking controller 612, and an equipment controller 614. Controllers 610-614 can be configured to perform a multi-state optimization process to generate control signals for power battery power inverter 416 and campus 402. In brief overview, economic controller 610 can optimize a predictive cost function to determine an optimal amount of power to purchase from energy grid 412 (i.e., a grid power setpoint $P_{sp,grid}$), an optimal amount of power to store or discharge from battery 414 (i.e., a battery power setpoint $P_{sp,bat}$), and/or an optimal amount of power to be consumed by campus 402 (i.e., a campus power setpoint $P_{sp,campus}$) at each time step of an optimization period. Tracking controller 612 can use the optimal power setpoints $P_{sp,grid}$, $P_{sp,bat}$, and/or $P_{sp,campus}$ to determine optimal temperature setpoints (e.g., a zone temperature setpoint $T_{sp,zone}$, a supply air temperature setpoint $T_{sp,sa}$, etc.) and an optimal battery charge or discharge rate (i.e., $Bat_{C/D}$). Equipment controller 614 can use the optimal temperature setpoints $T_{sp,zone}$ or $T_{sp,sa}$ to generate control signals for campus 402 that drive the actual (e.g., measured) temperatures $T_{zone}$ and/or $T_{sa}$ to the setpoints (e.g., using a feedback control technique). Each of controllers 610-614 is described in detail below.

Economic Controller

Economic controller 610 can be configured to optimize a predictive cost function to determine an optimal amount of power to purchase from energy grid 412 (i.e., a grid power setpoint $P_{sp,grid}$), an optimal amount of power to store or discharge from battery 414 (i.e., a battery power setpoint $P_{sp,bat}$), and/or an optimal amount of power to be consumed by campus 402 (i.e., a campus power setpoint $P_{sp,campus}$) at each time step of an optimization period. An example of a predictive cost function which can be optimized by economic controller 610 is shown in the following equation:

$$\min(J) = \sum_{k=1}^{h} C_{ec}(k) P_{CPO}(k) \Delta t + \sum_{k=1}^{h} C_{ec}(k) P_{RTU}(k) \Delta t + \sum_{k=1}^{h} C_{ec}(k) P_{VRF}(k) \Delta t + \sum_{k=1}^{h} C_{ec}(k) P_{AHU}(k) \Delta t + C_{DC} \max_{k}(P_{grid}(k)) - \sum_{k=1}^{h} C_{ec}(k) P_{bat}(k) \Delta t$$

where $C_{ec}(k)$ is the cost per unit of electricity (e.g., $/kWh) purchased from energy grid 412 during time step k, $P_{CPO}(k)$ is the total power consumption (e.g., kW) of central plant 406 time step k, $P_{RTU}(k)$ is the total power consumption of the RTUs of buildings 404 during time step k, $P_{VRF}(k)$ is the total power consumption of the VRF system used to serve buildings 404 during time step k, $P_{AHU}(k)$ is the total power consumption of the AHUs of buildings 404 during time step k, $C_{DC}$ is the demand charge rate (e.g., $/kW), the max( ) term selects the maximum value of $P_{grid}(k)$ during any time step k of the optimization period, $P_{bat}(k)$ is the amount of power discharged from battery 414 during time step k, and $\Delta t$ is the duration of each time step k. Economic controller 610 can optimize the predictive cost function J over the duration of the optimization period (e.g., from time step k=1 to time step k=h) to predict the total cost of heating or cooling campus 402 over the duration of the optimization period.

The first term of the predictive cost function J represents the cost of electricity consumed by central plant 406 over the duration of the optimization period. The values of the parameter $C_{ec}(k)$ at each time step k can be defined by the energy cost information provided by electric utility 616. In some embodiments, the cost of electricity varies as a function of time, which results in different values of $C_{ec}(k)$ at different time steps k. The variable $P_{CPO}(k)$ is a decision variable which can be optimized by economic controller 610. In some embodiments, $P_{CPO}(k)$ is a component of $P_{campus}$ (e.g., $P_{campus} = P_{CPO} + P_{RTU} + P_{VRF} + P_{AHU}$). In some embodiments, $P_{CPO}(k)$ is a summation of the power consumptions of each subplant of central plant 406 (e.g., $P_{CPO} = P_{ChillerSubplant} + P_{HRCSubplant} + P_{HeaterSubplant}$).

In some embodiments, economic controller 610 uses one or more subplant curves for central plant 406 to relate the value of $P_{CPO}$ to the production of central plant 406 (e.g., hot water production, chilled water production, etc.). For example, if a chiller subplant 206 is used to generate a chilled fluid, a subplant curve for chiller subplant 206 can be used to model the performance of chiller subplant 206. In some embodiments, the subplant curve defines the relationship between input resources and output resources of chiller subplant 206. For example, the subplant curve for chiller subplant 206 may define the electricity consumption (e.g., kW) of chiller subplant 206 as a function of the amount of cooling provided by chiller subplant 206 (e.g., tons). Economic controller 610 can use the subplant curve for chiller subplant 206 to determine an amount of electricity consumption (kW) that corresponds to a given amount of cooling (tons). Similar subplant curves can be used to model the performance of other subplants of central plant 406. Several examples of subplant curves which can be used by economic controller 610 are described in greater detail in U.S. patent application Ser. No. 14/634,609 filed Feb. 27, 2015, the entire disclosure of which is incorporated by reference herein.

The second, third, and fourth terms of the predictive cost function J represent the cost of electricity consumed by the equipment of buildings 404. For example, the second term of the predictive cost function J represents the cost of electricity consumed by one or more AHUs of buildings 404. The third term of the predictive cost function J represents the cost of electricity consumed by a VRF system of buildings 404. The fourth term of the predictive cost function J represents the cost of electricity consumed by one or more RTUs of buildings 404. In some embodiments, economic controller 610 uses equipment performance curves to model the power consumptions $P_{RTU}$, $P_{VRF}$, and $P_{AHU}$ as a function of the amount of heating or cooling provided by the respective equipment of buildings 404. The equipment performance curves may be similar to the subplant curves in that they define a relationship between the heating or cooling load on a system or device and the power consumption of that system or device. The subplant curves and equipment performance curves can be used by economic controller 610 to impose constraints on the predictive cost function J.

The fifth term of the predictive cost function J represents the demand charge. Demand charge is an additional charge imposed by some utility providers based on the maximum power consumption during an applicable demand charge period. For example, the demand charge rate $C_{DC}$ may be specified in terms of dollars per unit of power (e.g., $/kW) and may be multiplied by the peak power usage (e.g., kW) during a demand charge period to calculate the demand charge. In the predictive cost function J, the demand charge rate $C_{DC}$ may be defined by the demand cost information received from electric utility 616. The variable $P_{grid}(k)$ is a decision variable which can be optimized by economic controller 610 in order to reduce the peak power usage $\max(P_{grid}(k))$ that occurs during the demand charge period. Load shifting may allow economic controller 610 to smooth momentary spikes in the electric demand of campus 402 by storing energy in battery 414 when the power consumption of campus 402 is low. The stored energy can be discharged from battery 414 when the power consumption of campus 402 is high in order to reduce the peak power draw $P_{grid}$ from energy grid 412, thereby decreasing the demand charge incurred.

The final term of the predictive cost function J represents the cost savings resulting from the use of battery 414. Unlike the previous terms in the cost function J, the final term subtracts from the total cost. The values of the parameter $C_{ec}(k)$ at each time step k can be defined by the energy cost information provided by electric utility 616. In some embodiments, the cost of electricity varies as a function of time, which results in different values of $C_{ec}(k)$ at different time steps k. The variable $P_{bat}(k)$ is a decision variable which can be optimized by economic controller 610. A positive value of $P_{bat}(k)$ indicates that battery 414 is discharging, whereas a negative value of $P_{bat}(k)$ indicates that battery 414 is charging. The power discharged from battery 414 $P_{bat}(k)$ can be used to satisfy some or all of the total power consumption $P_{total}(k)$ of campus 402, which reduces the amount of power $P_{grid}(k)$ purchased from energy grid 412 (i.e., $P_{grid}(k)=P_{total}(k)-P_{bat}(k)-P_{green}(k)$). However, charging battery 414 results in a negative value of $P_{bat}(k)$ which adds to the total amount of power $P_{grid}(k)$ purchased from energy grid 412.

In some embodiments, the power $P_{green}$ provided by green energy generation 408 is not included in the predictive cost function J because generating green power does not incur a cost. However, the power $P_{green}$ generated by green energy generation 408 can be used to satisfy some or all of the total power consumption $P_{campus}(k)$ of campus 402, which reduces the amount of power $P_{grid}(k)$ purchased from energy grid 412 (i.e., $P_{grid}(k)=P_{campus}(k)-P_{bat}(k)-P_{green}(k)$). The amount of green power $P_{green}$ generated during any time step k can be predicted by economic controller 610. Several techniques for predicting the amount of green power generated by green energy generation 408 are described in U.S. patent application Ser. No. 15/247,869, U.S. patent application Ser. No. 15/247,844, and U.S. patent application Ser. No. 15/247,788. Each of these patent applications has a filing date of Aug. 25, 2016, and the entire disclosure of each of these patent applications is incorporated by reference herein.

Economic controller 610 can optimize the predictive cost function J over the duration of the optimization period to determine optimal values of the decision variables at each time step during the optimization period. In some embodiments, the optimization period has a duration of approximately one day and each time step is approximately fifteen minutes. However, the durations of the optimization period and the time steps can vary in other embodiments and can be adjusted by a user. Advantageously, economic controller 610 can use battery 414 to perform load shifting by drawing electricity from energy grid 412 when energy prices are low and/or when the power consumed by campus 402 is low. The electricity can be stored in battery 414 and discharged later when energy prices are high and/or the power consumption of campus 402 is high. This enables economic controller 610 to reduce the cost of electricity consumed by campus 402 and can smooth momentary spikes in the electric demand of campus 402, thereby reducing the demand charge incurred.

Economic controller 610 can be configured to impose constraints on the optimization of the predictive cost function J. In some embodiments, economic controller 610 is configured to optimize the predictive cost function J subject to a set of equality constraints and inequality constraints. For example, the optimization performed by economic controller 610 can be described by the following equation:

$$\min J(x) \text{ subject to } Ax \leq b, Hx = g$$

where x is a matrix of the decision variables in predictive cost function J (e.g., $P_{CPO}$, $P_{RTU}$, $P_{VRF}$, $P_{AHU}$, $P_{grid}$, $P_{bat}$, etc.), A and b are a matrix and vector (respectively) which describe inequality constraints on the optimization problem, and H and g are a matrix and vector (respectively) which describe equality constraints on the optimization problem. The inequality constraints and the equality constraints may be generated by constraint generator 620, described in greater detail below.

In some embodiments, the matrix x of decision variables has the form:

$$x = [P_{CPO,1} \ldots {}_h, P_{RTU,1} \ldots {}_h, P_{VRF,1} \ldots {}_h, P_{AHU,1} \ldots {}_h, P_{grid,1} \ldots {}_h, P_{bat,1} \ldots {}_h]^T$$

where $P_{CPO,1 \ldots h}$, $P_{RTU,1 \ldots h}$, $P_{VRF,1 \ldots h}$, $P_{AHU,1 \ldots h}$, $P_{grid,1 \ldots h}$, and $P_{bat,1 \ldots h}$ are h-dimensional vectors representing the power consumption of central plant 406, one or more RTUs of buildings 404, a VRF system of buildings 404, one or more AHUs of buildings 404, the power purchased from energy grid 412, and the power stored or discharged from battery 414 at each of the h time steps of the optimization period.

Economic controller 610 can optimize the predictive cost function J subject to the constraints to determine optimal values for the decision variables $P_{CPO}$, $P_{RTU}$, $P_{VRF}$, $P_{AHU}$, $P_{grid}$, and $P_{bat}$, where $P_{campus} = P_{bat} + P_{grid} + P_{green}$. In some embodiments, economic controller 610 uses the optimal values for $P_{campus}$, $P_{bat}$, and/or $P_{grid}$ to generate power setpoints for tracking controller 612. The power setpoints can include battery power setpoints $P_{sp,bat}$, grid power setpoints $P_{sp,grid}$, central plant power setpoints $P_{sp,CPO}$, AHU power setpoints $P_{sp,AHU}$, VRF power setpoints $P_{sp,VRF}$, RTU power setpoints $P_{sp,RTU}$, and/or power setpoints for each subplant of central plant 406 for each of the time steps k in the optimization period. Economic controller 610 can provide the power setpoints to tracking controller 612.

Tracking Controller

Tracking controller 612 can use the optimal power setpoints generated by economic controller 610 (e.g., $P_{sp,bat}$, $P_{sp,grid}$, $P_{sp,CPO}$, $P_{sp,AHU}$, $P_{sp,VRF}$, $P_{sp,RTU}$, $P_{sp,campus}$, etc.) to determine optimal temperature setpoints (e.g., a zone temperature setpoint $T_{sp,zone}$, a supply air temperature setpoint $T_{sp,sa}$, etc.) and an optimal battery charge or discharge rate (i.e., $Bat_{C/D}$). In some embodiments, tracking controller 612 generates a zone temperature setpoint $T_{sp,zone}$ and/or a supply air temperature setpoint $T_{sp,sa}$ that are predicted to achieve the power setpoints for campus 402 (e.g., $P_{sp,CPO}$, $P_{sp,AHU}$, $P_{sp,VRF}$, $P_{sp,RTU}$, $P_{sp,campus}$). In other words, tracking controller 612 may generate a zone temperature setpoint $T_{sp,zone}$ and/or a supply air temperature setpoint $T_{sp,sa}$ that cause campus 402 to consume the optimal amount of power $P_{campus}$ determined by economic controller 610.

In some embodiments, tracking controller 612 relates the power consumption of campus 402 to the zone temperature $T_{zone}$ and the zone temperature setpoint $T_{sp,zone}$ using a power consumption model. For example, tracking controller 612 can use a model of equipment controller 614 to determine the control action performed by equipment controller 614 as a function of the zone temperature $T_{zone}$ and the zone temperature setpoint $T_{sp,zone}$. An example of such a zone regulatory controller model is shown in the following equation:

$$v_{air} = h(T_{zone}, T_{sp,zone})$$

where $v_{air}$ is the rate of airflow to the building zone (i.e., the control action). The zone regulatory controller model may be generated by constraint generator 620 and implemented as a constraint on the optimization problem.

In some embodiments, $v_{air}$ depends on the speed of a fan of an AHU or RTU used to provide airflow to buildings 404 and may be a function of $P_{AHU}$ or $P_{RTU}$. Tracking controller 612 can use an equipment model or manufacturer specifications for the AHU or RTU to translate $v_{air}$ into a corresponding power consumption value $P_{AHU}$ or $P_{RTU}$. Accordingly, tracking controller 612 can define the power consumption $P_{campus}$ of campus 402 as a function of the zone temperature $T_{zone}$ and the zone temperature setpoint $T_{sp,zone}$. An example of such a model is shown in the following equation:

$$P_{campus} = f_4(T_{zone}, T_{sp,zone})$$

The function $f_4$ can be identified from data. For example, tracking controller 612 can collect measurements of $P_{campus}$ and $T_{zone}$ and identify the corresponding value of $T_{sp,zone}$. Tracking controller 612 can perform a system identification process using the collected values of $P_{campus}$, $T_{zone}$, and $T_{sp,zone}$ as training data to determine the function $f_4$ that defines the relationship between such variables. The zone temperature model may be generated by constraint generator 620 and implemented as a constraint on the optimization problem.

Tracking controller 612 may use a similar model to determine the relationship between the total power consumption $P_{campus}$ of campus 402 and the supply air temperature setpoint $T_{sp,sa}$. For example, tracking controller 612 can define the power consumption $P_{campus}$ of campus 402 as a function of the zone temperature $T_{zone}$ and the supply air temperature setpoint $T_{sp,zone}$. An example of such a model is shown in the following equation:

$$P_{campus} = f_5(T_{zone}, T_{sp,sa})$$

The function $f_5$ can be identified from data. For example, tracking controller 612 can collect measurements of $P_{campus}$ and $T_{zone}$ and identify the corresponding value of $T_{sp,sa}$. Tracking controller 612 can perform a system identification process using the collected values of $P_{campus}$, $T_{zone}$, and $T_{sp,sa}$ as training data to determine the function $f_5$ that defines the relationship between such variables. The power consumption model may be generated by constraint generator 620 and implemented as a constraint on the optimization problem.

Tracking controller 612 can use the relationships between $P_{campus}$, $T_{sp,zone}$, and $T_{sp,sa}$ to determine values for $T_{sp,zone}$ and $T_{sp,sa}$. For example, tracking controller 612 can receive the value of $P_{campus}$ as an input from economic controller 610 (i.e., $P_{sp,campus}$) and can use the value of $P_{campus}$ to determine corresponding values of $T_{sp,zone}$ and $T_{sp,sa}$. Tracking controller 612 can provide the values of $T_{sp,zone}$ and $T_{sp,sa}$ as outputs to equipment controller 614.

In some embodiments, tracking controller 612 uses the battery power setpoint $P_{sp,bat}$ to determine the optimal rate $Bat_{C/D}$ at which to charge or discharge battery 414. For example, the battery power setpoint $P_{sp,bat}$ may define a power value (kW) which can be translated by tracking controller 612 into a control signal for battery power inverter 416 and/or equipment controller 614. In other embodiments, the battery power setpoint $P_{sp,bat}$ is provided directly to battery power inverter 416 and used by battery power inverter 416 to control the battery power $P_{bat}$.

Equipment Controller

Equipment controller 614 can use the optimal temperature setpoints $T_{sp,zone}$ or $T_{sp,sa}$ generated by tracking controller 612 to generate control signals for campus 402. The control signals generated by equipment controller 614 may drive the actual (e.g., measured) temperatures $T_{zone}$ and/or $T_{sa}$ to the setpoints. Equipment controller 614 can use any of a variety of control techniques to generate control signals for campus 402. For example, equipment controller 614 can use state-based algorithms, extremum seeking control (ESC) algorithms, proportional-integral (PI) control algorithms, proportional-integral-derivative (PID) control algorithms, model predictive control (MPC) algorithms, or other feedback control algorithms, to generate control signals for campus 402.

The control signals may include on/off commands, speed setpoints for fans or compressors, position setpoints for actuators and valves, or other operating commands for individual devices of building equipment and/or central plant equipment. In some embodiments, equipment controller 614 uses a feedback control technique (e.g., PID, ESC, MPC, etc.) to adjust the operation of central plant 406 to drive the measured temperatures $T_{zone}$ and/or $T_{sa}$ to the temperature setpoints $T_{sp,zone}$ and/or $T_{sp,sa}$. Similarly, equipment controller 614 can use a feedback control technique to control the equipment of buildings 404 (e.g., AHUs, RTUs, VRF equipment, etc.) to drive the measured temperatures $T_{zone}$ and/or $T_{sa}$ to the temperature setpoints $T_{sp,zone}$ and/or $T_{sp,sa}$. Equipment controller 614 can provide the control signals to the equipment of campus 402 to control the operation of such equipment, thereby causing the equipment of campus 402 to affect the zone temperature $T_{zone}$ and/or the supply air temperature $T_{sa}$.

In some embodiments, equipment controller 614 is configured to provide control signals to battery power inverter 416. The control signals provided to battery power inverter 416 can include a battery power setpoint $P_{sp,bat}$ and/or the optimal charge/discharge rate $Bat_{C/D}$. Equipment controller 614 can be configured to operate battery power inverter 416 to achieve the battery power setpoint $P_{sp,bat}$. For example, equipment controller 614 can cause battery power inverter 416 to charge battery 414 or discharge battery 414 in accordance with the battery power setpoint $P_{sp,bat}$.

Constraint Generator

Still referring to FIG. 6, predictive controller 420 is shown to include a constraint generator 620. Constraint generator 620 can be configured to generate and impose constraints on the optimization processes performed by economic controller 610 and tracking controller 612. For example, constraint generator 620 can impose inequality constraints and equality constraints on the optimization of the predictive cost function J performed by economic controller 610 to generate optimal power setpoints. Constraint generator 620 can also impose constraints on the optimization performed by tracking controller 612 to generate optimal temperature setpoints.

In some embodiments, the constraints generated by constraint generator 620 include constraints on the temperature $T_{zone}$ of buildings 404. Constraint generator 620 can be configured to generate a constraint that requires economic controller 610 to maintain the actual or predicted temperature $T_{zone}$ between an minimum temperature bound $T_{min}$ and a maximum temperature bound $T_{max}$ (i.e., $T_{min} \leq T_{zone} \leq T_{max}$) at all times. The parameters $T_{min}$ and $T_{max}$ may be time-varying to define different temperature ranges at different times (e.g., an occupied temperature range, an unoccupied temperature range, a daytime temperature range, a nighttime temperature range, etc.).

In order to ensure that the zone temperature constraint is satisfied, constraint generator 620 can model the zone temperature $T_{zone}$ of buildings 404 as a function of the decision variables optimized by economic controller 610. In some embodiments, constraint generator 620 models $T_{zone}$ using a heat transfer model. For example, the dynamics of heating or cooling buildings 404 can be described by the energy balance:

$$C \frac{dT_{zone}}{dt} = -H(T_{zone} - T_a) + \dot{Q}_{HVAC} + \dot{Q}_{other}$$

where C is the thermal capacitance of the building zone, H is the ambient heat transfer coefficient for the building zone, $T_{zone}$ is the temperature of the building zone, $T_a$ is the ambient temperature outside the building zone (e.g., the outside air temperature), $\dot{Q}_{HVAC}$ is the amount of heating applied to the building zone by the HVAC equipment of buildings 404, and $\dot{Q}_{other}$ is the external load, radiation, or other disturbance experienced by the building zone. In the previous equation, $\dot{Q}_{HVAC}$ represents heat transfer into the building zone (i.e., the heating load) and therefore has a positive sign. However, if cooling is applied to the building zone rather than heating, the sign on $\dot{Q}_{HVAC}$ can be switched to a negative sign such that ($\dot{Q}_{HVAC}$ represents the amount of cooling applied to the building zone (i.e., the cooling load).

In some embodiments, the amount of heating or cooling $\dot{Q}_{HVAC}$ provided to buildings 404 can be defined as the heating or cooling load on the HVAC equipment of buildings 404 (e.g., RTUs, AHUs, VRF systems, etc.) and/or central plant 406. Several techniques for developing zone temperature models and relating the zone temperature $T_{zone}$ to the decision variables in the predictive cost function J are described in greater detail in U.S. Pat. No. 9,436,179 granted Sep. 6, 2016, U.S. patent application Ser. No. 14/694,633 filed Apr. 23, 2015, and U.S. patent application Ser. No. 15/199,910 filed Jun. 30, 2016. The entire disclosure of each of these patents and patent applications is incorporated by reference herein.

The previous energy balance combines all mass and air properties of the building zone into a single zone temperature. Other heat transfer models which can be used by economic controller 610 include the following air and mass zone models:

$$C_z \frac{dT_{zone}}{dt} = H_{az}(T_a - T_{zone}) + H_{mz}(T_m - T_{zone}) + \dot{Q}_{HVAC} + \dot{Q}_{other}$$

$$C_m \frac{dT_m}{dt} = H_{mz}(T_{zone} - T_m)$$

where $C_z$ and $T_{zone}$ are the thermal capacitance and temperature of the air in the building zone, $T_a$ is the ambient air temperature, $H_{az}$ is the heat transfer coefficient between the air of the building zone and ambient air outside the building zone (e.g., through external walls of the building zone), $C_m$ and $T_m$ are the thermal capacitance and temperature of the non-air mass within the building zone, and $H_{mz}$ is the heat transfer coefficient between the air of the building zone and the non-air mass.

The previous equation combines all mass properties of the building zone into a single zone mass. Other heat transfer models which can be used by economic controller 610 include the following air, shallow mass, and deep mass zone models:

$$C_z \frac{dT_{zone}}{dt} = H_{az}(T_a - T_{zone}) + H_{sz}(T_s - T_{zone}) + \dot{Q}_{HVAC} + \dot{Q}_{other}$$

$$C_s \frac{dT_s}{dt} = H_{sz}(T_{zone} - T_s) + H_{ds}(T_d - T_s)$$

-continued $$C_d \frac{dT_d}{dt} = H_{ds}(T_s - T_d)$$

where $C_z$ and $T_{zone}$ are the thermal capacitance and temperature of the air in the building zone, $T_a$ is the ambient air temperature, $H_{az}$ is the heat transfer coefficient between the air of the building zone and ambient air outside the building zone (e.g., through external walls of the building zone), $C_s$ and $T_s$ are the thermal capacitance and temperature of the shallow mass within the building zone, $H_{sz}$ is the heat transfer coefficient between the air of the building zone and the shallow mass, $C_d$ and $T_d$ are the thermal capacitance and temperature of the deep mass within the building zone, and $H_{ds}$ is the heat transfer coefficient between the shallow mass and the deep mass.

In some embodiments, constraint generator 620 uses the weather forecasts from weather service 618 to determine appropriate values for the ambient air temperature $T_a$ and/or the external disturbance $\dot{Q}_{other}$ at each time step of the optimization period. Values of C and H can be specified as parameters of the building zone, received from tracking controller 612, received from a user, retrieved from memory 608, or otherwise provided as an input to constraint generator 620. Accordingly, the temperature of the building zone $T_{zone}$ can be defined as a function of the amount of heating or cooling $\dot{Q}_{HVAC}$ applied to the building zone using any of these heat transfer models. The manipulated variable $\dot{Q}_{HVAC}$ can be adjusted by economic controller 610 by adjusting the variables $P_{CPO}$, $P_{RTU}$, $P_{VRF}$, and/or $P_{AHU}$ in the predictive cost function J.

In some embodiments, constraint generator 620 uses a model that defines the amount of heating or cooling $\dot{Q}_{HVAC}$ applied to the building zone as a function of the power setpoints $P_{sp,grid}$ and $P_{sp,bat}$ provided by economic controller 610. For example, constraint generator 620 can add the power setpoints $P_{sp,grid}$ and $P_{sp,bat}$ to the green power generation $P_{green}$ to determine the total amount of power $P_{campus}$ that will be consumed by campus 402. In some embodiments, $P_{campus}$ is equivalent to the combined power consumption of buildings 404 and central plant 406 (e.g., $P_{campus} = P_{CPO} + P_{AHU} + P_{VRF} + P_{RTU}$). Constraint generator 620 can use $P_{campus}$ in combination with the subplant curves for central plant 406 and the equipment performance curves for the HVAC equipment of buildings 404 the total amount of heating or cooling $\dot{Q}_{HVAC}$ applied to the building zone.

In some embodiments, constraint generator 620 uses one or more models that define the amount of heating or cooling applied to the building zone (i.e., $\dot{Q}_{HVAC}$) as a function of the zone temperature $T_{zone}$ and the zone temperature setpoint $T_{sp,zone}$ as shown in the following equation:

$$\dot{Q}_{HVAC} = f(T_{zone}, T_{sp,zone})$$

The models used by constraint generator 620 can be imposed as optimization constraints to ensure that the amount of heating or cooling $\dot{Q}_{HVAC}$ provided is not reduced to a value that would cause the zone temperature $T_{zone}$ to deviate from an acceptable or comfortable temperature range.

In some embodiments, constraint generator 620 relates the amount of heating or cooling $\dot{Q}_{HVAC}$ to the zone temperature $T_{zone}$ and the zone temperature setpoint $T_{sp,zone}$ using multiple models. For example, constraint generator 620 can use a model of equipment controller 614 to determine the control action performed by equipment controller 614 as a function of the zone temperature $T_{zone}$ and the zone temperature setpoint $T_{sp,zone}$. An example of such a zone regulatory controller model is shown in the following equation:

$$v_{air} = f_1(T_{zone}, T_{sp,zone})$$

where $v_{air}$ is the rate of airflow to the building zone (i.e., the control action). In some embodiments, $v_{air}$ depends on the speed of an AHU fan or RTU fan and may be a function of $P_{AHU}$ and/or $P_{RTU}$. Constraint generator 620 can use an equipment model or manufacturer specifications for the AHU or RTU to define $v_{air}$ as a function of $P_{AHU}$ or $P_{RTU}$. The function $f_1$ can be identified from data. For example, constraint generator 620 can collect measurements of $v_{air}$ and $T_{zone}$ and identify the corresponding value of $T_{sp,zone}$. Constraint generator 620 can perform a system identification process using the collected values of $v_{air}$, $T_{zone}$, and $T_{sp,zone}$ as training data to determine the function $f_1$ that defines the relationship between such variables.

Constraint generator 620 can use an energy balance model relating the control action Hair to the amount of heating or cooling $\dot{Q}_{HVAC}$ provided to buildings 404 as shown in the following equation:

$$\dot{Q}_{HVAC} = f_2(v_{air})$$

where the function $f_2$ can be identified from training data. Constraint generator 620 can perform a system identification process using collected values of $v_{air}$ and $\dot{Q}_{HVAC}$ to determine the function $f_2$ that defines the relationship between such variables.

In some embodiments, a linear relationship exists between $\dot{Q}_{HVAC}$ and $v_{air}$. Assuming an ideal proportional-integral (PI) controller and a linear relationship between $\dot{Q}_{HVAC}$ and $v_{air}$, a simplified linear controller model can be used to define the amount of heating or cooling $\dot{Q}_{HVAC}$ provided to buildings 404 as a function of the zone temperature $T_{zone}$ and the zone temperature setpoint $T_{sp,zone}$. An example of such a model is shown in the following equations:

$$\dot{Q}_{HVAC} = \dot{Q}_{ss} + K_c\left[\varepsilon + \frac{1}{\tau_I}\int_0^t \varepsilon(t')dt'\right]$$

$$\varepsilon = T_{sp,zone} - T_{zone}$$

where $\dot{Q}_{ss}$ is the steady-state rate of heating or cooling rate, $K_c$ is the scaled zone PI controller proportional gain, $\tau_I$ is the zone PI controller integral time, and $\varepsilon$ is the setpoint error (i.e., the difference between the zone temperature setpoint $T_{sp,zone}$ and the zone temperature $T_{zone}$). Saturation can be represented by constraints on $\dot{Q}_{HVAC}$. If a linear model is not sufficiently accurate to model equipment controller 614, a nonlinear heating/cooling duty model can be used instead.

In addition to constraints on the zone temperature $T_{zone}$, constraint generator 620 can impose constraints on the state-of-charge (SOC) and charge/discharge rates of battery 414. In some embodiments, constraint generator 620 generates and imposes the following power constraints on the predictive cost function J:

$$P_{bat} \leq P_{rated}$$

$$-P_{bat} \leq P_{rated}$$

where $P_{bat}$ is the amount of power discharged from battery 414 and $P_{rated}$ is the rated battery power of battery 414 (e.g., the maximum rate at which battery 414 can be charged or discharged). These power constraints ensure that battery 414 is not charged or discharged at a rate that exceeds the maximum possible battery charge/discharge rate $P_{rated}$.

In some embodiments, constraint generator 620 generates and imposes one or more capacity constraints on the predictive cost function J The capacity constraints may be used to relate the battery power $P_{bat}$ charged or discharged during each time step to the capacity and SOC of battery 414. The capacity constraints may ensure that the capacity of battery 414 is maintained within acceptable lower and upper bounds at each time step of the optimization period. In some embodiments, constraint generator 620 generates the following capacity constraints:

$$C_a(k) - P_{bat}(k)\Delta t \leq C_{rated}$$

$$C_a(k) - P_{bat}(k)\Delta t \geq 0$$

where $C_a(k)$ is the available battery capacity (e.g., kWh) at the beginning of time step k, $P_{bat}(k)$ is the rate at which battery 414 is discharged during time step k (e.g., kW), $\Delta t$ is the duration of each time step, and $C_{rated}$ is the maximum rated capacity of battery 414 (e.g., kWh). The term $P_{bat}(k)\Delta t$ represents the change in battery capacity during time step k. These capacity constraints ensure that the capacity of battery 414 is maintained between zero and the maximum rated capacity $C_{rated}$.

In some embodiments, constraint generator 620 generates and imposes one or more power constraints. For example, economic controller 610 can be configured to generate a constraint which limits the power $P_{campus}$ provided to campus 402 between zero and the maximum power throughput $P_{campus,max}$ of POI 410, as shown in the following equation:

$$0 \leq P_{campus}(k) \leq P_{campus,max}$$

$$P_{campus}(k) = P_{sp,grid}(k) + P_{sp,bat}(k) + P_{green}(k)$$

where the total power $P_{campus}$ provided to campus 402 is the sum of the grid power setpoint $P_{sp,grid}$, the battery power setpoint $P_{sp,bat}$, and the green power generation $P_{green}$.

In some embodiments, constraint generator 620 generates and imposes one or more capacity constraints on the operation of central plant 406. For example, heating may be provided by heater subplant 202 and cooling may be provided by chiller subplant 206. The operation of heater subplant 202 and chiller subplant 206 may be defined by subplant curves for each of heater subplant 202 and chiller subplant 206. Each subplant curve may define the resource production of the subplant (e.g., tons refrigeration, kW heating, etc.) as a function of one or more resources consumed by the subplant (e.g., electricity, natural gas, water, etc.). Several examples of subplant curves which can be used by constraint generator 620 are described in greater detail in U.S. patent application Ser. No. 14/634,609 filed Feb. 27, 2015.

Neural Network Modeling

Figure 7:
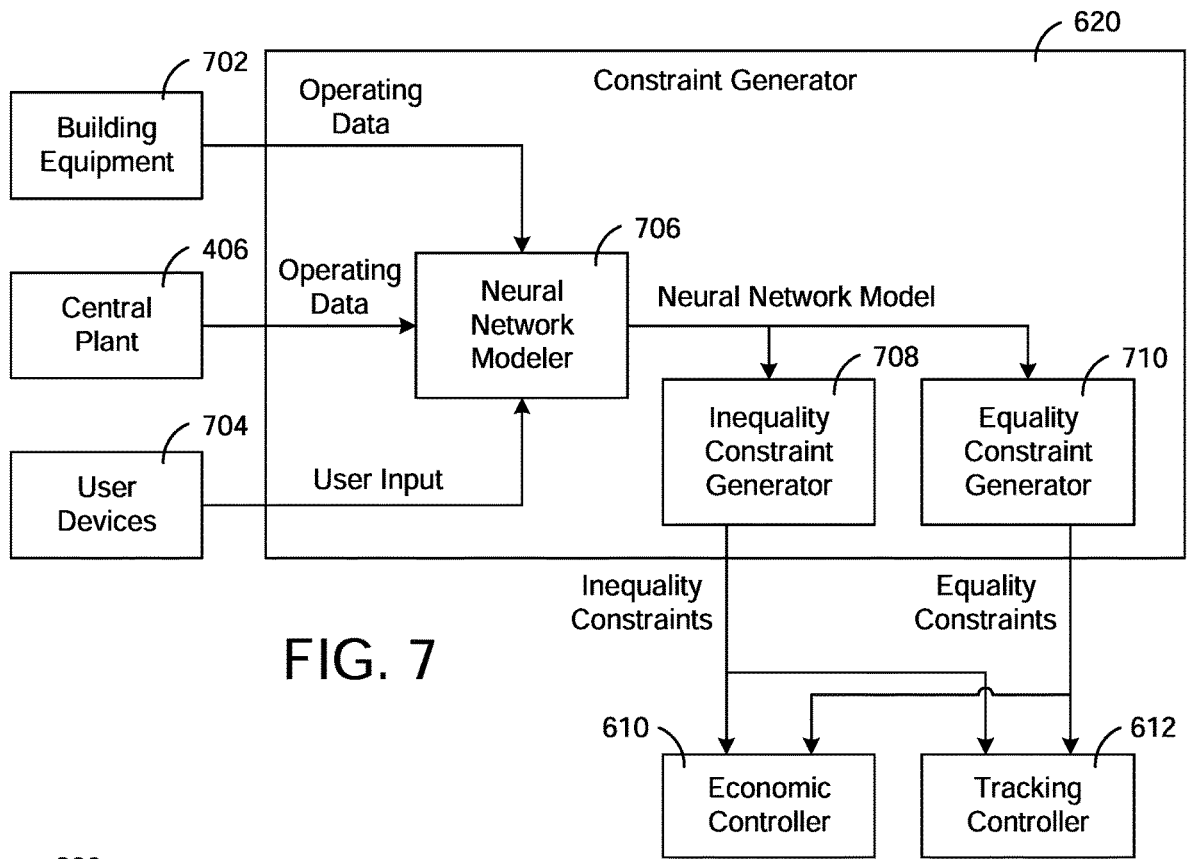
FIG. 7 is a block diagram illustrating a constraint generator of the predictive controller of FIG. 4 in greater detail, according to some embodiments.

Referring now to FIG. 7, a block diagram illustrating constraint generator 620 in greater detail is shown, according to an exemplary embodiment. Constraint generator 620 is shown to include a neural network modeler 706, an inequality constraint generator 708, and an equality constraint generator 710. In some embodiments, one or more components of constraint generator 620 are combined into a single component. However, the components are shown separated in FIG. 7 for ease of explanation.

Neural network modeler 706 may be configured to generate a neural network model that can be used to generate constraints for the optimization procedures performed by economic controller 610 and/or tracking controller 612. In some embodiments, the neural network model is a convolutional neural network (CNN). A CNN is a type of feedforward artificial neural network in which the connectivity pattern between its neurons is inspired by the organization of the animal visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation. The CNN is also known as shift invariant or space invariant artificial neural network (SIANN), which is named based on its shared weights architecture and translation invariance characteristics. Various network types are possible in various embodiments.

Figure 8:
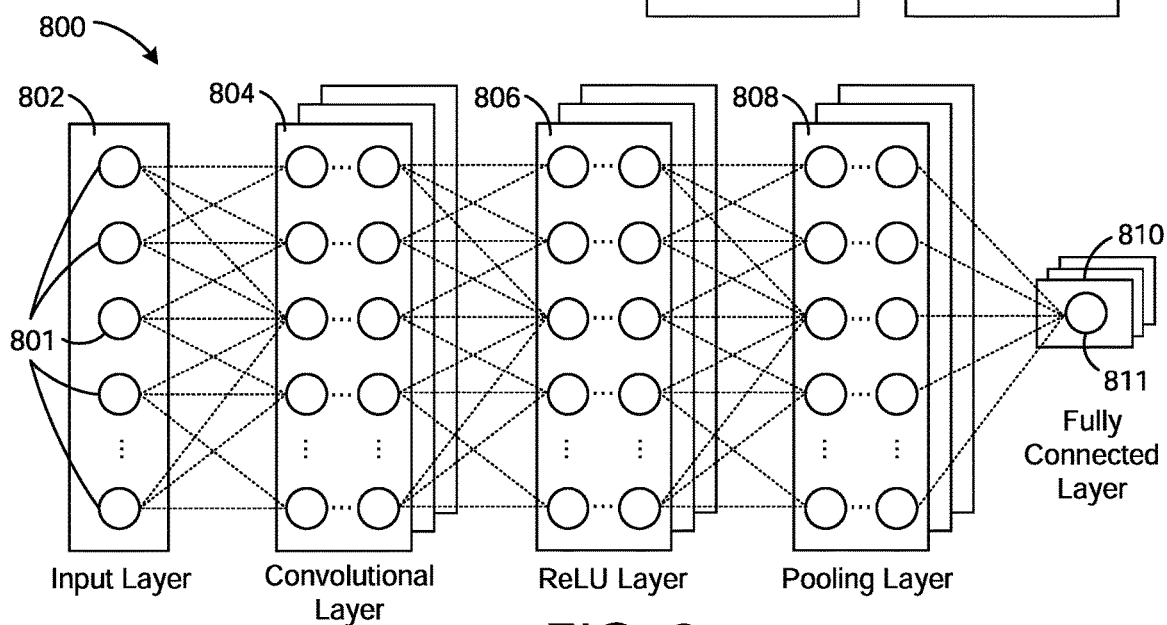
FIG. 8 is a drawing of a convolutional neural network (CNN) model which can be generated and used by the constraint generator of FIG. 7, according to some embodiments.

Referring now to FIG. 8, an example of a CNN 800 which can be generated and used by neural network modeler 706 is shown, according to an exemplary embodiment. CNN 800 is shown to include a sequence of layers including an input layer 802, a convolutional layer 804, a rectified linear unit (ReLU) layer 806, a pooling layer 808, and a fully connected layer 810 (i.e., an output layer). Each of layers 802-810 may transform one volume of activations to another through a differentiable function. Layers 802-810 can be stacked to form CNN 800. Unlike a regular (i.e., non-convolutional) neural network, layers 802-810 may have neurons arranged in 3 dimensions: width, height, depth. The depth of the neurons refers to the third dimension of an activation volume, not to the depth of CNN 800, which may refer to the total number of layers in CNN 800. Some neurons in one or more of layers of CNN 800 may only be connected to a small region of the layer before or after it, instead of all of the neurons in a fully-connected manner. In some embodiments, the final output layer of CNN 800 (i.e., fully-connected layer 810) is a single vector of class scores, arranged along the depth dimension.

In some embodiments, CNN 800 can be used to generate temperature bounds for a building zone (e.g., minimum and maximum allowable temperatures or temperature setpoints for the building zone). The temperature bounds can then be used by inequality constraint generator 708 and/or equality constraint generator 710 to generate and impose a temperature constraint for the predicted building zone temperature. In some embodiments, CNN 800 can be used to generate temperature bounds for a chilled water output produced by chillers of central plant 406 (e.g., minimum and maximum allowable temperatures of the chilled water output or chilled water setpoint). The temperature bounds can then be used by inequality constraint generator 708 and/or equality constraint generator 710 to generate and impose temperature constraints for the chilled water output or setpoint used by chillers of central plant 406. In some embodiments, CNN 800 can be used to generate temperature bounds for a hot water output produced by boilers or other hot water generators of central plant 406 (e.g., minimum and maximum allowable temperatures of the hot water output or hot water setpoint). The temperature bounds can then be used by inequality constraint generator 708 and/or equality constraint generator 710 to generate and impose temperature constraints for the hot water output or setpoint used by the boilers or other hot water generators of central plant 406. Although these specific examples are discussed in detail, it should be understood that CNN 800 can be used to generate values any other constraint on the optimization procedures performed by economic controller 610 and/or tracking controller 612.

Input layer 802 is shown to include a set of input neurons 801. Each of input neurons 801 may correspond to a variable that can be monitored by neural network modeler 706 and used as an input to CNN 800. For example, input neurons 801 may correspond to variables such as outdoor air temperature (OAT) (e.g., a temperature value in degrees F. or degrees C.), the day of the week (e.g., 1=Sunday, 2=Monday, . . . , 7=Saturday), the day of the year (e.g., 0=January 1st, 1=January 2nd, . . . , 365=December 31st), a binary occupancy value for a building zone (e.g., 0=unoccupied, 1=occupied), a percentage of occupancy for the building zone (e.g., 0% if the building zone is unoccupied, 30% of the building zone is at 30% of maximum occupancy, 100% of the building zone is fully occupied, etc.), a measured temperature of the building zone (e.g., a temperature value in degrees F. or degrees C.), operating data from building equipment 702 or central plant 406 (e.g., an operating capacity of an AHU that provides airflow to the building zone, a valve position of a flow control valve that regulates flow of the heated or chilled fluid through a heat exchanger, etc.), or any other variable that may be relevant to generating appropriate temperature bounds.

Convolutional layer 804 may receive input from input layer 802 and provide output to ReLU layer 806. In some embodiments, convolutional layer 804 is the core building block of CNN 800. The parameters of convolutional layer 804 may include a set of learnable filters (or kernels), which have a small receptive field, but extend through the full depth of the input volume. During the forward pass, each filter may be convolved across the width and height of the input volume, computing the dot product between the entries of the filter and entries within input layer 802 and producing a 2-dimensional activation map of that filter. As a result, CNN 800 learns filters that activate when it detects some specific type of feature indicated by input layer 802. Stacking the activation maps for all filters along the depth dimension forms the full output volume of convolutional layer 804. Every entry in the output volume can thus also be interpreted as an output of a neuron that looks at a small region in input layer 802 and shares parameters with neurons in the same activation map. In some embodiments, CNN 800 includes more than one convolutional layer 804.

ReLU layer 806 may receive input from convolutional layer 804 and may provide output to fully connected layer 810. ReLU is the abbreviation of Rectified Linear Units. ReLu layer 806 may apply a non-saturating activation function such as $f(x)=\max(0, x)$ to the input from convolutional layer 804. ReLU layer 806 may function to increase the nonlinear properties of the decision function and of the overall network without affecting the receptive fields of convolutional layer 804. Other functions can also used in ReLU layer 806 to increase nonlinearity including, for example, the saturating hyperbolic tangent $f(x)=\tanh(x)$ or $f(x)=|\tanh(x)|$ and the sigmoid function $f(x)=(1+e^{-x})^{-1}$. The inclusion of ReLU layer 806 may cause CNN 800 to train several times faster without a significant penalty to generalization accuracy.

Pooling layer 808 may receive input from ReLU layer 806 and provide output to fully connected layer 810. Pooling layer 808 can be configured to perform a pooling operation on the input received from ReLU layer 806. Pooling is a form of non-linear down-sampling. Pooling layer 808 can use any of a variety of non-linear functions to implement pooling, including for example max pooling. Pooling layer 808 can be configured to partition the input from ReLU layer 806 into a set of non-overlapping sub-regions and, for each such sub-region, output the maximum. The intuition is that the exact location of a feature is less important than its rough location relative to other features. Pooling layer 808 serves to progressively reduce the spatial size of the representation, to reduce the number of parameters and amount of computation in the network, and hence to also control overfitting. Accordingly, pooling layer 808 provides a form of translation invariance.

In some embodiments, pooling layer 808 operates independently on every depth slice of the input and resizes it spatially. For example, pooling layer 808 may include filters of size 2×2 applied with a stride of 2 down-samples at every depth slice in the input by 2 along both width and height, discarding 75% of the activations. In this case, every max operation is over 4 numbers. The depth dimension remains unchanged. In addition to max pooling, pooling layer 808 can also perform other functions, such as average pooling or L2-norm pooling.

In some embodiments, CNN 800 includes multiple instances of convolutional layer 804, ReLU layer 806, and pooling layer 808. For example, pooling layer 808 may be followed by another instance of convolutional layer 804, which may be followed by another instance of ReLU layer 806, which may be followed by another instance of pooling layer 808. Although only one set of layers 804-808 is shown in FIG. 8, it is understood that CNN 800 may include one or more sets of layers 804-808 between input layer 802 and fully-connected layer 810. Accordingly, CNN 800 may be an "M-layer" CNN, where M is the total number of layers between input layer 802 and fully connected layer 810.

Fully connected layer 810 is the final layer in CNN 800 and may be referred to as an output layer. Fully connected layer 810 may follow one or more sets of layers 804-808 and may be perform the high-level reasoning in CNN 800. In some embodiments, output neurons 811 in fully connected layer 810 may have full connections to all activations in the previous layer (i.e., an instance of pooling layer 808). The activations of output neurons 811 can hence be computed with a matrix multiplication followed by a bias offset. In some embodiments, output neurons 811 within fully connected layer 810 are arranged as a single vector of class scores along the depth dimension of CNN 800.

In some embodiments, each of output neurons 811 represents a threshold value (e.g., a boundary value, a boundary range around a setpoint, etc.) which can be used to formulate a constraint on the optimization procedures performed by economic controller 610 and/or tracking controller 612. For example, one or more of output neurons 811 may represent temperature bounds for a building zone (e.g., minimum and maximum allowable temperatures or temperature setpoints for the building zone). The temperature bounds can be used by inequality constraint generator 708 and/or equality constraint generator 710 to generate and impose a temperature constraint for the predicted building zone temperature.

In some embodiments, one or more of output neurons 811 represent temperature bounds for a chilled water output produced by chillers of central plant 406 (e.g., minimum and maximum allowable temperatures of the chilled water output or chilled water setpoint). The temperature bounds can be used by inequality constraint generator 708 and/or equality constraint generator 710 to generate and impose temperature constraints for the chilled water output or setpoint used by chillers of central plant 406. Similarly, one or more of output neurons 8110 may represent temperature bounds for a hot water output produced by boilers or other hot water generators of central plant 406 (e.g., minimum and maximum allowable temperatures of the hot water output or hot water setpoint). The temperature bounds can be used by inequality constraint generator 708 and/or equality constraint generator 710 to generate and impose temperature constraints for the hot water output or setpoint used by the boilers or other hot water generators of central plant 406.

Referring again to FIG. 7, neural network modeler 706 can use various inputs to evaluate and score the constraints generated by CNN 800. Such inputs may include operating data from building equipment 702, operating data from central plant 406, and/or user input from user devices 704. In some embodiments, the user input from user devices 704 includes manual overrides, setpoint adjustments, manual values for parameters, or other input that describes user actions. Neural network modeler 706 can use the user input from user devices 704 to determine whether the operating state of building equipment 702 and/or central plant 406 at a given time was satisfactory or whether adjustment was required. Neural network modeler 706 can use these and other types of user input to identify how people react to the constraints generated by constraint generator 620 to determine which constraint values are desired.

For example, the output of CNN 800 may include temperature bounds for a building zone. The temperature bounds may specify that the temperature of the building zone is allowed vary within an allowable temperature range between a minimum zone temperature and a maximum zone temperature. Accordingly, predictive controller 420 may operate building equipment 702 and/or central plant 406 to ensure that the temperature of the building zone is maintained between the minimum zone temperature and the maximum zone temperature. To score the temperature bounds generated by constraint generator 620, neural network modeler 706 may inspect user input indicating a manual adjustment to the temperature setpoint for a building zone. In response to the manual setpoint adjustment, neural network modeler 706 may determine that the previous temperature setpoint (i.e., the temperature setpoint generated by predictive controller 420, prior to adjustment) was out of the desirable range.

In some embodiments, neural network modeler 706 uses the magnitude of the manual setpoint adjustment as an indication of the user's dissatisfaction with the temperature setpoint generated by predictive controller 420 based on the temperature constraints generated by constraint generator 620. For example, a manual setpoint adjustment having a large magnitude may indicate a large dissatisfaction with the temperature constraints generated by constraint generator 620 and therefore may result in a low performance score. A manual setpoint adjustment having a small magnitude may indicate a slight dissatisfaction with the temperature constraints generated by constraint generator 620 and therefore may result in a relatively higher performance score. The absence of a manual setpoint adjustment may indicate user satisfaction with the temperature constraints generated by constraint generator 620 and therefore may result in a high performance score.

As another example, the output of CNN 800 may include temperature bounds for the chilled water output by chillers of central plant 406. The temperature bounds may specify that the chilled water temperature (or temperature setpoint) is allowed to vary within an allowable temperature range between a minimum chilled water temperature and a maximum chilled water temperature. Accordingly, predictive controller 420 may operate the chillers of central plant 406 to ensure that the temperature of chilled water output (or temperature setpoint) is maintained between the minimum chilled water temperature and the maximum chilled water temperature.

To score the temperature bounds generated by constraint generator 620, neural network modeler 706 may use operating data from building equipment 702 to determine whether any heat exchangers are making full use of the chilled water. For example, the operating data from building equipment 702 may indicate the valve positions of flow control valves that regulate the flow of the chilled water through cooling coils or other heat exchangers. If the operating data indicates that a flow control valve is fully open, then that valve is making full use of the chilled water. Conversely, if the operating data indicates that none of the flow control valves are fully open, then none of the flow control valves are making full use of the chilled water (i.e., none of the heat exchangers require the full cooling capacity provided by the chilled water).

In some embodiments, neural network modeler 706 uses the positions of the flow control valves as an indication of whether the chilled water temperature constraints are good or bad. For example, if none of the valves are fully open, neural network modeler 706 may determine that the chilled water temperature setpoint can be increased to reduce the energy consumption of the chillers without impacting the cooling performance of building equipment 702. The chilled water temperature can be increased until at least one of the valves is fully open to make most efficient use of the chilled water. Accordingly, neural network modeler 706 can identify the valve that is closest to fully open and can determine the difference in position between the position of that valve (e.g., 60% open) and a fully open position (e.g., 100% open). A large difference in valve position may result in a low performance score, whereas a small difference in valve position may result in a high performance score. The same scoring technique can be applied to the hot water temperature bounds generated by constraint generator 620.

Inequality constraint generator 708 and equality constraint generator 710 can use the neural network model created by neural network modeler 706 to generate inequality constraints and equality constraints. Constraint generator 620 can provide the inequality constraints and equality constraints to economic controller 610 to constrain the optimization of the predictive cost function J performed by economic controller 610 to generate optimal power setpoints. Constraint generator 620 can also provide the inequality constraints and the equality constraints to tracking controller 612 to constrain the optimization performed by tracking controller 612 to generate optimal temperature setpoints.

In some embodiments, constraint generators 708-710 use the operating data from building equipment 702 to generate various functions that define the operational domain of building equipment 702. Similarly, the operating data from central plant 406 can be used to identify relationships between the inputs and outputs of each subplant of central plant 406 and/or each device of central plant 406. Constraint generators 708-710 can use the operating data from central plant 406 to generate various functions that define the operational domains of central plant 406.

In some embodiments, constraint generators 708-710 use the operating data from building equipment 702 and central plant 406 to determine limits on the operation of building equipment 702 and central plant 406. For example, a chiller may have a maximum cooling capacity which serves as a limit on the amount of cooling that the chiller can produce. Constraint generators 708-710 can use the operating data to determine the point at which the cooling provided by the chiller reaches its maximum value (e.g., by identifying the point at which the cooling output ceases to be a function of the load setpoint) in order to determine the maximum operating limit for the chiller. Similar processes can be used to identify the maximum operating points for other devices of building equipment 702 and central plant 406. These operating limits can be used by inequality constraint generator 708 to generate inequality constraints that limit the operation of building equipment 702 and central plant 406 within the applicable limits.

Figure 9:
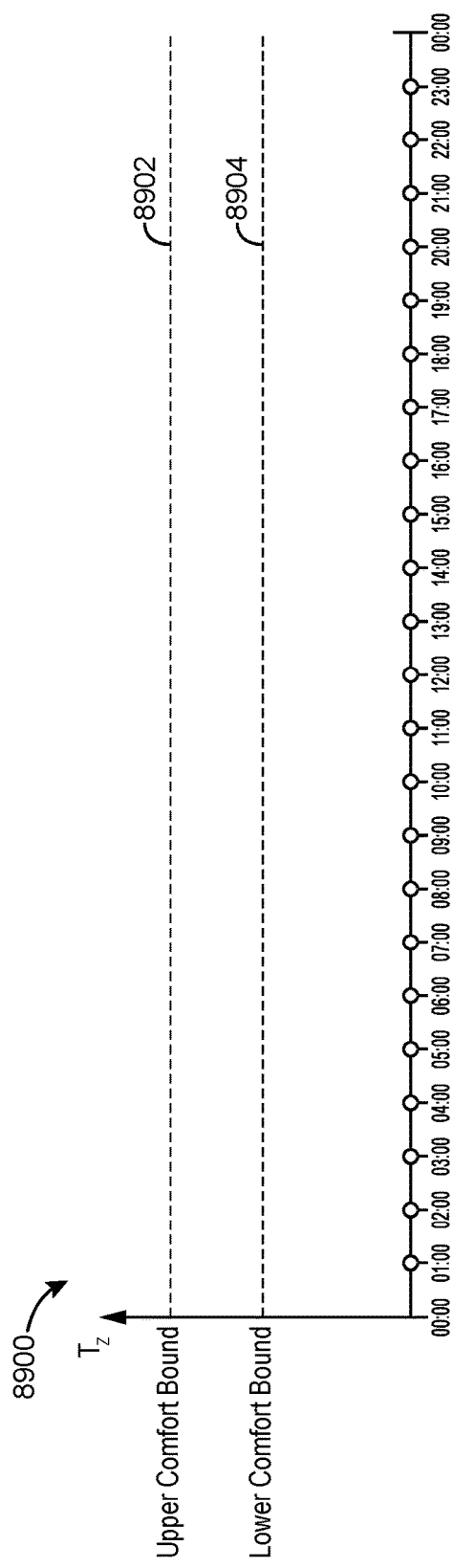
FIG. 9 is a graph illustrating fixed minimum and maximum comfort bounds that a zone may operate based on under a current MPC algorithm, according to some embodiments.

Referring now to FIG. 9, a graph 8900 illustrating fixed minimum and maximum comfort bounds that a zone may operate based on under a current MPC algorithm is shown, according to some embodiments. Graph 8900 is shown to include an upper bound 8902 and a lower bound 8904. As shown in graph 8900, the current MPC algorithm keeps values of upper bound 8902 and lower bound 8904 constant over time as MPC without integrated AI operates on fixed constraints for the whole day that it optimizes over.

Figure 10:
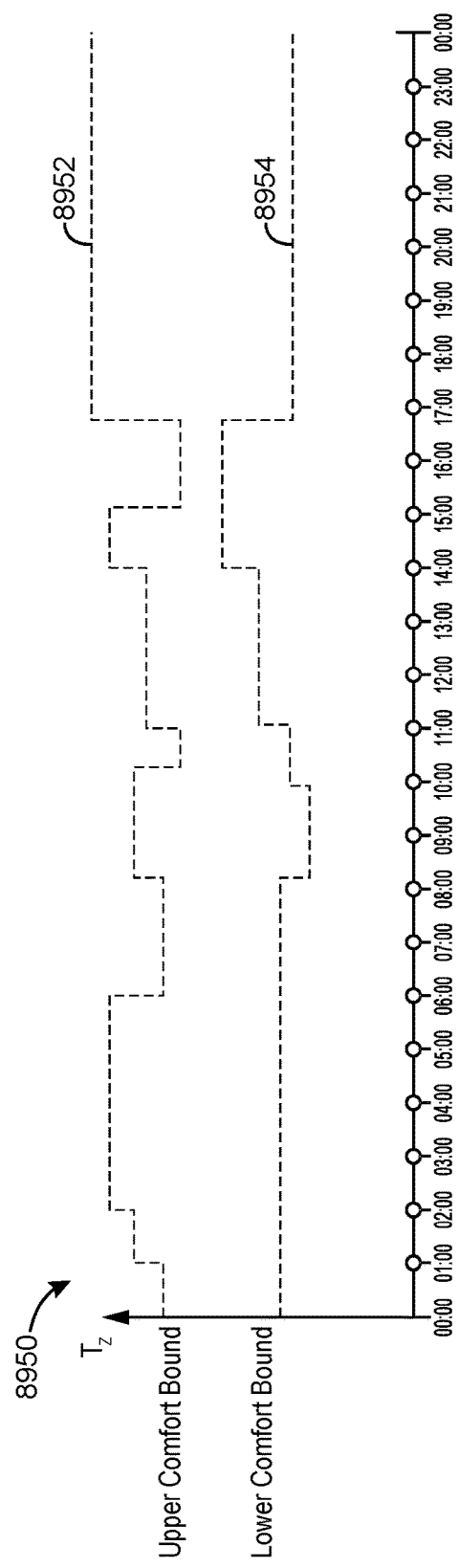
FIG. 10 is a graph illustrating benefits of integrating AI with MPC on the minimum and maximum comfort bounds of FIG. 9, according to some embodiments.

Referring now to FIG. 10, a graph 8950 illustrating benefits of integrating AI with MPC on the minimum and maximum comfort bounds of FIG. 9 is shown, according to some embodiments. Graph 8950 is shown to include an upper bound 8952 and a lower bound 8954. Upper bound 8952 and lower bound 8954 can illustrate varying MPC daily comfort constraints unlike the fixed MPC daily comfort constraints shown by upper bound 8902 and lower bound 8904 as described above with reference to FIG. 9. AI can prove useful in the problem of determining appropriate constraints for the MPC algorithm. By utilizing AI, constraints (e.g., minimum and maximum comfort bounds) can be found at a higher resolution, such as hourly constraints, thereby providing benefits for both financial savings and comfort.

By using AI, constraints can be learned from the preferences of occupants who occupy a controlled zone. This is done by learning the conditions that cause an occupant to change the setpoint in a zone. For example, if the occupant increases a current temperature in a space via a thermostat, said change may indicate that the current temperature is too cold for the occupant. In this way, the AI can learn the occupant's preferences and adjust lower bound 8954 and/or upper bound 8952 accordingly. Variable comfort constraints can provide benefits to both occupant comfort and financial savings as a range between lower bound 8954 and upper bound 8952 can be varied over time. In particular, at times when occupants are expected to be in the zone (e.g., during a workday), the range may be narrower to ensure occupant comfort is maintained in the zone. However, during times when occupants are not expected to be in the zone (e.g., during the night), the range may widen such that building equipment does not need to be operated as much, thereby reducing costs. In some embodiments, an additional 6-8 percent of savings can result from the addition of AI-driven time varying comfort bounds to MPC.

Figure 11:
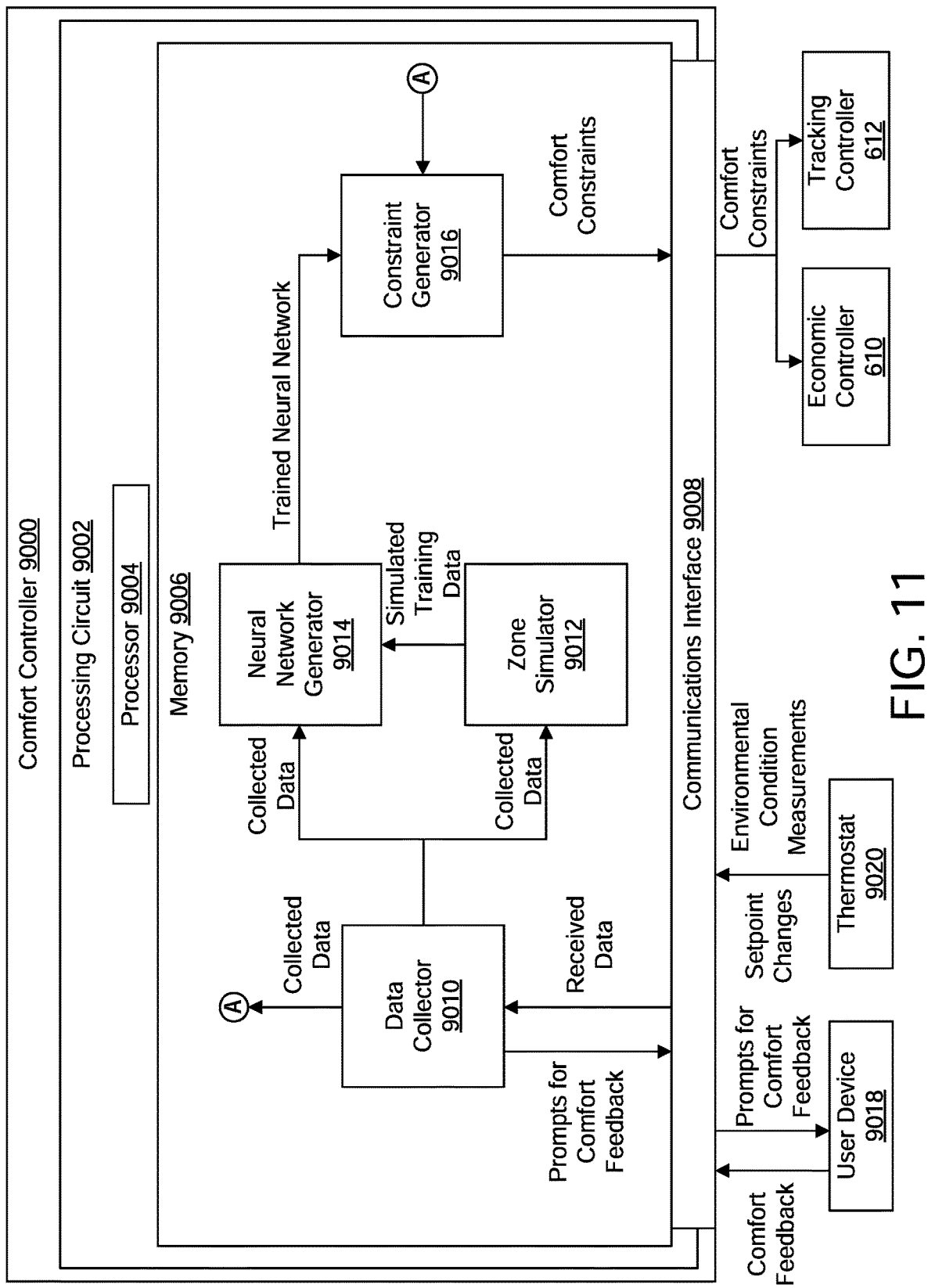
FIG. 11 is a comfort controller for generating comfort constraints for use in MPC, according to some embodiments.

Referring now to FIG. 11, a comfort controller 9000 for generating comfort constraints for use in MPC is shown, according to some embodiments. In some embodiments, comfort controller 9000 is an independent controller that can generate a neural network for quantifying occupant comfort in a zone of a building. In some embodiments, comfort controller 9000 and/or some and/or all of the components therein (e.g., data collector 9010, neural network generator 9014, etc.) are included in a separate controller.

As described in greater detail below, comfort controller 9000 can perform a zone simulation to generate data used to train a neural network. To appropriately structure a zone simulation, an occupant's comfort with regards to current zone conditions should be quantified. A predicted mean vote (PMV) index can be used as a measure of thermal comfort, and is the primary method used to assess comfort in the aforementioned zone simulation. PMV is adopted by the ISO 7730 standard. The ISO recommends maintaining PMV at level 0 with a tolerance of 0.5 as the best thermal comfort. PMV can be based on theoretical model and includes results from experimental results with approximately 1300 subjects and includes four variables: temperature T, relative humidity $\Phi$, mean radiant temperature $T_{rm}$, and air velocity v. The index may also include two individual parameters: metabolic rate M and cloth index $I_{cl}$. Based on the variables and parameters, the PMV can be calculated using Fanger's Equation as given by:

$$PMV = G(t_{bs}, \Phi, T_{rm}, v, M, I_{cl})$$

Ordinary values for metabolic rates and clothing insulation can be found in Tables 2 and 3 below.

TABLE 2

The Insulation Effect of Clothes

| Clothing | | Insulation clo (K · m² · W⁻¹) | m²K/W |
|---|---|---|---|
| Nude | | 0 | 0 |
| Underwear-pants | Pantyhose | 0.02 | 0.003 |
| | Panties | 0.03 | 0.005 |
| | Briefs | 0.04 | 0.006 |
| | Pants ½ long legs made of wool | 0.06 | 0.009 |
| | Pants long legs | 0.1 | 0.016 |
| Underwear - shirts | Bra | 0.01 | 0.002 |
| | Shirt sleeveless | 0.06 | 0.009 |
| | T-shirts | 0.09 | 0.014 |
| | Shirt with long sleeves | 0.12 | 0.019 |
| | Half slip in nylon | 0.14 | 0.022 |
| Shirts | Tube top | 0.06 | 0.009 |
| | Short sleeves | 0.09 | 0.029 |
| | Light blouse with long sleeves | 0.15 | 0.023 |
| | Light shirt with long sleeves | 0.2 | 0.031 |
| | Normal with long sleeves | 0.25 | 0.039 |
| | Flannel shirt with long sleeves | 0.3 | 0.047 |
| | Long sleeves with turtleneck blouse | 0.34 | 0.043 |
| Trousers | Shorts | 0.06 | 0.009 |
| | Walking shorts | 0.11 | 0.017 |
| | Light trousers | 0.2 | 0.031 |
| | Normal trousers | 0.25 | 0.039 |
| | Flannel trousers | 0.28 | 0.043 |
| | Overalls | 0.28 | 0.043 |
| Coveralls | Daily wear, belted | 0.49 | 0.076 |
| | Work | 0.5 | 0.078 |
| Highly insulating coveralls | Multi component with filling | 1.03 | 0.16 |
| | Fiber pelt | 1.13 | 0.175 |
| | Sleeveless vest | 0.12 | 0.019 |
| Sweaters | Thin sweater | 0.2 | 0.031 |
| | Long thin sleeves with turtleneck | 0.26 | 0.04 |
| | Thick sweater | 0.35 | 0.054 |
| | Long thick sleeves with turtleneck | 0.37 | 0.057 |
| Jacket | Vest | 0.13 | 0.02 |
| | Light summer jacket | 0.25 | 0.039 |
| | Smock | 0.3 | 0.047 |
| | Jacket | 0.35 | 0.054 |
| Coats and over jackets and over trousers | Overalls multi component | 0.52 | 0.081 |
| | Down jacket | 0.55 | 0.085 |
| | Coat | 0.6 | 0.093 |
| | Parka | 0.7 | 0.109 |
| Sundries | Socks | 0.02 | 0.003 |
| | Thin soled shoes | 0.02 | 0.003 |
| | Quilted fleece slippers | 0.03 | 0.005 |
| | Thick soled shoes | 0.04 | 0.006 |
| | Thick ankle socks | 0.05 | 0.008 |
| | Boots | 0.05 | 0.008 |
| | Thick long socks | 0.1 | 0.016 |

TABLE 2-continued

The Insulation Effect of Clothes

| | Clothing | Insulation clo (K·m²·W⁻¹) | m²K/W |
|---|---|---|---|
| Skirts, dresses | Light skirt 15 cm. above knee | 0.01 | 0.016 |
| | Light skirt 15 cm. below knee | 0.018 | 0.028 |
| | Heavy skirt knee-length | 0.25 | 0.039 |
| | Light dress sleeveless | 0.25 | 0.039 |
| | Winter dress long sleeves | 0.4 | 0.062 |
| Sleepwear | Under shorts | 0.1 | 0.016 |
| | Short gown think strap | 0.15 | 0.023 |
| | Long gown long sleeve | 0.3 | 0.047 |
| | Hospital gown | 0.31 | 0.048 |
| | Long pajamas with long sleeve | 0.5 | 0.078 |
| | Body sleep with feet | 0.72 | 0.112 |
| Robes | Long sleeve, wrap, short | 0.41 | 0.064 |
| | Long sleeve, wrap, long | 0.53 | 0.082 |

TABLE 3

Typical Met Levels for Various Activities (ASHRE 1997)

| Activity | Met |
|---|---|
| Seated, quiet | 1.0 |
| Reading and writing, seated | 1.0 |
| Typing | 1.1 |
| Filing, seated | 1.2 |
| Filing, standing | 1.4 |
| Walking at 0.9 m/s | 2.0 |
| House cleaning | 2.0-3.4 |
| Exercise | 3.0-4.0 |

Comfort controller 9000 is shown to include a communications interface 9008 and a processing circuit 9002. Communications interface 9008 may include wired or wireless interfaces (e.g., jacks, antennas, transmitters, receivers, transceivers, wire terminals, etc.) for conducting data communications with various systems, devices, or networks. For example, communications interface 9008 may include an Ethernet card and port for sending and receiving data via an Ethernet-based communications network and/or a WiFi transceiver for communicating via a wireless communications network. Communications interface 9008 may be configured to communicate via local area networks or wide area networks (e.g., the Internet, a building WAN, etc.) and may use a variety of communications protocols (e.g., BACnet, IP, LON, etc.).

Communications interface 9008 may be a network interface configured to facilitate electronic data communications between comfort controller 9000 and various external systems or devices (e.g., BMS 6706, central plant controller 6700, a user device 9018, etc.). For example, comfort controller 9000 may receive information from user device 9018 indicating an occupant setpoint change from an occupant.

Still referring to FIG. 11, processing circuit 9002 is shown to include a processor 9004 and memory 9006. Processor 9004 may be a general purpose or specific purpose processor, an application specific integrated circuit (ASIC), one or more field programmable gate arrays (FPGAs), a group of processing components, or other suitable processing components. Processor 9004 may be configured to execute computer code or instructions stored in memory 9006 or received from other computer readable media (e.g., CDROM, network storage, a remote server, etc.).

Memory 9006 may include one or more devices (e.g., memory units, memory devices, storage devices, etc.) for storing data and/or computer code for completing and/or facilitating the various processes described in the present disclosure. Memory 9006 may include random access memory (RAM), read-only memory (ROM), hard drive storage, temporary storage, non-volatile memory, flash memory, optical memory, or any other suitable memory for storing software objects and/or computer instructions. Memory 9006 may include database components, object code components, script components, or any other type of information structure for supporting the various activities and information structures described in the present disclosure. Memory 9006 may be communicably connected to processor 9004 via processing circuit 9002 and may include computer code for executing (e.g., by processor 9004) one or more processes described herein. In some embodiments, some components of memory 9006 are part of a single component. However, each component of memory 9006 is shown separately for ease of explanation.

Comfort controller 9000 is shown to receive setpoint changes from user device 9018 along with setpoint changes and environmental condition measurements from a thermostat 9020. Setpoint changes can be provided by an occupant to change a current operating setpoint of building equipment. Setpoint changes can indicate a user is uncomfortable in current conditions. For example, if a setpoint change indicates a higher temperature setpoint than a current temperature setpoint, the setpoint change may indicate the current temperature setpoint is too cold. User device 9018 can include any various device via which an occupant can provide setpoint changes. For example, user device 9018 may be a phone, a computer, a laptop, etc. In some embodiments, user device 9018 is the same as thermostat 9020. Thermostat 9020 is shown to provide setpoint changes and environmental condition measurements to comfort controller 9000. The environmental condition measurements can include various measurements of temperature, humidity, air quality, etc. of the zone and/or an external space. In some embodiments, the measurements are gathered by various sensors (e.g., temperature sensors, humidity sensors, etc.) in the zone and/or the external space. In some embodiments, comfort controller 9000 receives the measurements from the sensors separate and/or in addition to the measurements provided by thermostat 9020. It should be appreciated that user device 9018 and thermostat 9020 are shown for sake of example of sources from which comfort controller 9000 can receive information. Comfort controller 9000 can receive pertinent information for generating a neural network from any suitable device, service, etc.

Comfort controller 9000 is shown to include a data collector 9010. Data collector 9010 can collect received data from communications interface 9008. The received data can include setpoint changes, environmental condition measurements, etc. Data collector 9010 can provide the collected data to a neural network generator 9014 and/or a zone simulator 9012.

In order to achieve a sufficiently trained neural network to assist in determining zone constraints, there should first be enough data to learn from. The primary data that is necessary for training the neural network can include override data from a zone (i.e., the setpoint changes shown in FIG. 11). Collecting a large amount of real data for manual setpoint changes in a zone can be difficult. In particular, the amount of time needed to gather said data may take a long time (e.g., at least a year) before setpoint changes can be predicted, thereby resulting in slow implementation of MPC for a building. Additionally, gathering real data may include an assumption that all occupants in the zone actually choose to adjust the setpoint when uncomfortable. However, this may not always be the case as some occupants may not know how to change the setpoint, be too busy to change the setpoint, etc. As such, there may not be enough occupant overrides throughout each day to train the network.

Prompts for comfort feedback can be initiated by the data collector 9010 and transmitted to the user device 9018 via communications interface 9008. In other embodiments, an application executed locally on the user device 9018 can automatically generate prompts for the user to input comfort feedback. For example, a push notification (e.g., causing the user device to ring, buzz, light up, etc.) may be provided at the user device 9018 and the user may be provide with a graphical user interface asking the user (occupant) to provide feedback relating to the user's current comfort level in the space. For example, prompts may ask the user to provide input of whether they are too cold, too hot, or comfortable. In some embodiments, users are asked to input a number of degrees hotter or colder that they would like the space to be. By pushing prompts to the user device 9018, occupants may be compelled to provide more feedback as compared to passively awaiting user changes to a setpoint for the space, for example by overcoming occupant apathy, laziness, resignation to discomfort, or other factors that may keep uncomfortable occupants from changing the temperature setpoint.

In some embodiments, multiple user devices 9018 are included and associated with multiple occupants of a space. In such embodiments, prompting comfort feedback at the user devices 9018 results in receiving votes from multiple occupants regarding whether the building is comfortable at a given time. The occupants' comfort level may differ due to occupant personal preference, clothing selections, activity levels, location relative to windows, HVAC equipment, or other appliances, and various other factors. Polling multiple occupants via a voting application can generate data that reflects the comfort of many occupants. This approach may avoid a scenario where only a subset of occupants has access or authority to change a temperature setpoint, such that the preferences of other occupants is hidden. In some embodiments, by receiving comfort feedback from multiple occupants, training data can be tagged for particular occupants and one or more neural networks can be trained to allow the system to adapt to meet the preferences of the occupants that are actually present at any given time.

In some embodiments, the data collector 9010 may facilitate the generation or collection of sufficient data by executing an experiment to deliberate control the zone temperature to a variety of values, for example including uncomfortable temperatures. By exposing occupants to more environmental conditions, the user's response to such conditions may be recorded and represented in the training data collected at the data collector 9010. For example, a sequence of setpoints (e.g., a preprogrammed sequence, a random sequence (e.g., PBRS), a dynamic sequence that reacts to comfort feedback from a user) may be applied in order to test user comfort under varying conditions. By varying conditions while collecting comfort feedback via a user device 9018 or thermostat 9020, a rich set of data suitable for training the neural network may be collected at the data collector 9010.

In one embodiment of a comfort experiment which takes place over several days, a constant setpoint is provided over entire day with a different value for each day. During each day, occupant comfort is recorded (from direct user input of comfort feedback, from comfort feedback based on attempted setpoint changes by a user, etc.). Such an experiment can provide rich data indicative of how comfort varies over the course of each day even at constant temperature, and at the same time on different days at different temperatures.

In some embodiments, to provide for generation of sufficient training data, comfort controller 9000 can include a zone simulator 9012 to model the indoor conditions in a zone, given real outdoor air conditions. Based on the simulated conditions, typical occupant setpoint overrides can be simulated as well.

Using real past weather measurements for a particular site, zone simulator 9012 can produce indoor air conditions, including zone temperatures and zone humidity ratios, for a corresponding time period. For simplicity, only temperature and humidity ratio simulations may be used for learning comfort constraints. However, additional measurements and features can be added to the AI to increase accuracy and make the overall simulation more realistic.

Another important aspect of the zone simulation performed by zone simulator 9012 is a response of occupants to the indoor air temperature and humidity. In is sense, a four variable comfort control approach can be integrated to allow the simulator to detect whether or not certain occupants would be uncomfortable given current conditions. In some embodiments, the occupant simulation includes carbon dioxide generation and/or heat effects on the zone by occupants. The variables that occupant simulation may depend on include metabolic rate, clothing insulation, and the specific occupant's comfort preferences (in terms of the PMV index). Said conditions can be combined to determine whether or not an occupant is comfortable.

As described above, each occupant simulation performed by zone simulator 9012 can include the three variables indicated above: metabolic rate, clothing insulation, and comfort preferences. In some embodiments, the occupant simulations include less variables, different variables, and/or more variables than the three indicated above.

Metabolic rates can be determined by a metabolic schedule for a particular occupant. The metabolic schedule can be structured as a specified rate with a corresponding hour. This means that at an hour provided, the occupant may begin simulation at the rate provided. The metabolic rate may change at an hour mark if a new metabolic rate is specified at said hour mark. Both the metabolic rate and the hour may be random variables, as to provide a sense of randomness if populating the training data. Randomizing the variables can better capture changes in people as a person may not have the exact same metabolic rates at the exact same times every day.

Clothing insulation can be determined by outdoor air conditions. In particular, it may be assumed that a zone occupant would be dressed heavier on colder days, and lighter on warmer days. In general, the range should not vary enormously in the zone, but there should be a seasonal feature to clothing insulation.

Occupant comfort preferences can be described by a minimum and maximum PMV index at which the occupant is comfortable. In some embodiments, a general range for comfort is considered to be from −0.5 to 0.5, however, certain people prefer colder or warmer environments than others. As such, the range for comfort can vary depending on what occupants are in the zone. Due to the fluctuation in preference, the minimum and maximum PMV bounds can be custom for each occupant, and may both be random variables to account for natural variability.

If an occupant is uncomfortable, that is, the occupant's PMV value is outside of their comfort bounds, the occupant may want to override the setpoint (e.g., move the setpoint up or down). In detail, the metabolic rate, clothing insulation, and zone temperature and humidity simulations are fed into the PMV calculation performed by zone simulator 9012, which can output an index value for the occupant in question. The PMV index can be compared to the minimum and maximum PMV comfort bounds that describe the specific occupant's preferences. If the PMV value is below the minimum comfort bound, the occupant may increase the setpoint to a temperature that results in a PMV value within their comfort bounds. Similarly, if the PMV is above the maximum comfort bound, the occupant may decrease the setpoint to a temperature that results in a PMV value within their bounds. This process can be carried out in each time-step of the simulation performed by zone simulator 9012. Every time PMV is calculated, the instantaneous zone conditions can be used to determine an occupant's comfort.

At the top of every hour in the simulation, a new setpoint can be calculated for each occupant in the zone based on their comfort in the current zone conditions. It should be appreciated that new setpoints can be calculated at different increments of time other than an hour. For example, the new setpoints can be calculated every thirty minutes, every two hours, etc. The simulation can collect all of the individual setpoints and use them to output an overall setpoint for that hour. There are many different ways for the simulation to decide what the new setpoint should be. For example, a max or mean of all occupant setpoints can be calculated. As another example, determining the new setpoint can involve a sort of occupant priority, such as weighting the setpoints of certain occupants. For example, an owner of the building may have a higher priority (e.g., a higher weight) as compared to other employees of the building. At each hour (or other time increment) of the simulation performed by zone simulator 9012, the indoor air temperature setpoint can be changed by the mean of all setpoint overrides for that hour. The setpoint changes can recorded as data to be used for training the AI and provided to neural network generator 9014.

Based on received data (e.g., collected data and/or simulated training data), neural network generator 9014 can generate a neural network that can be used to predict setpoint changes. In particular, the AI can be used to determine hourly comfort constraints that will satisfy comfort bounds of occupants in a zone. As such, the neural network can be trained using real data collected by data collector 9010 and/or simulated training data generated by zone simulator 9012 to associate various environmental conditions with occupant comfort in the zone. The neural network generated by neural network generator 9014 can be various types of neural networks such as, for example, an MLP, an RBFNN, an RNN, an autoencoder neural network, etc. An example of the neural network generated by neural network generator 9014 is shown below with reference to FIG. 12. Neural network generator 9014 can provide the trained neural network to constraint generator 9016.

Based on the neural network received from neural network generator 9014, a combination of air conditions, occupant comfort data, and information describing the type of day can be fed into a neural network by constraint generator 9016. Based on the fed inputs, the neural network can output a change in a temperature setpoint that corresponds to a particular hour and/or some other unit of time.

Inputs to the neural network can include, for example, a time of day (e.g., a particular hour), season of the year, indoor air temperature, indoor humidity, information on the outdoor air conditions, etc. as received from data collector 9010. The outdoor air conditions can be described in multiple formats.

To determine the change in the temperature setpoint, one potential method is to use a separate neural network to classify a day based on outdoor air conditions. Said classification label can be fed into the neural network for setpoint change prediction to represent the outdoor air conditions for a given day. An example of the classification can be performed by neural network generator 9014 and constraint generator 9016 as follows. To perform the classification, neural network generator 9014 may, for simplicity, assume the only parameters being classified are temperature and humidity. The neural network can label days as a combination of sets. For example, the sets to be combined can be given as: {Extremely Hot, Hot, Normal, Cold, Extremely Cold} and {Extremely Humid, Humid, Normal, Dry, Extremely Dry}. Based on the sets, constraint generator 9016 can feed conditions into the separate neural network to generate classifications to use in the primary neural network (i.e., the neural network that predicts the change in temperature setpoint). For example, a particular day may be labeled as {Hot, Extremely Dry} whereas another day may be labeled as {Extremely Cold, Dry} as based on data fed into the separate neural network. Said labels can be provided to the primary neural network to predict the setpoint changes for the associated days.

Another potential method for predicting setpoint changes is to directly input outdoor air measurements into the neural network for predicting setpoint changes. For example, the neural network described below with reference to FIG. 12 can use said measurements as input. Based on the outdoor air measurements, the neural network can output the predicted change in the setpoint for a specific hour (or some other unit of time). The change in setpoint can be based upon the mean setpoint changes made by all the occupants currently in the zone. The neural network may, therefore, be a solving a problem of regression rather than classification.

It should be appreciated that both methods may provide the neural network with learnable information on how the conditions will affect the preferences of the occupants present in the zone.

With the trained neural network for predicting hourly setpoint changes (or setpoint changes for some other increment of time), the hourly comfort constraints can be determined with some post-processing. For a given day, the constraints can be found by iterating over each hour and sweeping the zone temperature to find minimum and maximum bounds for each hour. More specifically, a zone temperature range can be chosen (e.g., 15° C. to 30° C., 20° C. to 31° C., etc.), and for each hour, the trained neural network can predict the change in setpoint for that hour at each of the zone temperatures in the chosen range. For a specific hour, the minimum bound can be the lowest temperature at which the neural network predicts a setpoint change of zero. Likewise, the maximum bound can be the highest temperature at which the network predicts a change of zero. This process can result in hourly comfort constraints that can be used in the MPC algorithm. As such, constraint generator 9016 can provide the comfort constraints to the economic controller 610 and/or the tracking controller 612 via communications interface 9008, so that MPC can be performed subject to the comfort constraints via the economic controller 610 and the tracking controller 612. In some embodiments, if constraint generator 9016 and/or other components of comfort controller 9000 are part of predictive controller 420 (e.g., provided with the constraint generator 620 as in the embodiment of FIG. 6). In various embodiments, the comfort constraints can be used by a different component of predictive controller 420 for performing MPC. In other embodiments, the comfort constraints are used to constrain a predictive control process at a central plant controller, for example a central plant controller described in further detail in U.S. Provisional Application No. 62/489,975 filed Apr. 25, 2017, the entire disclosure of which is incorporated by reference herein and to which the present application claims priority. Equipment is thereby controlled in accordance with the comfort constraints generated using the trained neural network.

Figure 12:
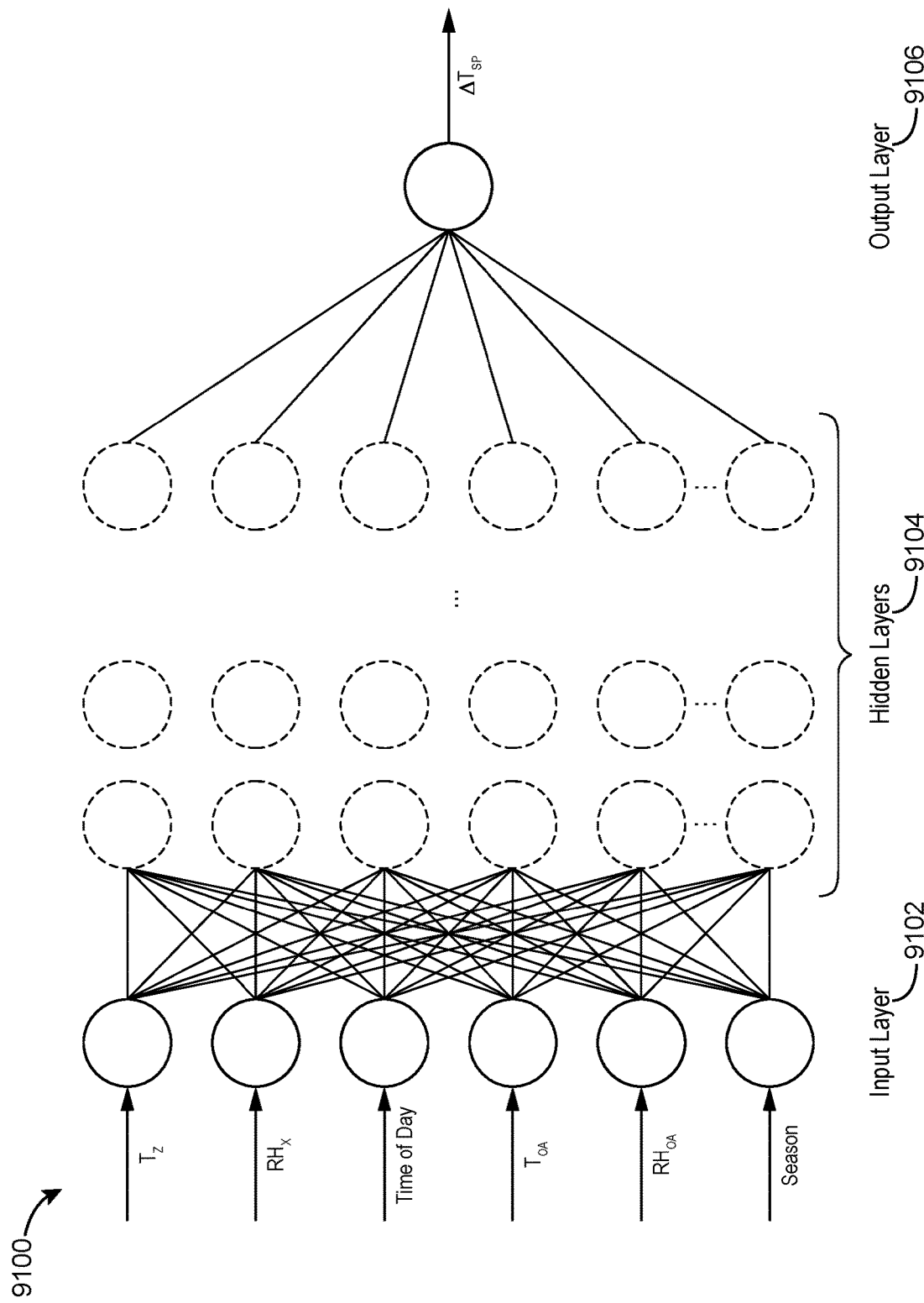
FIG. 12 is an illustration of a first neural network model for predicting changes in setpoints, according to some embodiments.

Referring now to FIG. 12, an illustration 9100 of a neural network model for predicting changes in setpoints is shown, according to some embodiments. In some embodiments, the neural network model of illustration 9100 is generated by neural network generator 9014 described above with reference to FIG. 11. The neural network model of illustration 9100 is shown to include an input layer 9102, a hidden layer(s) 9104, and an output layer 9106. Input layer 9102 is shown to include multiple input neurons. Each input neuron can be associated with a different variable representing a time of day, environmental conditions, etc. In particular, the input neurons are shown to receive values of a zone temperature $T_z$, a zone relative humidity $RH_z$, a time of day, an outdoor air temperature $T_{oa}$, an outdoor relative humidity $RH_{oa}$, and a season. It should be appreciated that said variables are shown for sake of example. The neural network can receive various inputs that are relevant to generate a predicted setpoint change. The neural network shown in illustration 9100 uses raw outdoor air measurements to describe outdoor air conditions.

The neural network of illustration 9100 is also shown to include hidden neurons in hidden layer(s) 9104. Depending on the type of neural network utilized, hidden layer(s) 9104 may include various numbers of hidden layers and/or various numbers of hidden neurons therein. For example, hidden layer(s) 9104 of a first neural network may include only one hidden layer with a particular number of hidden neurons, whereas hidden layer(s) 9104 of a second neural network may include more than one hidden layer, each layer having a particular number of hidden neurons. To train weights of the hidden neurons, the neural network of illustration 9100 can undergo supervised learning and training off of a dataset of setpoint changes that correspond to input data for a particular hour. In order to train the network, however, a large amount of data may be required. While gathering a sufficient amount of outdoor and indoor air measurements may be possible, gathering a sufficient amount of setpoint change output data may not be possible in a reasonable amount of time. It may be difficult to gather accurate data for this purpose, and it would also take an unreasonable amount of time to create a robust dataset. Because of said difficulty and as described above with reference to FIG. 11, the neural network can be generated based on a simulation framework set up to populate an occupant temperature override dataset.

The trained neural network can output a value of the predicted setpoint change $\Delta T_{sp}$. As described in greater detail above with reference to FIG. 11, $\Delta T_{sp}$ can be used to generate comfort constraints used in MPC.

Figure 13:
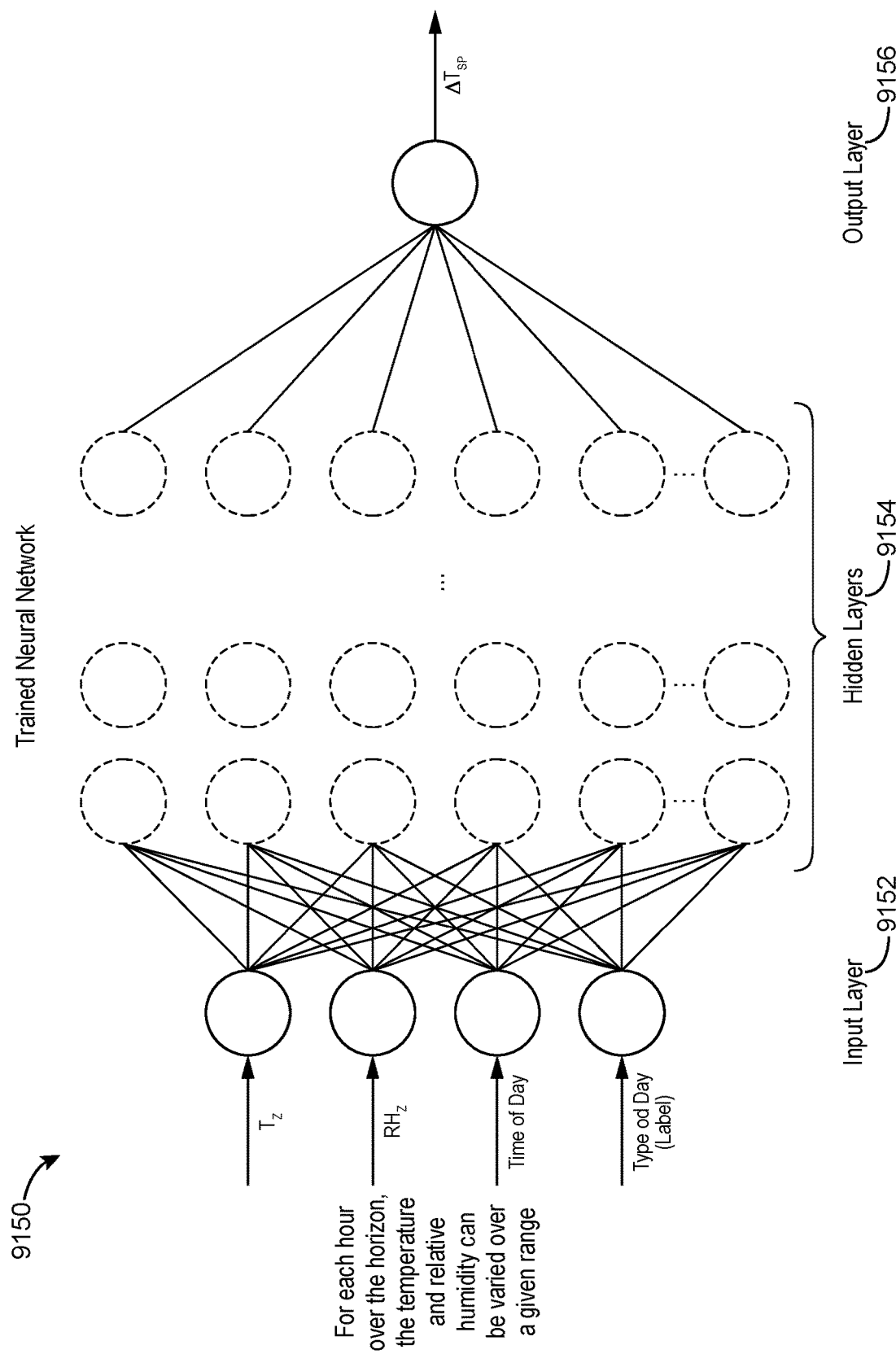
FIG. 13 is an illustration of a second neural network model for predicting changes in setpoints, according to some embodiments.

Referring now to FIG. 13, an illustration 9150 of another embodiment of a neural network is shown, according to an exemplary embodiment. In particular, FIG. 13 shows an embodiment where input layer 9152 receives inputs including a zone temperature $T_z$, a zone relative humidity $RH_z$, a time of day, and a type-of-day (day-type). The type-of-day is provided in FIG. 13 in place of the season and outdoor air conditions used in the embodiment of FIG. 12. The type-of-day may be a proxy for what an occupants may be wearing in the space, user activity in the space, a number of occupants in the space, and other factors than may influence occupant comfort. For example, the type-of-day label may indicate if the day is a work day, a weekend day, a holiday, which season the day is in, an outdoor condition for that day (e.g., hot day, humid day, cold day, rainy day, snowy day, etc.). A separate neural network classifier or other program logic may be included to generate the day-type based on raw data and provide the type-of-day label to the input layer 9152.

As for the embodiment of FIG. 12, the neural network of illustration 9150 includes hidden layers 9154. Different numbers of hidden layers 9154 may be included in various embodiments, and may be configured as described above with reference to FIG. 12 (adapted to work with the input layer 9152 of FIG. 13). The neural network of illustration 9150 can be trained to provide, at the output layer 9106, a value of the predicted setpoint change $\Delta T_{sp}$ for a given zone temperature, a zone relative humidity, a time of day, and a type-of-day.

Figure 14:
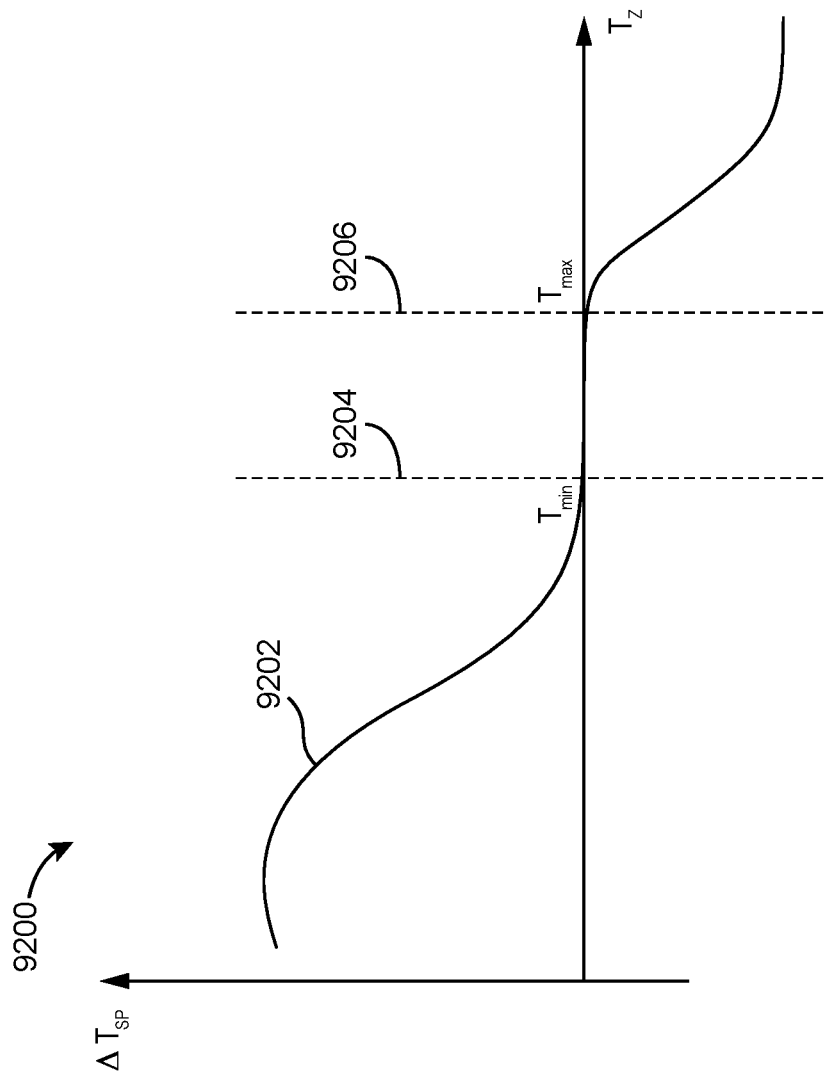
FIG. 14 is a graph illustrating sweeping of a zone temperature to determine comfort constraints, according to some embodiments.

Referring now to FIG. 14, a graph 9200 illustrating sweeping of a zone temperature to determine comfort constraints is shown, according to some embodiments. Graph 9200 is shown to include a series 9202 used to determine values of comfort constraints. Series 9202 can associate values of $\Delta T_{sp}$ with $T_z$. To determine a lower bound of the comfort constraints, series 9202 can be swept until a change in $\Delta T_{sp}$ of zero is reached. As shown in series 9202 reaches zero at a lower bound 9204 that can define the lower bound of the comfort constraints. To identify the upper bound of the comfort constraints, series 9202 can continue to be swept past lower bound 9204 until series 9202 diverges from a $\Delta T_{sp}$ value of zero. As shown in graph 9200, said value can be determined as an upper bound 9206. In this way, lower bound 9204 and upper bound 9206 can define values of $T_{min}$ and $T_{max}$ to be used as comfort constraints in MPC.

Figure 15:
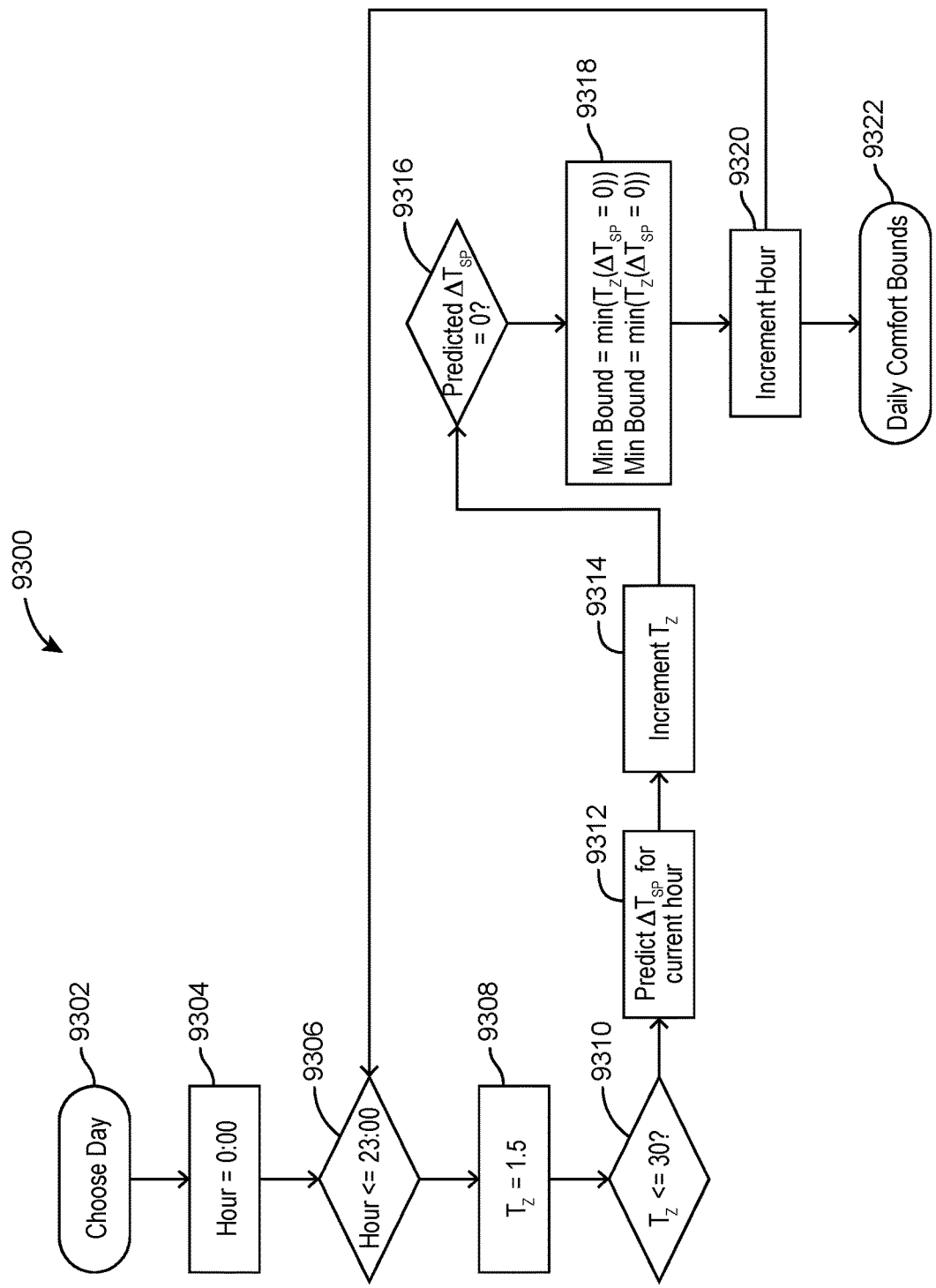
FIG. 15 is a process for determining hourly comfort constraints, according to some embodiments.

Referring now to FIG. 15, a process 9300 for determining hourly comfort constraints is shown, according to some embodiments. By performing process 9300, comfort constraints can be generated for use in MPC. In general, process 9300 can result in an upper bound and a lower bound being generated for temperature. It should be appreciated, however, that process 9300 can be performed to generate constraints for other conditions such as relative humidity. Further, process 9300 can be augmented to use different increments of time other than an hour as shown. In some embodiments, some and/or all steps of process 9300 are performed by constraint generator 9016 and/or another component of comfort controller 9000 as described above with reference to FIG. 11.

Process 9300 is shown to include choosing a day (step 9302). The day selected in step 9302 can indicate a day of the week (e.g., a weekday or a weekend). The selected day can be used to predict various information such as an amount of occupants expected to be present in an associated zone. For example, a day on a weekend may be associated with fewer occupants as compared to a weekday. In some embodiments, step 9302 is performed by constraint generator 9016.

Process 9300 is shown to include setting an hour variable to midnight (step 9304). Midnight (i.e., 0:00) can function as a starting point for the day to which incremental setpoint changes can be determined. In some embodiments, a different starting point is set as the hour variable instead of midnight. If a different starting point is used, the process can instead extend for twenty-four hours from the different starting point. In some embodiments, step 9304 is performed by constraint generator 9016.

Process 9300 is shown to include a determination of if the hour variable is less than or equal to 23:00 (step 9306). As 23:00 is an hour before midnight of a next day, the process should not continue if the hour variable is beyond 23:00, otherwise process 9300 may extend into a following day. As such, if the determination is that the hour variable is greater than 23:00, process 9300 may end. If the determination is that the hour variable is less than or equal to 23:00, process 9300 can continue to step 9308. In some embodiments, step 9306 is performed by constraint generator 9016.

Process 9300 is shown to include setting a zone temperature variable to 15° C. (step 9308). It should be appreciated that 15° C. is used for sake of example. The zone temperature variable can be set to other starting points (e.g., 14° C., 16° C., 18° C., etc.). Further, other temperature scales (e.g., Fahrenheit, Kelvin, etc.) can be used instead of Celsius. In some embodiments, the zone temperature variable is initially set to a temperature that is predicted to be less than a minimum zone temperature that may result in $\Delta T_{sp}=0$. In some embodiments, step 9308 is performed by constraint generator 9016.

Process 9300 is shown to include a determination of if the zone temperature variable is less than or equal to 30° C. (step 9310). Similar to step 9308, 30° C. is used for sake of example. In some embodiments, the value used for reference in step 9310 can be set to a value expected to be greater than a maximum zone temperature that results in $\Delta T_{sp}=0$. In some embodiments, step 9310 is performed by constraint generator 9016.

Process 9300 is shown to include predicting $\Delta T_{sp}$ for a current hour (step 9312). Step 9312 can include using a trained neural network to predict the setpoint change based on zone conditions. In other words, the zone conditions can be input to the neural network to predict a value of $\Delta T_{sp}$ for the current hour. In some embodiments, step 9312 is performed by constraint generator 9016.

Process 9300 is shown to include incrementing $T_z$ (step 9314). $T_z$ can be incremented by various increment values (e.g., 0.5, 1.0, 1.5, etc.). The incremental value can be set that $T_z$ does not exceed the maximum zone temperature that results in $\Delta T_{sp}=0$ too far (if at all). After incrementing $T_z$, process 9300 can repeat step 9310 and continue to step 9316. In this way, $\Delta T_{sp}$ can be predicted for multiple values of $T_z$ to determine approximate values of the minimum and maximum comfort bounds. In some embodiments, step 9314 is performed by constraint generator 9016.

Process 9300 is shown to include a determination of the predicted value of $\Delta T_{sp}=0$ (step 9316). If the determination in step 9316 is that $\Delta T_{sp} \neq 0$, process 9300 may end for a current increment of $T_z$. If the determination in step 9316 is that $\Delta T_{sp}=0$, process 9300 can continue to step 9318. In some embodiments, step 9316 is performed by constraint generator 9016.

Process 9300 is shown to include setting values of a minimum and a maximum comfort bound (step 9318). In particular, the minimum comfort bound can be set to:

$$T_{min}=\min(T_z(\Delta T_{sp}=0))$$

where $T_{min}$ is the minimum comfort bound. Further, the maximum comfort bound can be set to:

$$T_{max}=\max(T_z(\Delta T_{sp}=0))$$

where $T_{max}$ is the maximum comfort bound. By incrementing $T_z$ and applying it to the neural network to get $\Delta T_{sp}$ for each iteration of incrementing $T_z$ values of $\Delta T_{sp}$ for multiple values of $T_z$ are found, and then can be used to find where $\Delta T_{sp}$ changes from zero to non-zero. In this way, can be set to a minimum value of the zone temperature where the change in the predicted setpoint is zero, whereas $T_{max}$ can be set to a maximum value of the zone temperature where the change in the predicted setpoint is zero. In some embodiments, step 9318 is performed by constraint generator 9016.

Process 9300 is shown to include incrementing the hour variable (step 9320). The hour variable can be incremented by one hour based on which process 9300 can repeat starting at step 9306 with the incremented hour variable as well as continue to step 9322. In some embodiments, the hour variable is incremented by a different value depending on a resolution desired for values of $T_{min}$ and $T_{max}$. In general, as the desired resolution increases, the incremental value may decrease. In some embodiments, step 9320 is performed by constraint generator 9016.

Process 9300 is shown to include outputting the daily comfort bounds (step 9322). The outputted daily comfort bounds can be used to perform MPC such that MPC decisions do not result in occupant comfort violations. In some embodiments, step 9322 is performed by constraint generator 9016.

Referring now to FIG. 16, a flowchart of a process 1600 for training a neural network to predict comfort or discomfort of occupants of a building is shown, according to an exemplary embodiment. Process 1600 can be executed by the comfort controller 9000 in various embodiments.

At step 1602, one or more occupants are exposed to a first set of environmental conditions of a building. For example, building equipment may be controlled to provide the environmental conditions at the building. In some embodiments, step 1602 includes performing an experiment whereby the first set of environmental conditions is generated outside of normal operation of the equipment (e.g., using a random setpoint, using a setpoint schedule defined for the experiment) to deliberately test the occupants' reaction to the first set of environmental conditions.

At step 1604, the one or more occupants are prompted for comfort feedback. In some embodiments, prompting the one or more occupants for comfort feedback includes providing graphical user interfaces on user devices (e.g., smartphones, personal computers) of occupants of the building which include options for the users to provide structured feedback. In some embodiments, the prompts are provided as part of a mobile application for occupants a building, for example the Companion App by Johnson Controls. In other embodiments, for example in an office context, prompts can be automatically provided on user's computer workstations (e.g., desktop computers).

In some examples of step 1604, a user may be provided with an option in a graphical user interface to indicate that the user is hot, cold, or comfortable. As another example, the user may be prompted to indicate the user's perception of how far (e.g., a number of degrees Celsius or Fahrenheit, a subjective scale) the user is from comfort. The user can be prompted for feedback 1604 during a training period for a neural network, after which time such prompts can be stopped to allow for automatic comfort prediction as described herein.

In other embodiments, step 1604 includes providing prompts via a thermostat or a dedicated comfort feedback device positioned in the building. For example, a comfort feedback device may be provided in a space with three buttons representing hot, comfortable, and cold, such that occupants can easily provide simple comfort feedback. As another example, step 1604 may include allowing a user to input temperature setpoint changes via a thermostat or a mobile app.

At step 1606, the comfort feedback is received from the user. The comfort feedback may be received at a database as digital information which can be associated with a time stamp and stored. The comfort feedback can be associated with data representing environmental conditions and other factors at the time that the comfort feedback was provided or for the day on which the comfort feedback was provided, for example indoor air temperature, outdoor air temperature, indoor relative humidity, outdoor relative humidity, weather, day type, etc. which can be used as time-varying inputs.

At step 1608, a neural network is trained using the comfort feedback and one or more time-varying inputs to the neural network. The neural network may be trained to predict the comfort feedback given the one or more time-varying inputs, for example indoor air temperature, outdoor air temperature, indoor relative humidity, outdoor relative humidity, weather, day type.

In some embodiments, the neural network is trained to predict a temperature setpoint change $\Delta T_{sp}$ that occupants would request if subjected to the conditions defined by the set of input values. This represents a prediction of occupant comfort, where $\Delta T_{sp}=0$ if the occupants are predicted to be comfortable, $\Delta T_{sp}<0$ represents that the occupants are predicted to be too hot, and $\Delta T_{sp}>0$ represents that the occupants are predicted to be too cold. The neural network is thereby trained to predict whether the occupant will be comfortable (which amounts to a prediction of whether the occupant will be uncomfortable).

In the embodiment shown, a single neural network is trained using the comfort feedback from the multiple occupants, for example such that the comfort prediction represents a composite reaction of the multiple occupants. For example, a prediction of $\Delta T_{sp}=0$ may represent that a vote/pool conducted of the multiple occupants would have a winner of $\Delta T_{sp}=0$ (e.g., majority pick $\Delta T_{sp}=0$, an average change of approximately $\Delta T_{sp}=0$). In other embodiments, multiple, separate neural networks may be trained corresponding to the different occupants (or different subsets of the multiple occupants) based on comfort feedback from the specific, corresponding occupants. In such embodiments, each neural network may be trained to predict the comfort of that particular occupant (or subset of occupants). Predictions from multiple neural networks can then be combined for use in defining composite predictions, or selected between depending which occupants are present in a building at a given time, based on a hierarchy of the occupants that gives a first occupant's comfort priority over another occupant's comfort, or some other combination or conflict resolution approach.

Process 1600 thereby outputs a trained neural network for occupant comfort prediction, which can then be applied in a process 1700 for operating a building equipment using comfort predictions, for example as shown in FIG. 17 according to an exemplary embodiment. The process 1700 can be executed by the comfort controller 9000 in some embodiments. References to comfort predictions, predictions that an occupant will be comfortable, etc. herein should be understood as also encompassing the inverse, i.e., discomfort predictions, predictions that an occupant will be uncomfortable, etc., given certain input conditions. The language herein is meant to cover formulations and approaches that use any perspective (e.g., where an occupant is predicted to be comfortable and where an occupant is predicted to be not uncomfortable).

At step 1702, one or more time-varying inputs to the neural network are determined. The time-varying inputs may include measured or forecast values of outside air conditions, weather conditions, day types, etc. The time-varying inputs may also include a test indoor air temperature (or other value for an environmental condition), which can be used to predict occupant comfort given a selected indoor air temperature or temperature setpoint (or other condition), for example using the iterative process of described above with reference to FIG. 15. In embodiments where multiple neural networks are generated corresponding to different occupants or different subsets of occupants, step 1702 can include selecting the appropriate neural network (e.g., by determining which occupants are currently present or expected to be present based on data from an access system, security system, scheduling system, or other data source).

At step 1704, the time-varying inputs are applied to the neural network to determine one or more time-varying thresholds defining a range of values for an environmental condition of the building within which the one or more occupants are predicted to be comfortable. This is equivalent to and meant to encompass formulations where the thresholds are characterized as defining limits on values for an environmental condition of the building for which one or more occupants are predicted to be uncomfortable.

In some embodiments, step 1704 includes an iterative process as in FIG. 15, where a setpoint change for the environmental condition is predicted at the output layer of the neural network, and one or more controllable inputs (e.g., a setpoint for the environmental condition) are incremented to find the controllable inputs that correspond to points where the predicted setpoint change becomes non-zero. The predicted setpoint change can become non-zero when the input value for the environmental condition becomes too high or too low, thereby providing end points of a comfort range (or, seen equivalently with the opposing polarity, thresholds of a discomfort range). In some embodiments, only a single threshold value is determined dynamically by the neural network, for example a minimum value for the environmental condition or a maximum value for the environmental condition. In such embodiments, a static second threshold may be used to define a range, or any values on one side of the single threshold value can be considered comfortable values for the environmental condition (and, corresponding, values on the other side of the single threshold value considered uncomfortable values for the environmental condition). In some embodiments, additional arithmetic or processing is performed on determined thresholds (e.g., adding constant offsets, always setting at least a minimum gap between threshold values, etc.) without deviating from the scope of generating thresholds using outputs of the neural network.

In other embodiments, the neural network may be configured such that the output layer of the neural network directly provides minimum and maximum values for a range within which the occupants are predicted to be comfortable. In yet other embodiments, the neural network may be configured such that the output layer of the neural network provides a comfort value which is used to define the range as within a deadband around the comfort value.

At step 1706, setpoints are generated for building equipment by executing a predictive control process subject to constraints based on the one or more thresholds. The setpoints generated at step 1706 may include temperature setpoints, amounts of thermal energy to be consumed, stored, or provided by equipment, fan speeds, air flow rates, compressor frequencies, among other possibilities. The predictive control process may be a model predictive control process as described above. In some implementations of step 1708, the predictive control process be an asset allocation process for a central plant as described in in further detail in U.S. Provisional Application No. 62/489,975 filed Apr. 25, 2017, the entire disclosure of which is incorporated by reference herein and to which the present application claims priority.

Subject to the constraints based on the one or more thresholds, the model predictive control approach may be configured to ensure that a predicted value of the environmental condition stays between the thresholds, i.e., such that the occupants are predicted to be comfortable at the predicted value of the environmental condition. In other embodiments, the model predictive control approach may be configured to ensure that a setpoint for the environmental condition stays between the threshold, i.e., such that the occupants are predicted to be comfortable when the environmental condition has the setpoint value. The range of possible values between the two thresholds allows room for cost optimization, energy usage optimization, resource usage optimization, load shifting, etc. while constraining the environmental condition to values predicted to be comfortable to an occupant (or penalizing uncomfortable values for the environmental condition).

Step 1706 can include generating multiple setpoints for one environmental condition, for example a setpoint for each hour in a day-long optimization period. Step 1706 can also include generating setpoints for multiple different variables in various embodiments.

At step 1708, the building equipment is operated to drive the environmental condition toward the setpoints. For example, a control signal can be electronically transmitted from a controller to the equipment to cause the building equipment to operate in accordance with the control signal such that the environmental condition is driven towards the setpoint. Process 1700 can thereby result in the environmental condition being driven to a value which is predicted to be comfortable for occupants of the space while also providing for cost or energy optimization or other advantage associated with the predictive control process implemented in step 1706.

Discomfort Tolerance Adjustment

Referring generally to FIGS. 18-33, approaches are shown which manage a trade-off between occupant comfort and reduction of energy consumption by HVAC equipment. Achieving a high level of occupant comfort can require relatively high energy consumption. In contrast, when occupants are more tolerant to variation in building conditions (e.g., temperature or humidity fluctuations), more energy savings can be achieved while still satisfying occupants. Similarly, energy savings could be increased if an acceptable amount of discomfort is determined and used to increase the freedom of an energy optimization process. As detailed below, dynamically determining a discomfort tolerance and then predicting building conditions at which occupants will reach the discomfort tolerance can allow for generation of constraints on an energy optimization process that dynamically adapt to changing conditions, scenarios, and occupant preferences while ensuring freedom for the energy optimization process to achieve reductions in energy consumption and/or costs.

Figure 18:
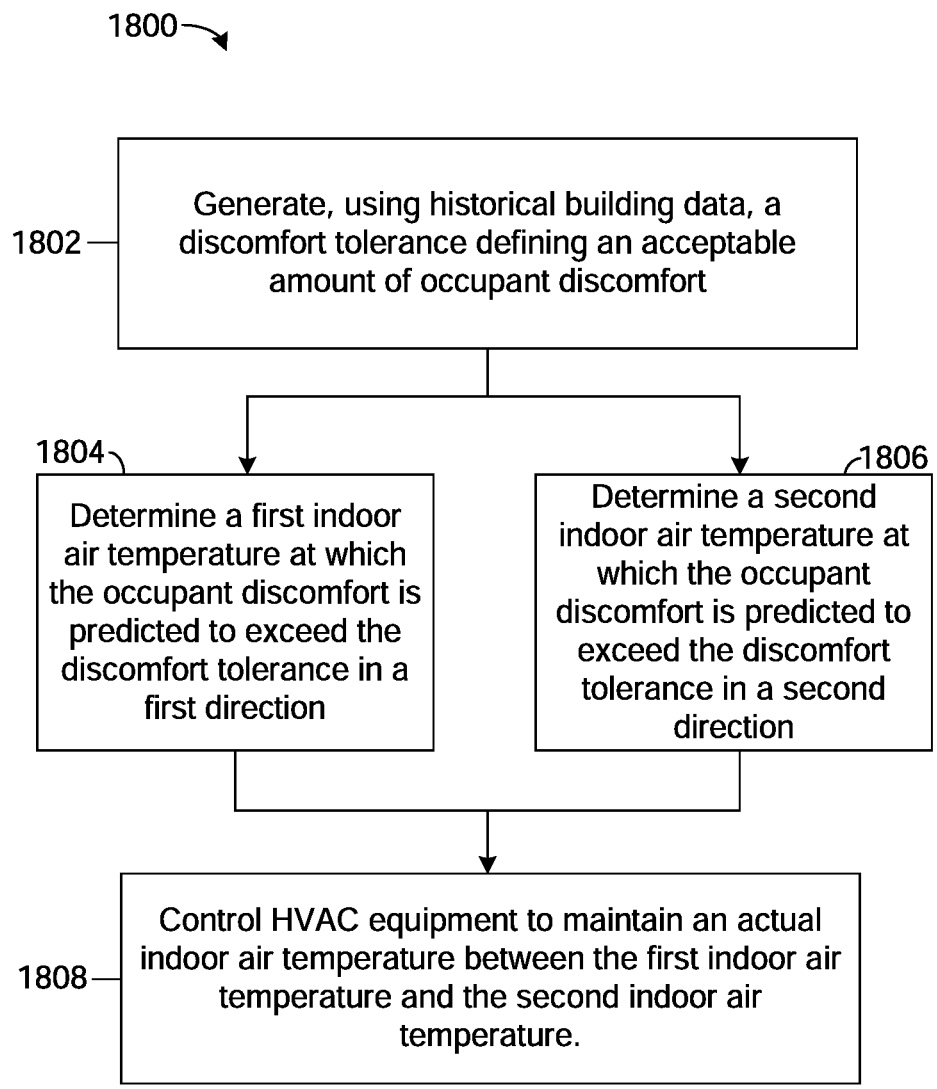
FIG. 18 is a flowchart of a process for controlling building equipment to avoid exceeding a discomfort tolerance for occupants, according to some embodiments.

Referring now to FIG. 18, a flowchart of a process 1800 for generating a discomfort tolerance and controlling HVAC equipment to avoid exceeding the discomfort tolerance is shown, according to an exemplary embodiment. Process 1800 can be executed by predictive controller 420, BMS controller 366, comfort controller 9000, or any of the other controllers, systems, or devices described herein in various embodiments.

At step 1802, a discomfort tolerance defining an acceptable amount of occupant discomfort is generated, for example using historical building data. The discomfort tolerance defines an amount of acceptable discomfort, for example, for one or more occupants of a building or zone of the building. The discomfort tolerance does not directly define a set of conditions (e.g., temperature values, humidity values, etc.) at which occupants would be comfortable or uncomfortable, but rather defines an amount that one or more conditions are allowed to deviate from comfortable levels before the occupants become unacceptably uncomfortable. For example, the discomfort tolerance may be quantified in degrees of temperature (e.g., Fahrenheit, Celsius) indicating a number of degrees away from comfort that is considered to be an acceptable amount of discomfort, without specifying what temperature is considered as being comfortable. For example, the discomfort tolerance may indicate that it is acceptable for an occupant to be up to X degrees colder than the occupant would prefer (e.g., the occupant would increase a temperature setpoint by X degrees) and/or up to Y degrees warmer than the occupant would prefer (e.g., the occupant would decrease a temperature setpoint by Y degrees) without needing to specify which temperature or range of temperatures that the occupant would prefer. The temperature the occupant would prefer can be a single temperature value (e.g., 72 degrees) or a temperature range (e.g., 68 degrees-76 degrees). In the case of a temperature range, the value of X may relate to the lower end of the temperature range and the value of Y may relate to the upper end of the temperature range. In this example, step 1802 includes generating the values of X and Y to define the discomfort tolerance as a range of acceptable expected setpoint changes. In other embodiments, the discomfort tolerance defined using another scale or scoring system (e.g., discomfort rated on a scale from 1-10, etc.) in various embodiments.

Figure 22:
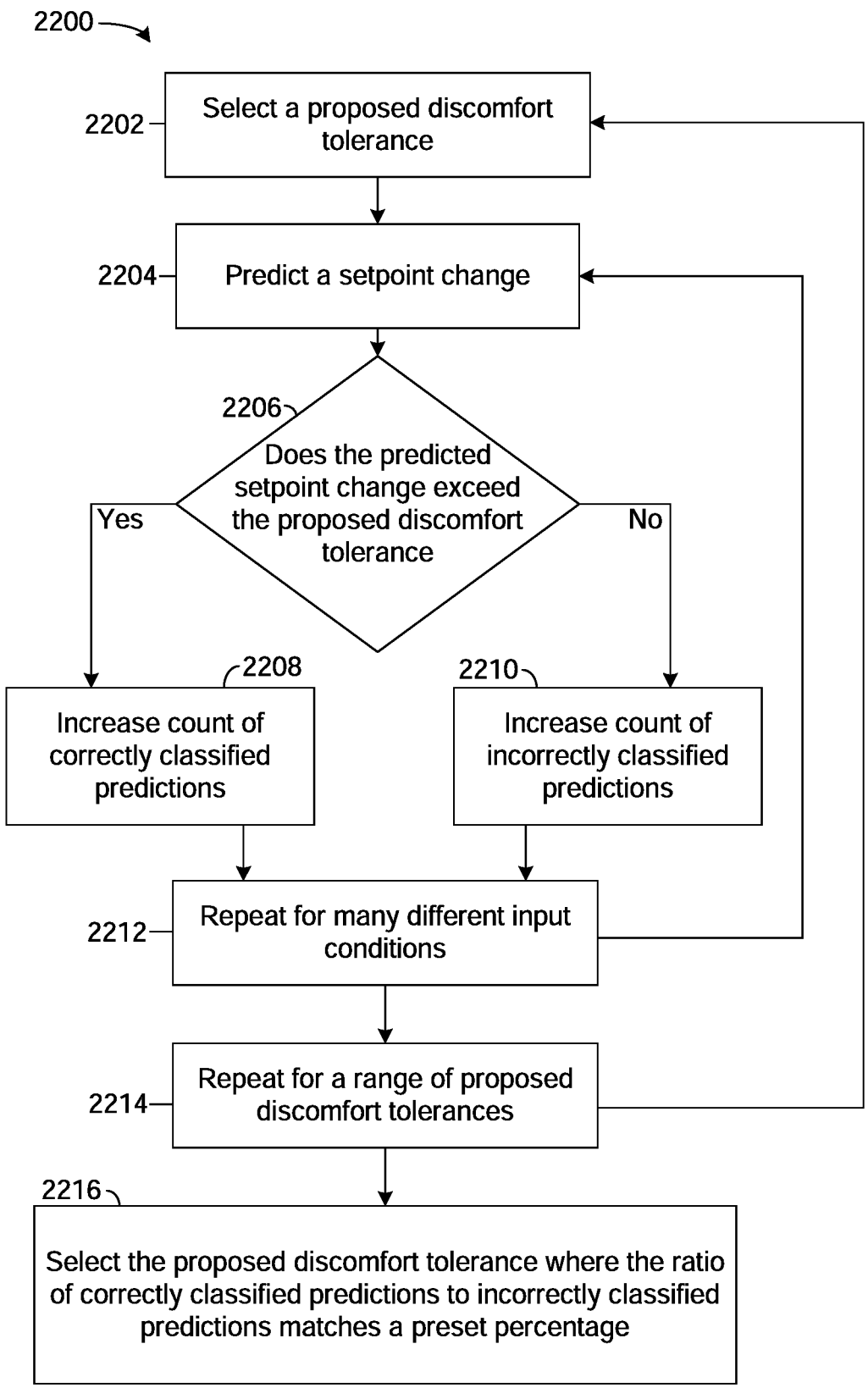
FIG. 22 is a flowchart of a process for dynamically defining a discomfort tolerance, according to some embodiments.

Generating the discomfort tolerance at step 1802 can be based on historical building data, for example including a history of occupant setpoint changes under varying building conditions (e.g., historical building data including one or more of occupant setpoint changes, indoor environmental conditions, outdoor environmental conditions (e.g., temperature, humidity, brightness, air quality, air speed, etc.)). The discomfort tolerance can be selected to achieve or optimize a predefined criterion. For example, the discomfort tolerance may be selected so that, based on the historical building data (or a model trained on the historical building data), a particular percentage of occupants would be considered to be uncomfortable at the boundaries of the discomfort tolerance, or so that a particular percentage of historical setpoint changes would have fallen inside the discomfort tolerance. The particular percentage can be predefined or may be selected by a building manager as a user input. Use of historical data in generating the discomfort tolerance can enable the discomfort tolerance to be adapted to a particular building and to actual occupants of a building, and to change over time as new data is collected and added to the historical data. A detailed process for generating the discomfort tolerance is shown in FIG. 22 and described in detail with reference thereto.

Once the discomfort tolerance is generated at step 1802, process 1800 proceeds to steps 1804 and 1806. At step 1804, a first value of an environmental condition, shown as a first indoor air temperature, at which the occupant discomfort is predicted to exceed the discomfort tolerance in the first direction is determined. The environmental condition may be humidity, air speed, lighting (e.g., brightness), etc. in other embodiments. The determination in step 1804 can be made using a predictive model configured to predict occupant discomfort, for example by predicting occupant setpoint changes (i.e., occupant requests to change the temperature of a space). For example, step 1804 can include predicting occupant discomfort for a plurality of indoor air temperatures and then evaluating the predictions to find the value of the indoor air temperature at which the predicted occupant discomfort exceeds the discomfort tolerance in a first direction. For example, step 1804 can include determining the temperature at which occupants become so cold that the discomfort threshold is exceeded.

At step 1806, a second value of the environmental condition, shown as a second indoor air temperature is determined, in particular an indoor air temperature at which occupant discomfort is predicted to exceed the discomfort tolerance in a second direction (e.g., opposite the first direction). For example, if step 1804 determines the temperature at which occupants become so cold that the discomfort threshold is exceeded, then step 1806 seeks the temperature at which occupants become so hot that the discomfort threshold is exceeded. The determination in step 1806 can be made using a predictive model configured to predict occupant discomfort, for example by predicting occupant setpoint changes (i.e., occupant requests to change the temperature of a space). For example, step 1806 can include predicting occupant discomfort for a plurality of indoor air temperatures (e.g., across a test region of possible environmental conditions) and then evaluating the predictions to find the value of the indoor air temperature at which the predicted occupant discomfort exceeds the discomfort tolerance in a second direction.

In some embodiments, step 1804 and step 1806 are executed similarly to the process shown in FIG. 15, but with non-zero ΔT values as determined in step 1802. For example, first temperature can be determined in step 1804 as:

$$T_{min} = \min(T_z(\Delta T_{sp} = X))$$

where $T_{max}$ is the first temperature and X is a bound of the discomfort tolerance set in step 1802. Further, the second temperature can be determined in step 1806 as:

$$T_{max} = \max(T_z(\Delta T_{sp} = Y))$$

where $T_{max}$ is the second temperature and Y is another bound defining the discomfort tolerance set in step 1802. By incrementing $T_z$ and applying it to a neural network (described elsewhere herein) to get $\Delta T_{sp}$ for each iteration of incrementing $T_z$ values of $\Delta T_{sp}$ for multiple values of $T_z$ are found, and then can be used to find where $\Delta T_{sp}$ matches the discomfort tolerance (i.e., the values of X, Y). In this way, $T_{max}$ can be set to a minimum value of the zone temperature where the change in the predicted setpoint is X, whereas $T_{max}$ can be set to a maximum value of the zone temperature where the change in the predicted setpoint is Y. In some embodiments, these steps are performed by constraint generator 9016.

Steps 1804 and 1806 thus result in identification of a first indoor air temperature and a second indoor air temperature at which the discomfort tolerance is reached, in two directions (i.e., too cold, too hot). In other words, occupants are predicted to experience comfort or up to an acceptable amount of discomfort when indoor air temperature is between the first temperature and the second temperature. In this example, the first indoor air temperature and the second indoor air temperature define a region in which occupant discomfort is expected to be within the discomfort tolerance. In other examples, the region may be defined in terms of another environmental condition (e.g., humidity, air quality, air speed, etc.) or multi-dimensionally in terms of multiple environmental conditions such that the region within which occupant is expected to be within the discomfort tolerance is defined by an area in two dimensions (e.g., humidity and temperature), a volume in three dimensions (e.g., humidity, temperature, and airflow rate), etc.

Figure 19:
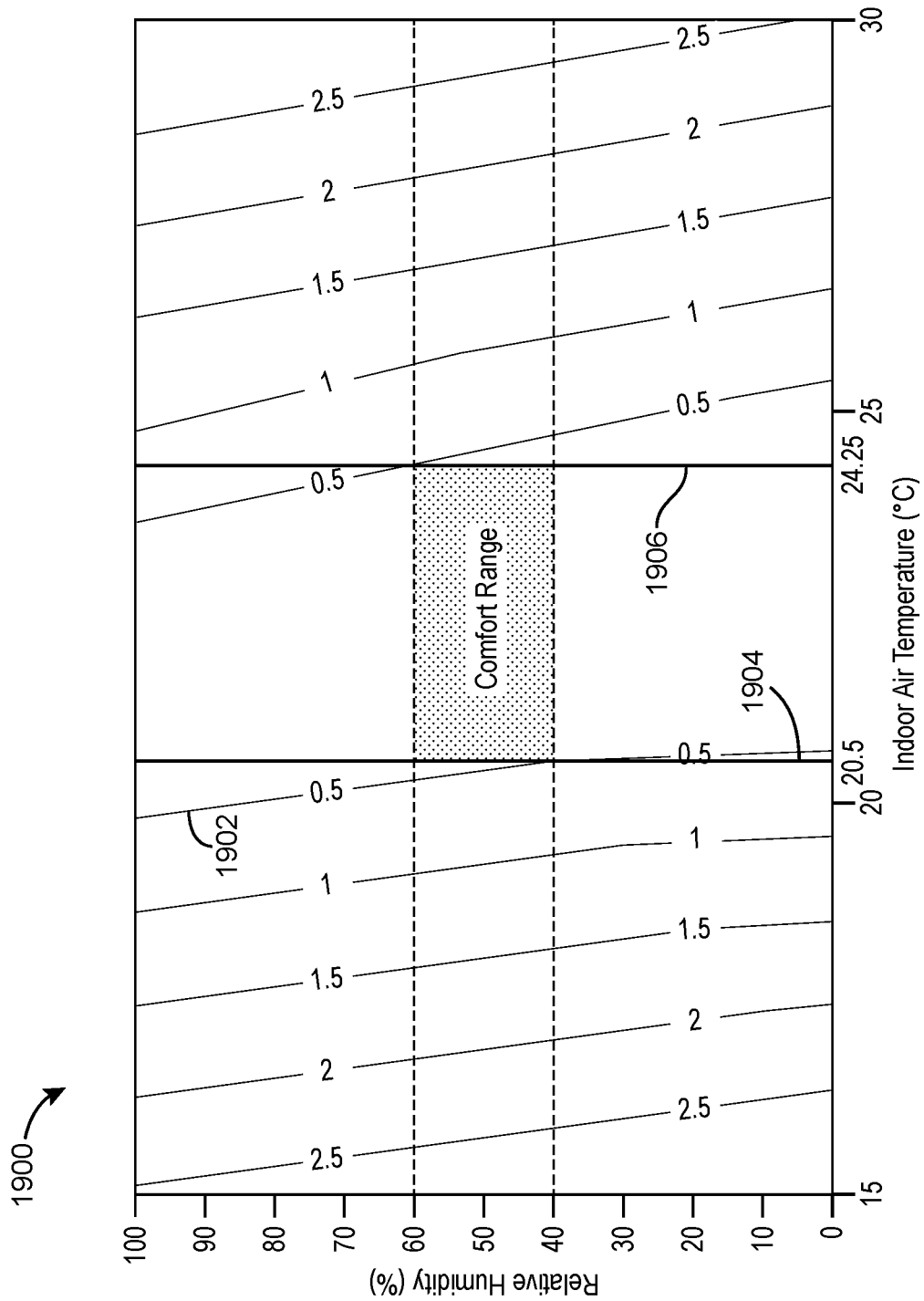
FIG. 19 is a graphical representation of a comfort range affected by relative humidity, according to some embodiments.

FIG. 19 shows a graph 1900 illustrating how effects of relative humidity can be taken into account in steps 1804 and 1806. Graph 1900 shows multiple lines as a function of temperature and relative humidity, with each line representing a constant amount of discomfort (i.e., an "iso-discomfort" line) for different values of temperature and relative humidity. For example, line 1902 corresponds to an amount of discomfort at which an occupant would increase the temperature setpoint by 0.5 degrees. Line 1902 slopes diagonally downward, indicating that higher temperature is needed to cause the same amount of discomfort at lower relative humidity (and vice versa).

Steps 1804 and 1806 can account for the dependence of discomfort on relative humidity by considering a range of relative humidity values. In the example of FIG. 19, a range of relative humidity values between 40% and 60% are considered in order to select temperature values that will be at or inside the discomfort threshold across the full range of relative humidity values. Accordingly, in the example of FIG. 19, setting the lower temperature value (e.g., the first indoor air temperature determined in step 1804) assumes relative humidity is at the bottom of the humidity range (40% in the example shown), while setting the upper temperature value (e.g., the second indoor air temperature determined in step 1806) assumes relative humidity is at the top of the humidity range (60% in the example shown). FIG. 19 shows first vertical line 1904 intersecting 1902 at 40% relative humidity to indicate the first indoor air temperature (lower bound) that would be selected in a scenario where 0.5 degrees defines the discomfort tolerance. FIG. 19 also shows a second vertical line 1906 intersecting a second iso-discomfort line at 60% relative humidity to illustrate the second indoor air temperature (upper bound) that would be selected. As illustrated in FIG. 19, the resulting temperature range is slightly narrower as compared to assuming the same relative humidity for determination of both the first and second temperatures in steps 1804 and 1806.

At step 1808, HVAC equipment is controlled to maintain an actual indoor air temperature between the first indoor air temperature and the second indoor air temperature. In some embodiments, step 1808 includes executed a feedback control approach, for example by defining a deadband based on the first indoor air temperature and the second indoor air temperature from steps 1804-1806 and operating the HVAC equipment to drive the actual (e.g., measured) indoor air temperature into the deadband while allowing temperature to drift between the first and second temperatures. In other embodiments, step 1808 includes executed a model predictive control approach using the first and second temperatures from steps 1804-1806 as a constraint on an optimization problem. For example, step 1808 can include controlling the HVAC equipment to minimize the amount or cost of energy consumption by the HVAC equipment over an optimization period without allowing indoor air temperature to move outside the range defined by the first indoor air temperature and the second indoor air temperature. Various such embodiments are detailed elsewhere herein.

Advantageously, process 1800 shows a multi-stage approach where the discomfort tolerance is first generated (independent of particular building conditions) and then used to determine the building conditions that correspond to the discomfort tolerance under given conditions (e.g., for a particular time of day, day of week, type of day, outside weather conditions, etc.). Providing these as separate stages/determinations can provided increased adaptability and conformability to changing preferences and conditions as compared to other approaches.

Figure 20:
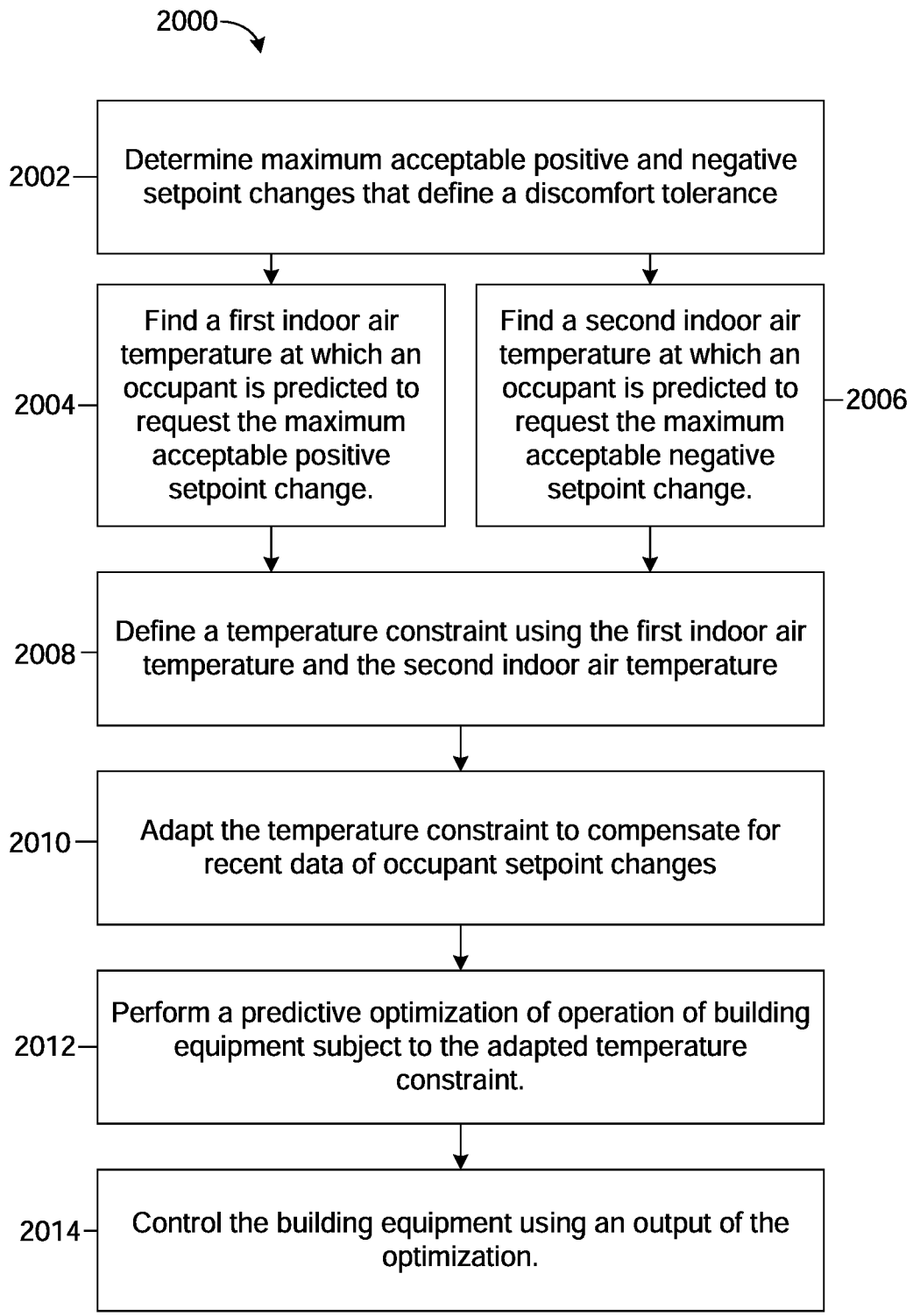
FIG. 20 is a flowchart of another process for controlling building equipment to avoid exceeding a discomfort tolerance for occupants, according to some embodiments.

Referring now to FIG. 20, a flowchart showing a process 2000 for controlling building equipment is shown, according to an exemplary embodiment. In some embodiments, process 2000 is a variation of process 1800 and can be implemented using the concepts discussed with reference thereto. The process 2000 can be executed by predictive controller 420, the BMS controller 366, or comfort controller 9000 in various embodiments.

At step 2002, maximum acceptable positive and negative setpoint changes that define a discomfort tolerance are determined, for example automatically by predictive controller 420. Step 2002 includes execution of process 2200 of FIG. 22 in some embodiments. The maximum acceptable positive and negative setpoint changes can be defined as a data pair [X, Y] where X is a positive value indicating a maximum acceptable positive setpoint change (thus corresponding to an occupant being uncomfortably cold) and Y is a negative value indicating a maximum acceptable negative setpoint change (thus corresponding to an occupant being uncomfortably hot). The discomfort tolerance defined by [X, Y] indicates that expected or predicted setpoint changes within the range have been classified as acceptable or tolerable, for example so that building conditions are allowed to fluctuate to cause discomfort within the discomfort tolerance, thereby providing flexibility which enables energy savings (e.g., via load shifting).

Figure 32:
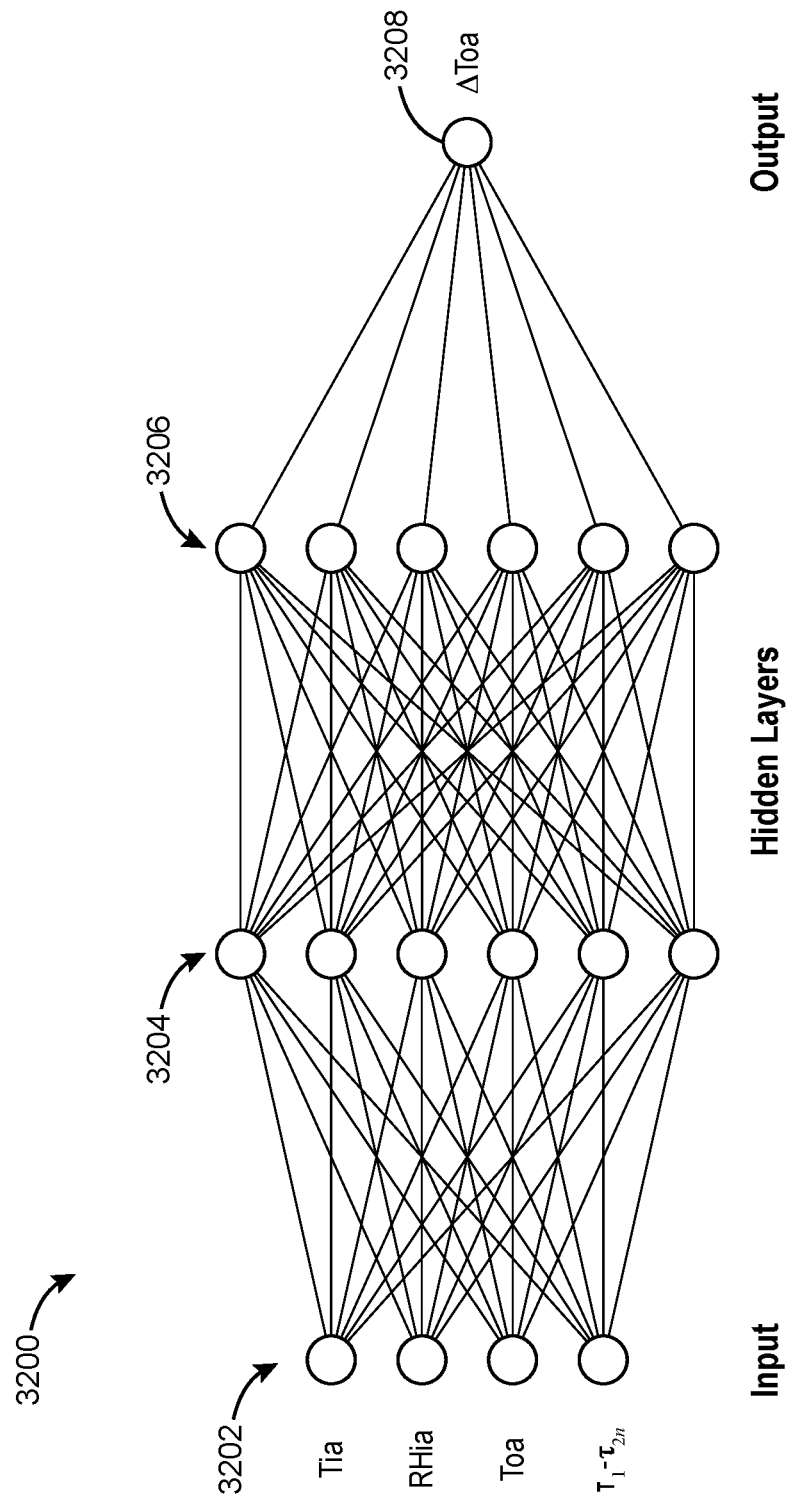
FIG. 32 is an illustration of a neural network that can be used in the process of FIG. 27, according to some embodiments.

At step 2004, a first indoor air temperature at which an occupant is predicted to request the maximum acceptable positive setpoint change is determined. The prediction may be made using a neural network, for example as shown in FIG. 12, 13, or 32. The neural network may take inputs of indoor air temperature, relative humidity, outside air temperature, and time of day, for example as discussed with reference to FIG. 32 and output a predicted setpoint change $\Delta T_{sp}$. To find the indoor air temperature at which the predicted setpoint change $\Delta T_{sp}$ matches the maximum acceptable positive setpoint change ($\Delta T_{sp}=X$), the values of relative humidity, outside air temperature, and time of day can first be set, and then the indoor air temperature can be iteratively incremented until the output $\Delta T_{sp}=X$ (e.g., similar to FIG. 15). For example, relative humidity can be set to a bottom end of a range (e.g., 40%) as discussed with reference to FIG. 19, outside air temperature can be set based on a weather forecast, and the time of day is determined by the period for which the prediction is made. In some cases, the predictions correspond to 15-minute increments, such that the step 2004 determines the first indoor air temperature for a future 15 minute time period. In some such embodiments, determinations for multiple time periods are averaged together to define the first indoor air temperature over a longer time period (e.g., determined first indoor air temperatures for four 15-minute periods may be averaged to get a value for an hour-long period).

At step 2006, an indoor air temperature at which an occupant is predicted to request the maximum acceptable negative setpoint change is determined and indicated as the second indoor air temperature. The prediction may be made using a neural network, for example as shown in FIG. 12, 13, or 32. The neural network may take inputs of indoor air temperature, relative humidity, outside air temperature, and time of day, for example as discussed with reference to FIG. 32 and output a predicted setpoint change $\Delta T_{sp}$. To find the indoor air temperature at which the predicted setpoint change $\Delta T_{sp}$ matches the maximum acceptable negative setpoint change ($\Delta T_{sp}=Y$), the values of relative humidity, outside air temperature, and time of day can first be set, and then the indoor air temperature can be iteratively incremented until the output $\Delta T_{sp}=Y$ (e.g., similar to FIG. 15). For example, relative humidity can be set to a top end of a range (e.g., 60%) as discussed with reference to FIG. 19, outside air temperature can be set based on a weather forecast, and the time of day is determined by the period for which the prediction is made. In some cases, the predictions correspond to 15-minute increments, such that the step 2004 determines the second indoor air temperature for a future 15 minute time period. In some such embodiments, determinations for multiple time periods are averaged together to define the second indoor air temperature over a longer time period (e.g., determined second indoor air temperatures for four 15-minute periods may be averaged to get a value for an hour-long period).

At step 2008, a temperature constraint is defined using the first indoor air temperature and the second indoor air temperature. For example, the temperature constraint may be defined as an inequality constraint requiring that the actual indoor air temperature for a space stay between the first indoor air temperature and the second indoor air temperature during a corresponding time period. As another example, the temperature constraint may be defined as an inequality constraint requirement that a temperature setpoints for the space stay between the first indoor air temperature and the second indoor air temperature during a corresponding time period. In some embodiments, the temperature constraint is defined as a soft constraint that introduces a penalty to a cost function when indoor temperature or a temperature setpoint is outside of the range between the first and second indoor air temperatures defined in steps 2004-2006. Various formulations are possible.

Figure 21:
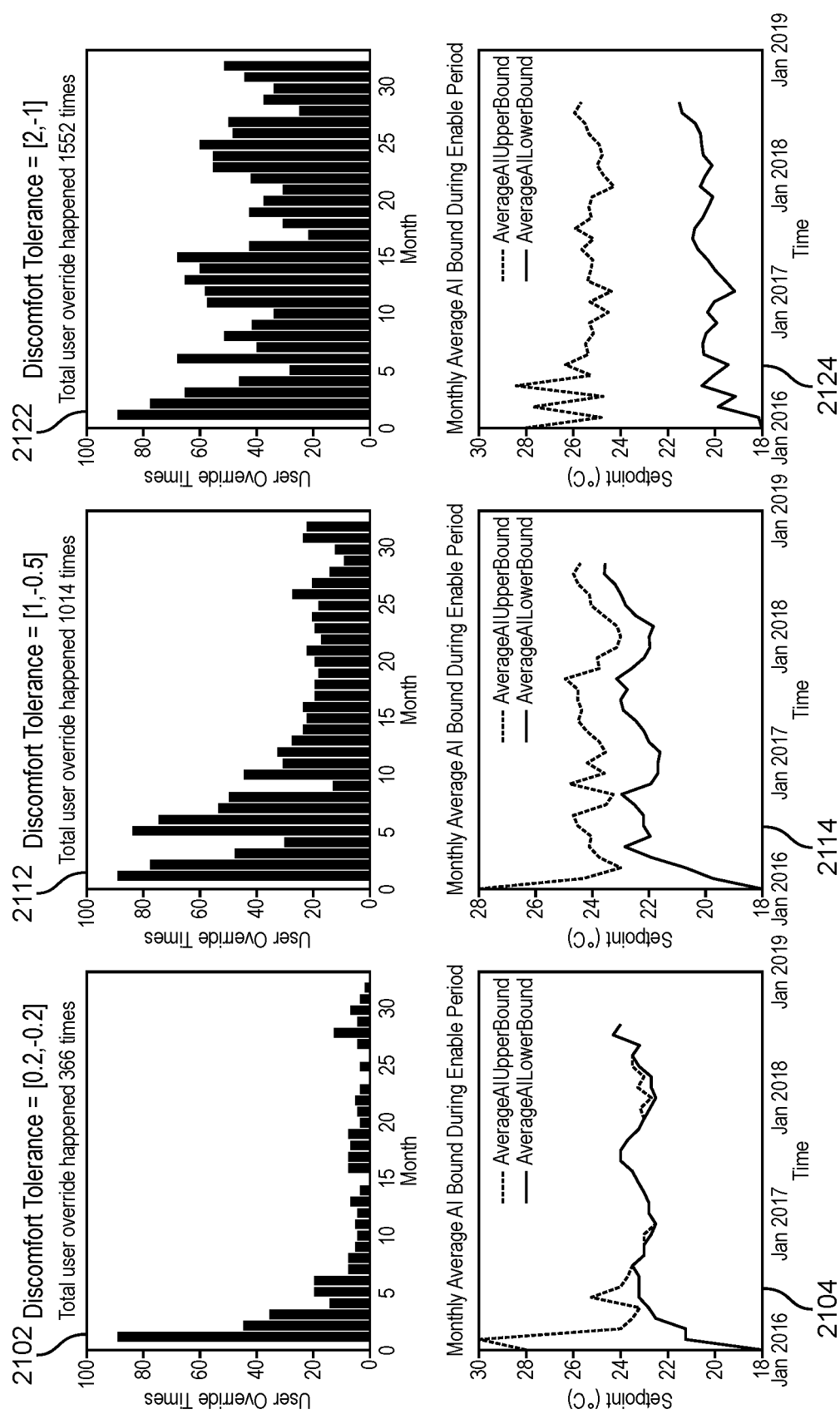
FIG. 21 is a set of graphs illustrating effects of applying different discomfort tolerances in the processes of FIG. 18 or 20, according to some embodiments.

To illustrate steps 2002-2008, FIG. 21 shows temperature constraints determined over a given time period based on the same data and using the same neural network, but with different discomfort tolerances defined in step 2002. FIG. 21 thus illustrates the effects of step 2002 on the outcome of step 2008. Graphs 2102 and 2104 correspond to a scenario in which step 2002 outputs a discomfort tolerance of [0.2, −0.2], i.e., a maximum positive setpoint change of 0.2 and a maximum negative setpoint change of 0.2. Given this narrow discomfort tolerance, the temperature constraint illustrated in graph 2104 quickly converges, i.e., so that the first and second temperature (upper and lower bounds on temperature) are nearly equal. Due to this convergence, corresponding graph 2102 shows that the number of user overrides (i.e., user requests to change the temperature) quickly moves toward a low, near-zero number, indicating that occupants are relatively comfortable in the scenario with the lowest discomfort tolerance. Graphs 2112 and 2114 show a scenario in which step 2002 outputs a discomfort tolerance of [1, −0.5], i.e., a maximum positive setpoint change of 1 and a maximum negative setpoint change of −0.5. In this scenario, steps 2004-2008 result in a gap remaining between the first and second temperatures over time, as illustrated in graph 2114. This gap can provide some flexibility of energy or cost optimization of equipment operation, while still tracking occupant preferences over time, for example to result in the number of occupant attempts to change the temperature setpoint shown in graph 2112. Graphs 2122 and 2124 illustrate a scenario in which a wider discomfort tolerance is defined in step 2002, in particular [2, −1], i.e., a maximum positive setpoint change of 2 and a maximum negative setpoint change of −1. Graph 2124 shows that such a wide discomfort tolerance can provide a relatively wide set of time-varying first and second temperatures defining the temperature constraint in step 2006 (as shown in graph 2124 and enabling increased cost or energy savings), but which also results in a relatively high number of occupant overrides/requests to change the temperature setpoint as shown in graph 2122. FIG. 21 thus illustrates the effect that different discomfort tolerances can have on the resulting time-varying temperature constraints output by step 2008.

Step 2008 thus results in a temperature constraint that is dependent on the discomfort tolerance and is thus tied back to the amount of acceptable discomfort considered in step 2002. As illustrated by FIG. 21, one goal may be to arrive at an acceptable level of user overrides (i.e., a number of user requests as shown in graphs 2102, 2112, and 2122) which balances user comfort with the freedom for temperature fluctuations that can enable temperature savings. To help strike this balance while adapting to changing occupant preferences, it may be helpful to provide a quick adaptation of the temperature constraint output by step 2008 based on recent override data (i.e., recent user setpoint change requests).

Thus, in step 2010, the temperature constraint (from step 2008) is adapted to compensate for recent data of occupant setpoint changes (overrides). Step 2010 can include determining whether the number of overrides is increasing, decreasing, oscillating, or staying at or near a low or high level. In one example embodiment, the compensation logic applied at step 2010 includes (1) expanding the temperature constraint (i.e., decreasing the first temperature and/or increasing the second temperature) when the number of overrides stays at a low level; (2) shrinking the temperature constraint when the number of overrides is increasing (e.g., a derivative of a line fit to the number of overrides is greater than a threshold); (3) expanding the temperature constraint when the number of overrides is decreasing (e.g., a derivative of the line fit to the number of overrides is less than a negative threshold); and (4) not changing the temperature constraint when the number of overrides is oscillating (e.g., not trending substantially upwards or downwards). Other logic for adapting the temperature constraint based on recent data of occupant setpoint changes is possible. Step 2010 can thus adaptively adjust the temperature constraints based on recent data to drive occupant setpoint changes to a preferred level, for example to a level that corresponds to a preferred amount of occupant discomfort which allows more energy savings as compared to allowing the number of overrides to trend to zero.

At step 2012, a predictive optimization of operation of building equipment is performed subject to the adapted temperature constraint. The predictive optimization can be executed as described above with reference to the predictive controller 420, for example by the economic controller 610 and tracking controller 612. For example, the predictive optimization can be performed by minimizing a function which predicts an amount or cost of resource (e.g., power, electricity, energy, gas, etc.) consumption to determine control decisions, setpoints (e.g., temperature setpoints, fan or compressor speed setpoints, power or load targets, etc.), on/off decisions, control signals, etc. for building equipment which minimize resource consumption or cost while maintaining predicted temperature or temperature setpoints within the adapted temperature constraint. As another example, the predictive optimization can include minimizing an objective function that includes a penalty term defined based on the adapted temperature constraint. As one example, the predictive optimization can shift loads temporally, for example using the freedom/flexibility provided by a non-zero discomfort tolerance to move energy consumption to times when time-varying utility rates, to avoid or reduce demand charges, to consume electricity at times when green energy sources are available, etc. Step 2012 thus provides an output which optimizes operation of building equipment subject to the adapted temperature constraint.

At step 2014, building equipment is controlled using an output of the optimization of step 2012. Steps 2002-2012 thus results in output of control decisions, on/off decisions, setpoints, control signals, etc. which are used to control building equipment to affect conditions in a building (or in a space, on a campus, etc.), thereby affect occupant discomfort. Process 2000 thus addresses a technical challenge of dynamically and intelligently adjusting operation of building equipment to balance occupant discomfort and energy or cost savings.

Referring now to FIG. 22, a flowchart of a process 2200 for generating a discomfort tolerance is shown, according to an example embodiment. Process 2200 can be executed as part of step 2002 of process 2000 or step 1802 of process 1800. Process 2200 can be executed by predictive controller 420 or comfort controller 9000 in some embodiments, for example by the constraint generator 620 or constraint generator 9016. As detailed below, process 2200 shows an iterative process for using a predictive model trained on historical data to dynamically generate the discomfort threshold.

At step 2202, a proposed discomfort tolerance is selected. Process 2200 iterates through multiple proposed discomfort tolerances, so step 2202 can start with a first possibility (e.g., a discomfort tolerance of [0.1, −0.1]) and, in further iterations, can make indexed steps to test different discomfort tolerances. For example, the discomfort tolerance can be incremented by 0.1 degrees C. between iterations of step 2202. The initial value of the proposed discomfort tolerance selected in the first iteration of step 2202 can be selected randomly, set to a predetermined value, retrieved from memory, or otherwise determined. Subsequent iterations of step 2202 may use different values of discomfort tolerance after incrementing the discomfort tolerance.

At step 2204, a setpoint change is predicted, for example a magnitude and direction of a setpoint change expected given a set of input conditions. The setpoint change may be predicted based on a time of day, an outdoor air temperature, a relative humidity, and indoor air temperature, for example using a neural network trained on historical data as described in FIG. 12, 13, or 32. The input conditions (e.g., time of day, outdoor air temperature, relative humidity, indoor air temperature) can be varied across iterations of step 2204 (see steps 2212).

At step 2206, a determination is made regarding whether the predicted setpoint change exceeds the proposed discomfort tolerance. That is, the predicted setpoint change $\Delta T_{sp}$ is compared to the proposed discomfort tolerance and a determination is made as to whether $\Delta T_{sp}$ is outside the discomfort tolerance (e.g., whether or not $\Delta T_{sp} \in [X, Y]$). For example, if the predicted $\Delta T_{sp}$ is larger than the maximum acceptable setpoint increase defined by the discomfort tolerance (i.e., greater than X), the predicted setpoint change is considered as exceeding the discomfort tolerance ("Yes" at decision step 2206) and the process 2200 proceeds to step 2208. As another example, if the predicted $\Delta T_{sp}$ is less than the maximum acceptable setpoint increase defined by the discomfort tolerance (i.e., less than X) and greater than the maximum acceptable setpoint decrease (i.e., greater than Y), then the predicted setpoint change is considered as not exceeding the discomfort tolerance ("No" at decision step 2206) and the process 2200 proceeds to step 2210. As another example, if the predicted $\Delta T_{sp}$ is less than (i.e., more negative than) the maximum acceptable setpoint decrease (i.e., less than Y), then the predicted setpoint change is considered as exceeding the discomfort tolerance ("Yes" at decision step 2206) and the process 2200 proceeds to step 2208.

At step 2208, which is executed when the predicted setpoint change exceeds the proposed discomfort tolerance, a count of correctly classified predictions is increased. On a first iteration of step 2208, a count is initiated, for example by storing a value of one. On further iterations, the count is increased (i.e., two, three, four, etc.). The count created in step 2208 thus indicates the number of predicted setpoint changes that would exceed the proposed discomfort tolerance, referred to as correctly classified predictions. The count of correctly classified predictions can be thought of as a metric for the amount of discomfort that would be outside the discomfort tolerance across ranges of input conditions that may occur, i.e., an amount of unacceptable discomfort.

At step 2210, which is executed when the predicted setpoint change does not exceed the proposed discomfort tolerance, a count of incorrectly classified predictions is increased. On a first iteration of step 2210, a count is initiated, for example by storing a value of one. On further iterations, the count is increased (i.e., two, three, four, etc.). The count created in step 2210 thus indicates the number of predicted setpoint changes that would not exceed the proposed discomfort tolerance, referred to as incorrectly classified predictions. The count of incorrectly classified predictions can be thought of as a metric for the amount of discomfort that would be within the discomfort tolerance across ranges of input conditions that may occur, i.e., an amount of acceptable/tolerable discomfort.

At step 2212, different input conditions (e.g., time of day, outdoor air temperature, relative humidity, indoor air temperature) are selected and the process returns to step 2204 to repeat step 2204, step 2206, and either step 2208 or step 2210. The different input conditions can be varied across expected/likely ranges. For example, across multiple iterations, relative humidity can be incremented to values between 40% and 60%, outdoor air temperature can be incremented through likely conditions for a given season and climate, time of day can be incremented to cover a full 24 hour period, and indoor air temperature can be incremented through a range of temperatures suitable for a given building. The conditions and iterations are preferably selected to generate a robust data set of predicted setpoint changes and resulting counts of correctly and incorrectly classified predictions resulting from steps 2208 and 2210.

Figure 23:
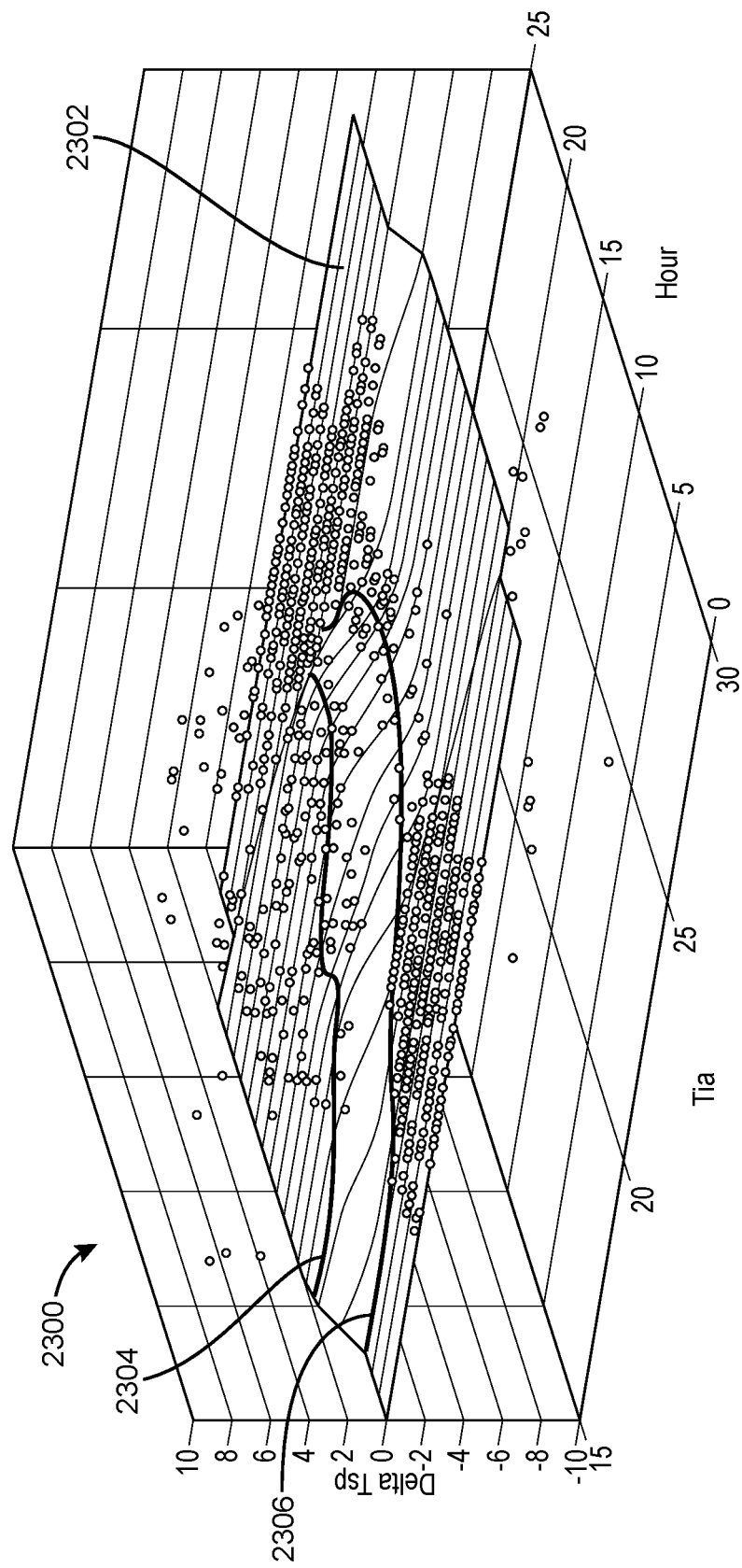
FIG. 23 is a first graph of data used in the process of FIG. 22, according to some embodiments.

As an illustrative example, FIG. 23 shows a graph 2300 of setpoint predictions plotted on a vertical axis as a function of indoor air temperature and time of day (hour). In particular, a surface 2302 is fit to a set of predicted setpoint changes for different hours and different indoor air temperatures. For simplicity, FIG. 23 shows other inputs (e.g., relative humidity and outdoor air temperature) as fixed. The surface 2302 curves through a space of interest between a discomfort max line 2304 and a discomfort min line 2302 which show where the proposed discomfort tolerance for a given iteration of steps 2202-2210 follows the contours of the surface 2302. Points between vertically disposed between the discomfort max line 2304 and the discomfort min line 2302 would be counted as incorrectly classified setpoints in step 2210, while other points would be counted as correctly classified setpoints in step 2208. One skilled in the will appreciate that additional input variables (e.g., relative humidity and outdoor air temperature) will add additional dimensions and complicate the geometry dealt with by the process 2200.

At step 2214, the process 2200 is redirected back to step 2202 to step 2202 and a new proposed discomfort tolerance is selected before steps 2204-2212 are executed. For example, the discomfort tolerance can be incremented through a number of steps (e.g., by 0.1 degrees C., 0.5 degrees F., etc.). Execution of a number N of iterations from step 2214 results separate counts of correctly classified and incorrectly classified predictions for N different discomfort tolerances which are then evaluated in step 2216.

In step 2216, the proposed discomfort tolerance where the ratio of correctly classified predictions to incorrectly classified predictions matches a present percentage is selected. For example, step 2216 may find the discomfort tolerance for which 15% of setpoint change predictions were correctly classified (and where 85% of setpoint changes predictions were incorrectly classified). This percentage can vary in different embodiments, for example between 10%-20% of correctly classified predictions, and may be selected by a user (e.g., building manager) in some embodiments. The preset percentage can be considered as indicating a level of acceptable discomfort. That is, because the count of correctly classified setpoints is a proxy for an amount of unacceptable discomfort and the count of incorrectly classified setpoints is a proxy for an amount of comfort or acceptable discomfort, the ratio of correctly classified setpoints to incorrectly classified setpoints relates to relative levels of acceptable discomfort and unacceptable discomfort expected to occur across input conditions depending for different discomfort tolerances. Step 2216 can thus be characterized as involving selection of the discomfort tolerance at which an acceptable percentage of discomfort will be ignored and treated as comfortable. The discomfort tolerance selected in step 2216 can then be used for later steps of process 1800 or process 2000, for example.

Figure 24:
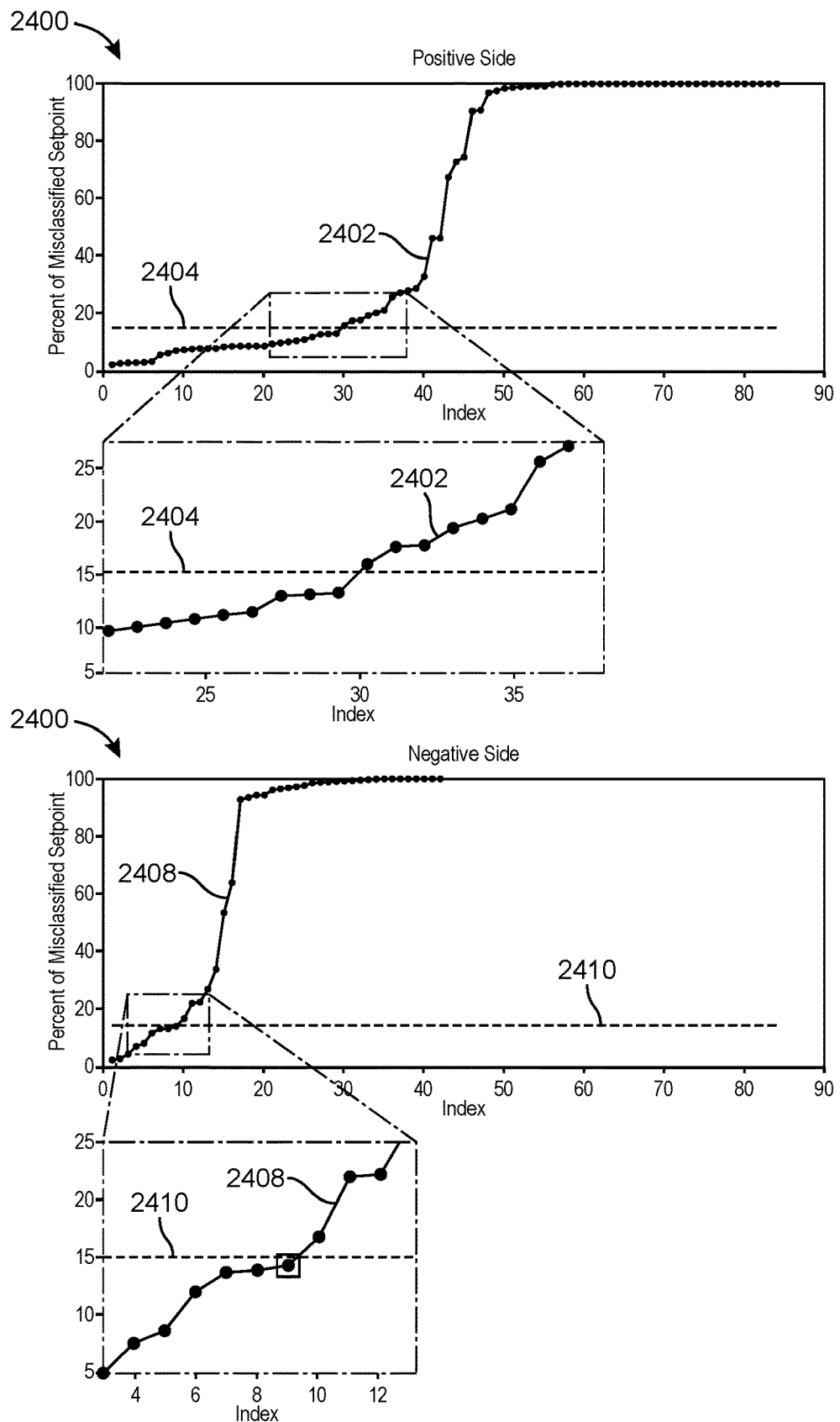
FIG. 24 is a second set of graphs of data used in the process of FIG. 22, according to some embodiments.
Figure 25:
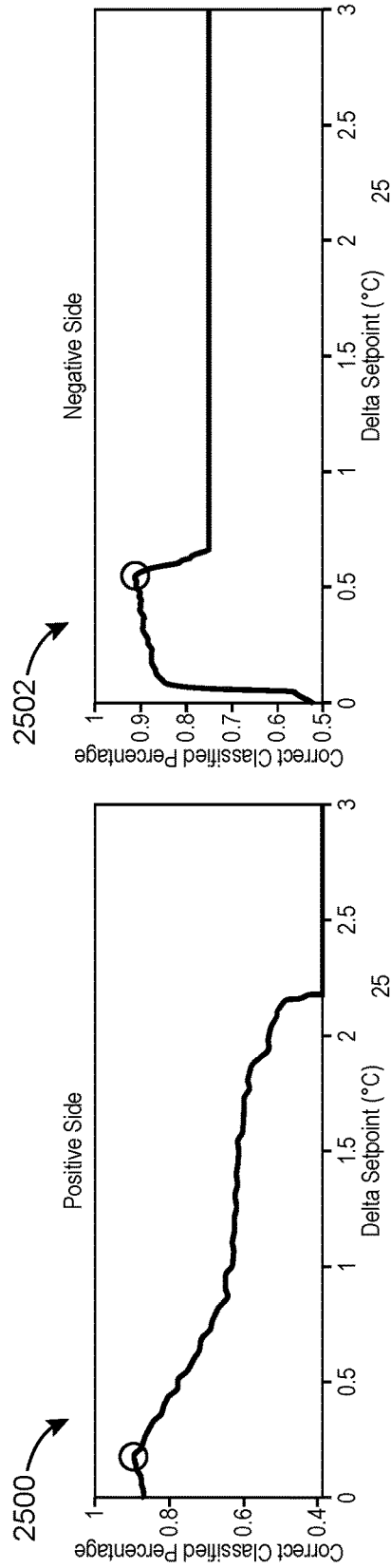
FIG. 25 is a third set of graphs of data used in the process of FIG. 22, according to some embodiments.

FIGS. 24-25 provide graphical illustrations of selection of a discomfort tolerance at step 2216 in various embodiments. FIG. 24 illustrates that two sides of the discomfort tolerance (e.g., a maximum acceptable positive setpoint change X and a minimum acceptable negative setpoint change Y) can be determined separately in different versions of the discomfort tolerance. Positive side graph 2400 plots (via line 2402) a percent of misclassified (incorrectly classified) setpoints on the vertical axis and "index" on the horizontal axis, indicating a number of iterations through steps 2202-2214 of process 2200. A horizontal line 2404 indicates a target percentage for misclassified setpoints (shown as 15%). Intersection of line 2402 and line 2404 indicates the iteration at which the percentage of misclassified setpoints aligns causes the target percentage of misclassified setpoints, and that iteration is associated with one bound of the discomfort tolerance (e.g., a maximum acceptable positive setpoint change). Negative side graph 2406 plots (via line 2408) a percent of misclassified setpoints on the vertical axis and "index" on the horizontal axis, indicating a number of iterations through steps 2202-2214 of process 2200. A horizontal line 2408 indicates a target percentage for misclassified setpoints (shown as 15%). Intersection of line 2406 and line 2408 indicates the iteration at which the percentage of misclassified setpoints aligns causes the target percentage of misclassified setpoints, and that iteration is associated with the other bound of the discomfort tolerance (e.g., a maximum acceptable negative setpoint change).

FIG. 25 shows a positive side graph 2500 and a negative side graph 2502, both of which plot a maximum setpoint change for the discomfort threshold versus a correctly classified percentage. The positive side graph 2500 and the negative side graph 2502 show an examples how a maximum acceptable positive setpoint change and maximum negative acceptable setpoint affect the percentage of correctly classified percentage, and indicate how the maximum negative acceptable setpoint could be selected based on a target percentage or to maximize the correctly classified percentage.

Figure 26:
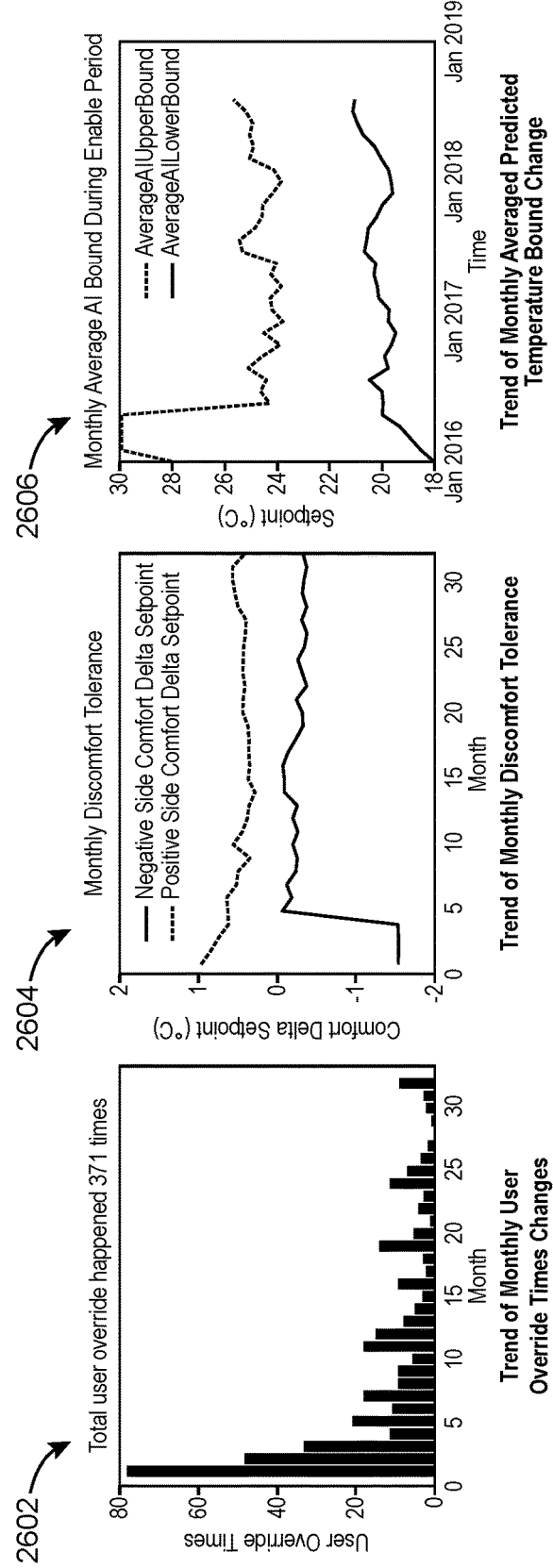
FIG. 26 is a set of graphs illustrating experimental results of applying the processes of FIGS. 18, 20, and/or 22, according to some embodiments.

Referring now to FIG. 26, a set of graphs illustrating experimental results of applying the processes of FIGS. 18, 20, and/or 22 is shown. FIG. 26 shows a first graph 2600 of the amount of user overrides over a time period, a second graph 2602 of a dynamically-determined discomfort tolerance over the same time period (e.g., determined using process 2200) and a third graph 2604 of temperature constraints determined using the discomfort tolerance (e.g., determined using process 1800 or process 2000).

Figure 27:
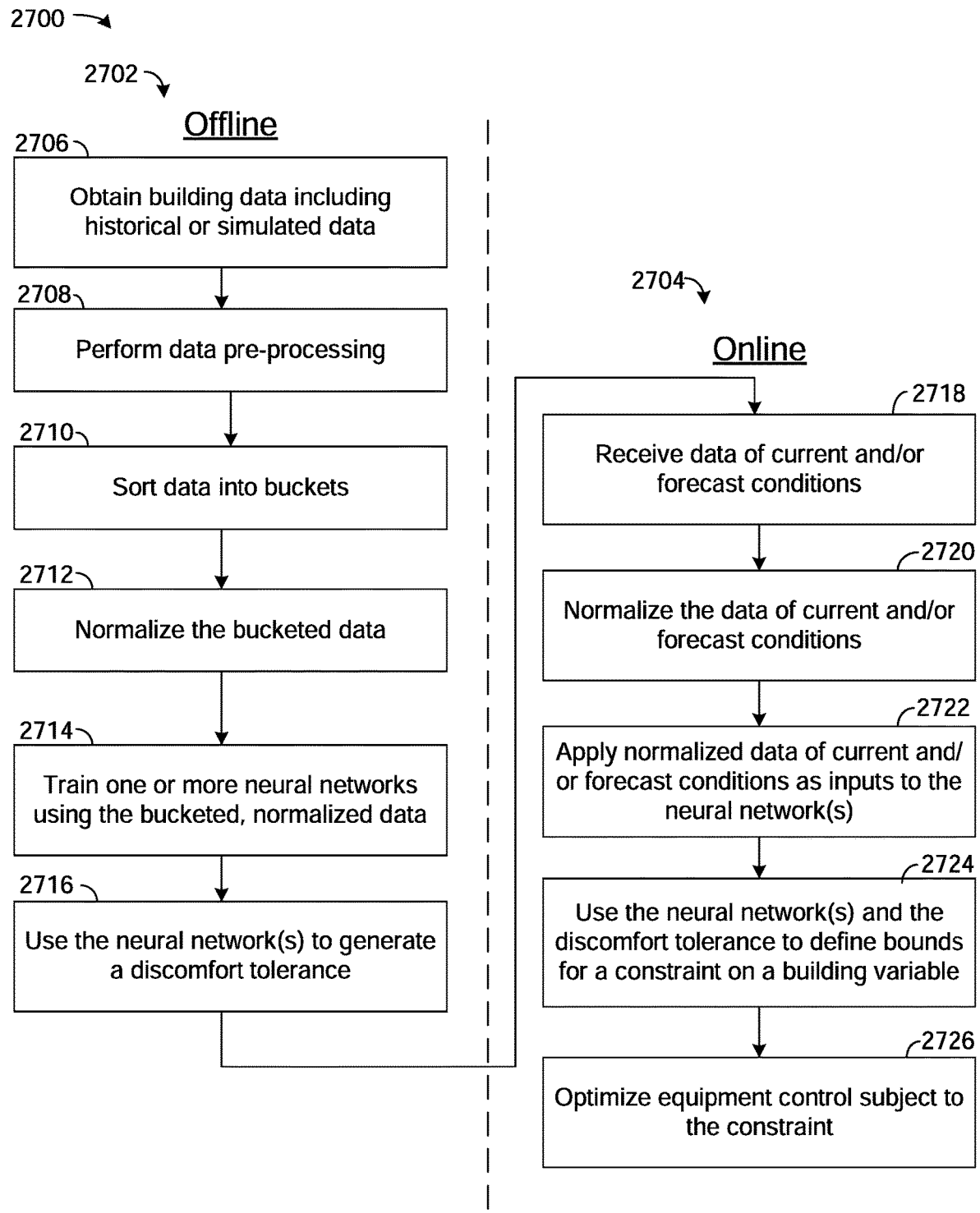
FIG. 27 is a flowchart of a process for offline training and online usage of a neural network for generating a constraint and controlling equipment, according to some embodiments.

Referring now to FIG. 27, of a process 2700 for offline training and online usage of a neural network for generating a constraint and controlling equipment, according to some embodiments. Process 2700 can be executed by predictive controller 420 or comfort controller 9000 in some embodiments, for example. FIG. 27 shows that process 2700 includes an offline sub-process 2702 and an online process 2704. The offline sub-process 2702 can be executed on the same controller or other computing device as the online sub-process 2704, or may be executed on a separate device. For example, in some embodiments, the offline sub-process 2702 is executed by a cloud computing resource located remotely from an online controller located at a building. Various architectures are possible.

As shown in FIG. 27, the offline process 2702 starts at step 2706 where building data including historical or simulated data is obtained. In some embodiments, step 2706 includes collected measurements (e.g., temperature measurements, etc.) and other data (e.g., records of user setpoint changes, data indicating setpoints or equipment setpoints), etc. In other embodiments, step 2706 includes receiving a stored set of data from a database or other source. In other embodiments, step 2706 includes executing a simulation of a building which generates a set of simulated building data. The building data can include data points for indoor air temperature, outdoor air temperature, indoor and/or outdoor relative humidity, other environmental conditions (e.g., weather, solar radiation, precipitation, wind speed, indoor airflow rates, etc.), building schedules or events, occupancy data, and data indicative of user overrides indicating discomfort (e.g., user changes to temperature setpoints for a space, other user inputs to building equipment such as on/off commands, etc.). The various data may be collected as timeseries data.

At step 2708, the building data from step 2706 is pre-processed. In some embodiments, data pre-processing includes one or more of detecting and processing user overrides, generating simulated override data, and/or steady state detection, for example. In some embodiments, detecting and processing user overrides can include identifying (e.g., flagging, counting, etc.) user overrides by comparing actual setpoints changes to setpoint changes suggested by a model predictive control algorithm, and finding any changes that deviated from the suggested setpoints of the model predictive control algorithm. In some examples, detecting and processing user overrides includes determining a magnitude of user-input setpoint changes. For example, in some embodiments, the building data may include a time of occurrence for each user override without storing a magnitude of the setpoint change. In such examples, step 2708 can include calculating and storing the magnitudes of the setpoint change. For example, the setpoint change $\Delta T_{sp,i}$ can be calculated as $\Delta T_{sp,i} = T_{sp,i} - T_{sp,i-1}$ where i indicates a time when an override occurred and i−1 is the latest time before the override and $T_{sp,i}$ indicates the temperature setpoint at time i, so that the magnitude of the setpoint change $\Delta T_{sp,i}$ reflects a different between a setpoint and the occupant's preferred setpoint. As another example, the setpoint change $\Delta T_{sp,i}$ can be calculated as $\Delta T_{sp,i} = T_{sp,i} - T_{ia,i-1}$, where $T_{ia,i-1}$ indicates the indoor air temperature at time i−1, so that the magnitude of the setpoint change $\Delta T_{sp,i}$ reflects the difference between actual indoor air temperature and the occupant's preferred indoor air temperature.

Step 2706 can include generating simulated override data. For example, in a particular building, occupants may not override setpoints a sufficient number of times to provide a robust set of data. In some embodiments, the training data is generated based on given comfort setpoints, for example using the following data:

$$\Delta T_{sp} = \begin{cases} T_{sp,c\_lower} - T_{ia}, & \text{if } T_{ia} < T_{sp,c\_lower} \\ 0, & \text{if } T_{sp,c\_lower} \leq T_{ia} \leq T_{sp,c\_upper} \\ T_{sp,c\_upper} - T_{ia}, & \text{if } T_{ia} > T_{sp,c\_upper} \end{cases}$$

where $T_{sp,c\_lower}$ is the minimum comfort bound at each hour, $T_{sp,c\_upper}$ is the maximum comfort bound at each hour. $\Delta T_{sp}$ is the delta setpoint at each hour, and $T_{ia}$ is the room temperature at each hour. The comfort bound can be preselected to facilitate generation of training data. Humidity may also be taken into account in some embodiments. The pre-processing can involve traversing all different combinations in the table below while applying the equation above, and/or by traversing different combinations as suggested by a historical data set of measured data (e.g., actual indoor air temperatures, humidity values, outdoor air temperatures, and times of day) and applying those values in the equitation above. This approach can generate sufficient simulated override data to facilitate later steps of process 2700.

| Input Parameters | Symbol | Range | Resolution | Unit |
|---|---|---|---|---|
| indoor temperature | $T_{ia}$ | 15-31 | 1 | deg C. |
| indoor relative humidity | $RH_{ia}$ | 0-100 | 10 | % |
| outdoor air temperature | $T_{oa}$ | −40-50 | 10 | deg C. |
| time of day | t | 0-24 | 1 | hour |

Some embodiments of step 2708 include determining whether sufficient initial data exists, for example using the equation $$p = \frac{1}{40}(N_{override} - 50),$$

where p is the percentage of initial data needed with (0≤p≤1). $N_{override}$ is the number of overrides in a month of data. The value of p can be used to determine whether simulated overrides need to be generated in used or the amount of simulated overrides needed to be used. For example, if the number of overrides is less than 50, then p=0 and a full set of simulated overrides should be generated (e.g., all combinations in the table above). As another example, when the number of overrides is 70, p=0.5, and half as many simulated overrides should be generated, for example by larger steps through the ranges in the table above). As another example, if p=1 (e.g., number of overrides greater than 90), the process 2700 can proceed without generating simulated override data.

Figure 28:
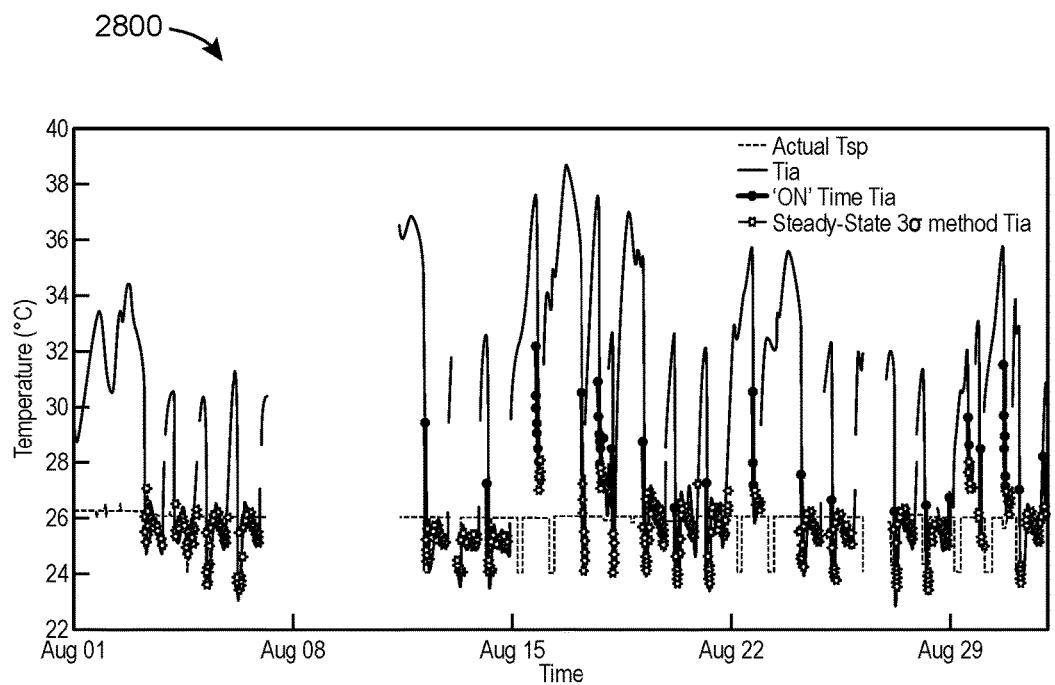
FIG. 28 is a graphical representation of a data pre-processing step of the process of FIG. 27, according to some embodiments.

Step 2708 can also include detecting steady state data, i.e., determining times during which occupants are present but not overriding setpoints. Because buildings may be non-occupied for time periods (e.g., overnight at an office building), such time periods do not provide an indication of occupant comfort or discomfort, whereas time periods where the building is occupied but occupants are not overriding setpoints may indicate comfort. Accordingly, step 2708 may include differentiating steady state periods of occupancy from periods of non-occupancy. In some embodiments, cameras, thermal sensors, carbon dioxide sensors, security systems, access control systems, etc. can be used to determine the times during which a building is occupied during a particular time, in embodiments where one or more of such devices are available and provide data in step 2706. In other cases, an indirect detection approach is needed. For example, a steady state detection approach can start by looking for all the equipment enabled data (i.e., data where equipment is enabled), and then calculating a mean standard deviation $\bar{\sigma}$ of $e=|T_{sp,actual}-T_{ia}|$. The approach can include assuming that the error e follows a Gaussian distribution, so the equipment running in steady-state when $e<3\bar{\sigma}$. FIG. 28 shows a graph 2800 illustrating selection of steady state data from equipment enabled data in an example data set. Time-series data for steady state periods can be included, while data for other time periods (e.g., time periods determined to be unoccupied time periods by this approach) may be discarded.

Step 2708 thus may include various data pre-processing steps in various embodiments. The data pre-processing steps may be configured to ensure that sufficiently robust data is available for use in generating a full, accurate models (e.g., training a neural network model) in later steps of process 2700.

At step 2710, the pre-processed data from step 2708 is sorted into buckets (bins, etc.). Data bucketing at step 2710 ensures that sufficient information is provided for training of a neural network later in process 2700, while also allowing for updates to the training data over time to help with model adaptation. Data bucking separates the historical or simulated training data into a number of small buckets/bins based on values of one or more variables in the training data (e.g., with data for any particular time stamp sorted into the same bucket). In some embodiments, boundaries of the buckets used in step 2710 are defined as follows:

| Input Parameters | Symbol | Range | Boundary |
|---|---|---|---|
| indoor temperature | $T_{ia}$ | 15-31 | [15 17 19 21 23 25 27 29 31] |
| indoor relative humidity | $RH_{ia}$ | 0-100 | [0 35 40 45 50 55 60 65 100] |
| outdoor air temperature | $T_{oa}$ | −40-50 | [−40 −10 0 10 20 30 50] |
| time of day | t | 0-24 | [0 2 4 6 8 10 12 14 16 18 20 22 24] |

Figure 30:
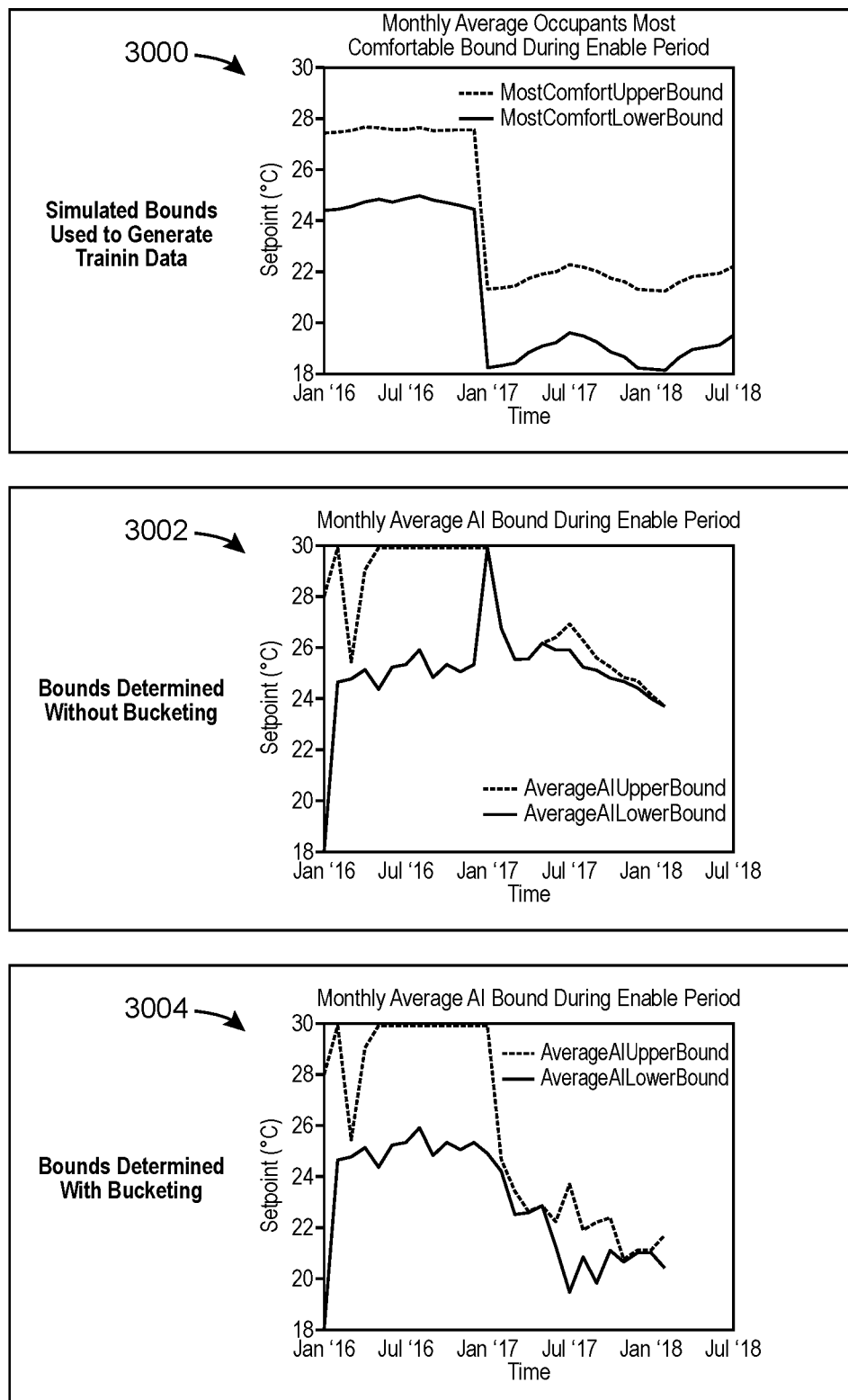
FIG. 30 shows example results of a data bucketing step of the process of FIG. 27, according to some embodiments.

In various embodiments, different numbers of buckets or different sized buckets can be used. For example, a number of buckets between 50 and 1000 can be used in various embodiments, for example as shown in FIG. 30 and described below. To provide various example scenarios that can be used in different scenarios, buckets can be defined as follows:

| Scenario | Hour Edge | Tia Edge | Toa Edge | RH Edge | Total Bucket Number |
|---|---|---|---|---|---|
| 1 | [0 2 4 6 8 10 12 14 16 18 20 22 24] | [15 17 19 21 23 25 27 29 31] | [−40 −10 −5 0 5 10 15 20 25 30 50] | [0 35 45 50 55 65 100] | 5000 |
| 2 | [0 4 8 12 16 20 24] | [10 17 19 21 23 25 27 29 31 40] | [−40 50] | [0 100] | 50 |
| 3 | [0 2 4 8 6 10 12 14 16 18 20 22 24] | [10 17 19 21 23 25 27 29 31 40] | [−40 50] | [0 100] | 100 |
| 4 | [0 6 8 10 12 14 16 18 24] | [10 19 22 25 28 31 40] | [−40 −15 0 15 30 50] | [0 50 100] | 400 |
| 5 | [0 4 8 12 16 20 24] | [10 17 19 21 23 25 27 29 31 40] | [−40 −10 0 10 20 30 50] | [0 50 100] | 500 |
| 6 | [0 4 8 12 16 20 24] | [10 18 19 20 21 22 23 24 25 26 27 28 29 31 40] | [−40 −10 0 10 20 30 50] | [0 50 100] | 1000 |
| 7 | [0 2 4 6 8 10 12 14 16 18 20 22 24] | [10 17 1921 23 25 27 29 31 40] | [−40 −10 0 10 20 30 50] | [0 50 100] | 1000 |

Various error and stability metrics can be used to assess the bucketing options to select an ideal bucketing approach in a particular scenario. In some examples, the buckets listed as scenario 5 in the table above are determined as the best approach based on one or more error and stability metrics, for example.

Buckets may include different numbers of samples in various embodiments. For example, each bucket may store 10 samples, while the number of samples may be between five and twenty in other embodiments.

Data bucketing in step 2710 can also involve defining and dynamically updating a ratio of override-to-nonoverride data stored in each bucket. For example, in some examples a fixed ratio of 1:1 override-to-nonoverride is used, and data is selected and discarded from a bucket to maintain that ratio. In other examples, a group of the latest samples that meet the boundary criteria for the bucket are assessed to determine the ratio of override-to-nonoverride data in that group of samples, which is then used to dynamically determine the ratio for storage in the bucket. In some such examples the group assessed to determine the ratio is larger (e.g., twenty samples) than the number of samples actually stored in the bucket (e.g., ten samples). Samples are then included in the bucket or discarded to comply with this dynamically-determined ratio.

The data in the buckets can be updated as new data is collected over time so that new data replaces older data in the buckets, with the older data discarded in order to maintain the number of samples in the buckets. Bucketing allows the data set to adapt to more recent conditions while still providing sufficient breadth of data that might not otherwise be reflected in recent samples.

In some embodiments, instead of discarding old data displaced from a bucket, data which is displaced from a first set of buckets is moved to a second set of buckets. In such an approach, two or more sets of buckets can store data reflecting the most recent data (in a first set of buckets), a preceding set of data (in a second set of buckets), an even older set of data (in a third set of buckets), etc. The multiple sets of data can be used in later steps of process 2700, for example to train multiple different neural networks that can be used as in the example of FIG. 29 described below.

At step 2712, the data (e.g., the bucketed, pre-processed data) is normalized. Data normalization may include scaling diverse types of data to a similar scale to deal with the fact that the data ranges of input air temperature, relative humidity, outside air temperature, and time of day are very different. Without normalization, the variables with large values may overshadow the effect of the feature with small values, and the learning rate for neural network training (e.g., via gradient descent) can depend on the size of the inputs. For example, small inputs typically require larger weights in order to get convergence faster, and vice versa for large inputs. To allow a single learning rate for training the neural network, the data is rescaled at step 2712. For example, a min-max normalization can be applied after data bucketing so that each variable (input) contributes approximately proportionately to the output (e.g., so that the gradient is on the same order of magnitude in any direction). Data normalization in step 2712 may be performed using the function:

$$x' = \frac{x - \min(x)}{\max(x) - \min(x)}$$

where x is the input data array for a particular variable (e.g., input air temperature or relative humidity or outdoor air temperature), min(x) and max(x) are the minimum and maximum values of that input data, and x' is the normalized data. Applying this function to all types of data (all variables) in the buckets provides normalized data suitable for use in training one or more neural networks in step 2714.

Time of day information can be encoded in order to be of a similar scale as other variables (e.g., between zero and one) and to capture the effect of nearby times of day one on another (i.e., setpoint variance between neighboring times of day may be lower than between two widely separated times of day). In some embodiments, the time of day is expressed through several sinusoid functions (similar to Fourier series):

$$\tau_{2i-1} = \sin\left(\frac{2\pi i \cdot t}{24}\right),$$
$$t = [0\,1\,2\,\ldots\,23];$$
$$\tau_{2i} = \cos\left(\frac{2\pi i \cdot t}{24}\right),$$
$$t = [0\,1\,2\,\ldots\,23],$$

where i=[1 2 3 . . . n] and n is the number of sine functions.

At step 2714, one or more neural networks is trained using the pre-processed, bucketed, normalized data. For example, step 2714 can include training a neural network that outputs predictions of user discomfort (user overrides, user setpoint changes, predicted $\Delta T_{sp}$) based on inputs such as indoor air temperature, outdoor air temperature, relative humidity, and time of day. The neural network trained in step 2714 can be configured as shown in FIG. 12, FIG. 13, or FIG. 32, for example.

Training the neural network in step 2714 includes finding parameters (weights, etc.) for the neural network that minimize an output error for the neural network, for example to minimize an error between predicted setpoint changes $\overline{\Delta T_{sp}}$ and historical setpoint changes $\Delta T_{sp}$ from the pre-processed, bucketed, and normalized historical or simulated data. The error can be defined as the mean squared error loss between the predicted result and the real output value (i.e., the value shown in the historical data). This error can be minimized by solving a regression problem.

A gradient descent approach can be used in step 2714 to minimize the error to train the neural network. In such examples, gradient descent in step 2714 starts with a random guess at the parameters, determines which direction the mean squared error loss function decreases the fastest and updates the weights slightly in that direction. That process is repeated over and over until the global minimum loss is reached. The amount by which the parameters are moved in the selected direction is determined by a hyperparameter called a learning rate, which is preferably set high enough to reach the optimal result in a relatively short amount of time while also being high enough to ensure that the optimal value is reachable. Variations on this approach may also be used in some embodiments, for example one or more of mini-batch gradient descent, stochastic gradient descent, momentum-based gradient descent, root mean square propagation (RMSProp), and adaptive moment estimation (ADAM).

Figure 29:
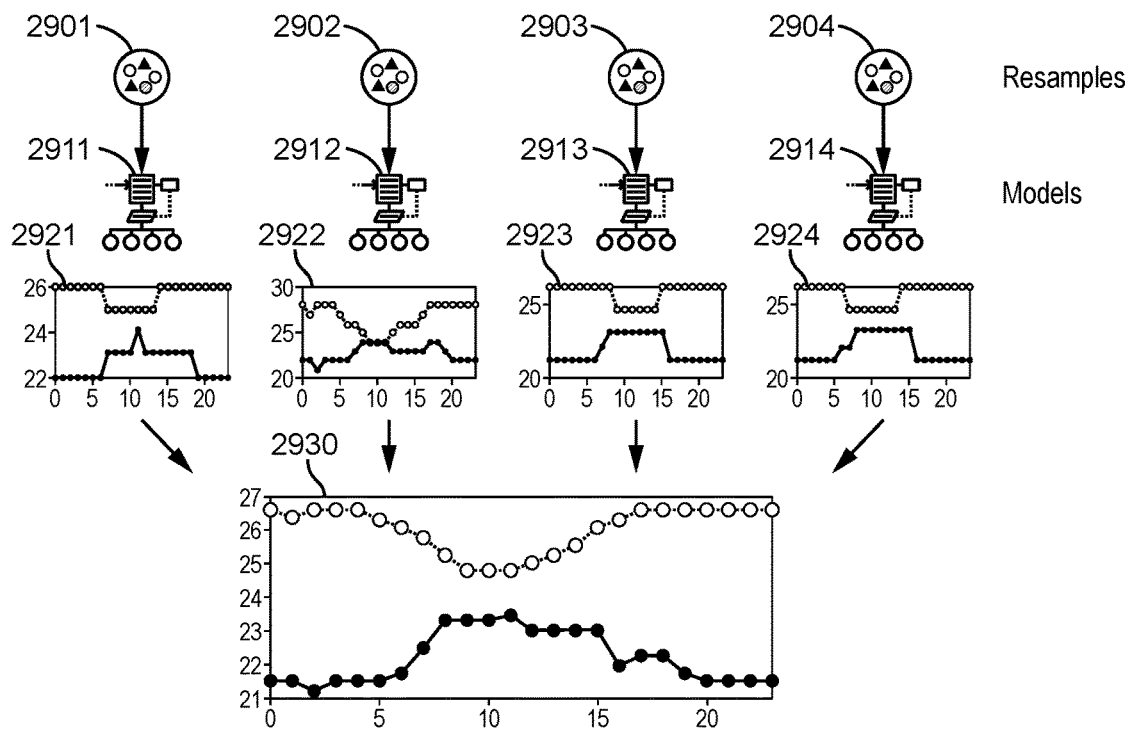
FIG. 29 is an illustration of use of multiple neural networks in some examples of the process of FIG. 27, according to some embodiments.

In some embodiments, multiple neural networks are trained in step 2714. For example, a first neural network can be trained using the most recent set of data, a second neural network can be trained using the next chronological set of data, a third neural network can be trained using even older set of data, etc. This can provide multiple trained neural networks that can be used in later steps of process 2700 to balance adaptability with long term consistency, reliability, accuracy, etc., for example as illustrated in FIG. 29 and described in detail with reference thereto.

At step 2716, the neural networks are used to generate a discomfort tolerance. The discomfort tolerance can be generated as described above with reference to FIGS. 18-26 in various embodiments, for example following process 2200. The discomfort tolerance can be generated by execution of step 2716 in response to completion of training or retraining of the one or more neural networks during the offline sub-process 2702. For example, offline sub-process 2702 can be executed periodically (e.g., daily, weekly, monthly, etc.) and the discomfort tolerance can be updated at the same frequency as the neural network.

Offline sub-process 2702 thus outputs one or more trained neural networks that predict user discomfort as a function of inputs such as indoor air temperature, outdoor air temperature, relative humidity, and/or time of day, for example, and a discomfort tolerance. The offline sub-process 2702 can be executed periodically (e.g., daily, weekly, monthly, etc.) on a set schedule. In some embodiments, the offline sub-process 2702 can be executed in response to a determination that a threshold amount of new data has been collected (e.g., a threshold number of user overrides occurred, a threshold percentage of data in the buckets was replaced, etc.). The online sub-process 2704 receives the trained neural network(s) and the discomfort tolerance from the offline sub-process 2704, and runs at a higher frequency than the offline sub-process 2702 (e.g., every 15 minutes, hourly, daily, etc.) to provide the steps described in the following passages.

At step 2718, the online sub-process 2704 includes receiving data of current and/or forecast conditions for a building. For example, step 2718 may include receiving a forecast of outdoor air temperatures from a weather service for an upcoming hour, several hours, or day, etc., for example over an optimization period. As another example, step 2718 may include receiving a current measurement of the indoor air temperature and/or relative humidity in a space. Step 2718 can also include determining a time of day for which the online sub-process 2704 is to be performed. In some embodiments, other inputs can also be determined, for example a day type (e.g., business day, weekend day, etc.), occupancy status, building schedule, or other input used by neural network in the various embodiments described herein.

At step 2720, the data of current and/or forecast conditions are normalized. The values may be formalized in the same manner described above for step 2712 to provide consistency with the scaling used to train the neural network. For example, a similar formula may be applied to scale based on the range of values for a given variable, for example using the same ranges as in step 2712 to provide consistency of the normalization process.

At step 2722, the normalized data of current and/or forecast conditions are applied as inputs to the neural network. Step 2722 can include applying different values as inputs to the neural network(s) in an iterative, for example to provide step 2724. In step 2724, the neural network(s) are used with the discomfort tolerance to define bounds for a constraint on a building variable. For example, step 2724 can be executed similarly to steps 1802-1806 of process 1800 and/or steps 2002-2008 (and optionally step 2010) of process 2000. Because step 2724 can be based on the current and/or forecast conditions (e.g., a weather forecast indicating outdoor air temperature) the constraint defined in step 2724 is customized for a particular time period and is based on predicted occupant discomfort given various factors occurring or expected to occur during that time period. The constraint can vary over time, for example defined at 15 minute intervals, hour intervals, etc.

At step 2726, equipment control is optimized subject to the constraint. For example, a predictive cost function can be optimized (for example as described above with reference to predictive controller 610) subject to the constraint defined by step 2724. Step 2726 can include determining equipment setpoints, control signals, schedule, loads, etc. in various embodiments which minimize energy or other resource consumption (or a cost of purchasing said energy or other resources) over a time period without violating the constraint defined in step 2724, for example. Step 2726 includes operating the equipment in accordance with the output of such an optimization to provide real-world, physical operation of equipment (e.g., HVAC equipment, central plant equipment) as the result of the online sub-process 2704.

Referring now to FIG. 29, an illustration of example embodiment of process 2700 using multiple neural networks is shown, according to an exemplary embodiment. In the example of FIG. 29, four neural networks are used. In particular, four sets of data, shown as first sample 2901, second sample 2902, third sample 2903, and fourth sample 2904 are shown. First sample 2901 may include the most recent data recorded from operation of a building, second sample 2902 may include a next set of data (i.e., slightly older data), third sample 2903 may include the even older data, and the fourth sample 2904 may include the oldest data. For example, each set of data may include one month worth of data, such that, in one illustrative example, first sample 2901 corresponds to April, second sample 2902 corresponds to March, third sample 2903 corresponds to February, and fourth sample 2904 corresponds to January. Various other distinctions between the samples 2901-2904 can be used in various embodiments (e.g., seasonal, etc.).

FIG. 29 illustrates that the four different samples 2901-2904 are used to train four different neural network models, in particular a first neural network model 2911 based on the first sample 2901, a second neural network model 2912 based on the second sample 2912, a third neural network model 2913 based on the third sample 2903, and a fourth neural network model 2914 based on the fourth sample 2904. The underlying neural networks may have the same structure (same inputs, same layers, same outputs) but different parameters/weights resulting from differences between data in the samples 2901-2904. Four distinct discomfort tolerances may also be determined using the four neural network models 2911-2914.

FIG. 29 illustrates that the four neural network models 2911-2914 can then be used to separately determine temperature constraints over the same time period (e.g., one day), for example using the online sub-process 2704 of FIG. 27. In particular, FIG. 29 shows a first set of constraints 2921 generated using the first neural network model 2911, a second set of constraints 2922 generated using the second neural network model 2912, a third set of constraints 2923 generated using the third neural network model 2913, and a fourth set of constraints 2924 generated using the fourth neural network model 2914. As illustrated in FIG. 29, differences between the data in the four samples 2901-2904 cause differences in the neural network models 2911-2914 which results in differences in the temperature constraints 2921-2924.

FIG. 29 also illustrates that the four sets of temperature constraints 2921-2924 can then be combined to provide a final set of temperature constraints 2930 for a time period. For example, an average or weighted average four sets of temperature constraints 2921-2924 can be used to define the final set of temperature constraints 2930. In some embodiments, a weighted averages is used so that the first set of constraints 2921 (reflecting the most recent data samples 2901) has the most influence on the final constraints 2930, with progressively less influence provided by the second, third, and fourth sets of constrains 2922-2924. This approach can provide inertia to change, for example to prevent over-reaction to the most recent data, while also allowing for adaptation over time.

Referring now to FIG. 30, and a series of graphs illustrating the beneficial effects of the bucketing approach of step 2710 is shown, according to an example experiment. FIG. 30 show a first graph 3000 which shows simulated or actual occupant discomfort bounds over a time period (30 months in the example shown). The first graph 3000 indicates values that were used to generate simulated training data for the example simulated experiment illustrated by FIG. 30. In particular, in this experiment, the bounds were edited after one year to a significantly lower preferred temperature range, in order to test the ability of the processes herein (e.g., process 2700) to adapt to changes in occupant preferences. Scenarios which may result in such a change in preferences include change in the individuals using a space (e.g., new occupants of an apartment, firing/retirement/hiring/etc. of employees), and change in use of a space (e.g., an office now used as a fitness studio, a conference room now used as a café, etc.), a change in dress-code for occupants of a space, etc.

FIG. 30 includes a second graph 3002 which illustrates the monthly average temperature bounds (constraints) output by process 2700 in an example where the bucketing of step 2710 is omitted. In this example, all historical data is retained and used to train the neural network. As shown in the second graph 3002, using all historical data slows adaptation to the change in user preferences, and appears to hold the temperature constraints above the occupants preferred temperature level for the second half of the experiment. Omission of the bucketing step 2710 may thus results in poor performance and uncomfortable occupants.

FIG. 30 also includes a third graph 3004 which illustrates the monthly average temperature bounds output by process 2700 in an example where the bucketing step 2710 is executed. As shown in the third graph 3004, the temperature bounds output by the process 2700 are able to automatically adapt to the change in occupant preferences. A lag time exists as new data is collected and replaces the original data in the buckets, but the temperature bounds quickly adjust into a range where occupant discomfort is limited or avoided. FIG. 30 thus illustrates an advantage of the bucketing approach of step 2710.

Figure 31:
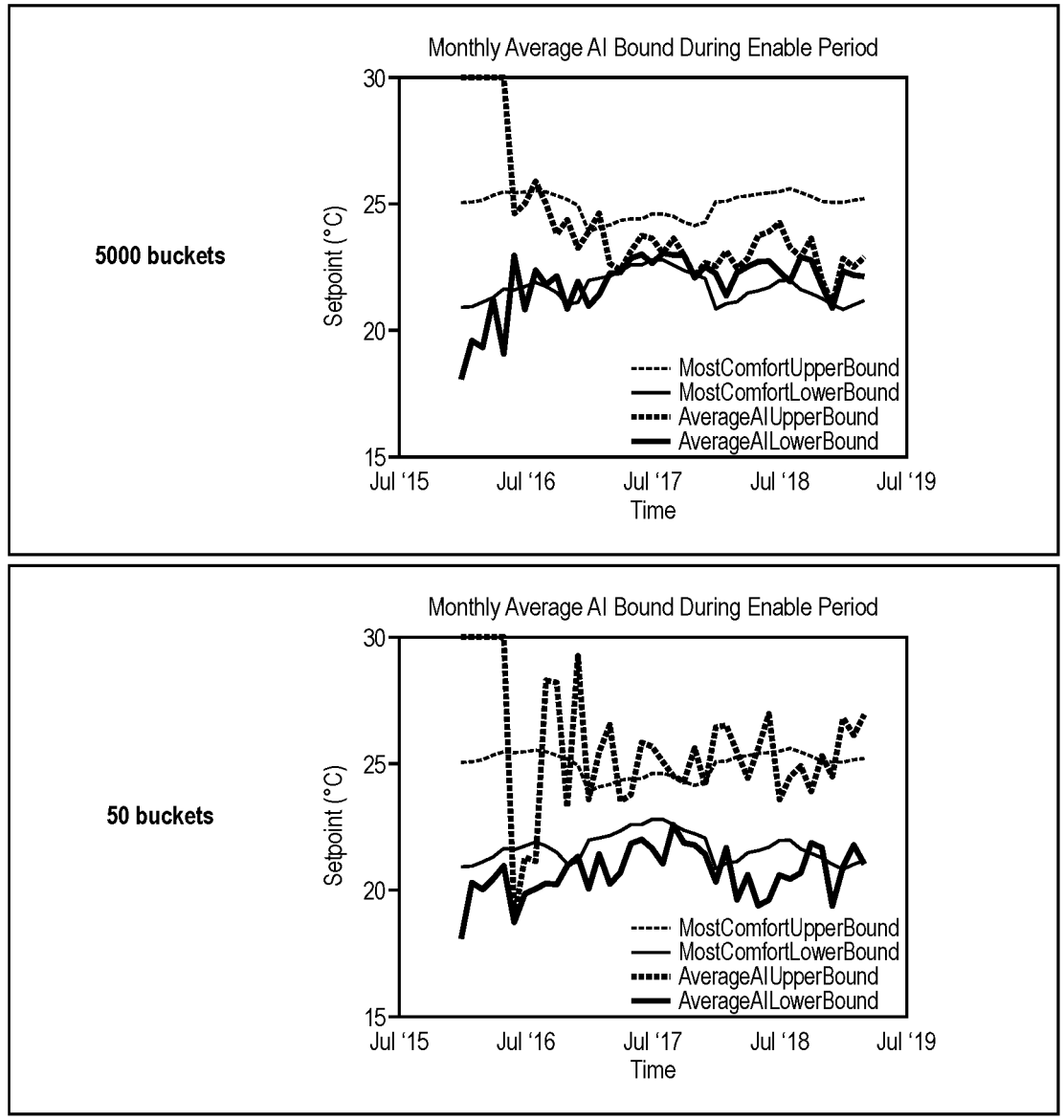
FIG. 31 shows additional example results of the data bucketing step of the process of FIG. 27, according to some embodiments.

Referring now to FIG. 31, a set of graphs illustrating effects of the number of buckets used in step 2710 is shown, according to an example experiment. FIG. 31 shows a first graph 3101 showing simulated occupant comfort bounds and constraints output by the process 2700 in an example where 5000 buckets are used. FIG. 31 also shows a second graph 3102 showing the same simulated occupant comfort bounds and constraints output by the process 2702 in an example where 50 buckets are used. The first graph 3101 illustrates that using a large number of buckets can cause the upper and lower bounds of the constraints to converge quickly together, resulting in an overly-narrow and restrictive constraint which may reduce the ability of step 2726 to reduce energy consumption or costs. The second graph 3102 shows that using less buckets can provide wider constraints, but which may be more uneven (noisy) over time. FIG. 31 thus shows that selection of the number and size of the data buckets can have a significant impact on the performance of the systems and processes described herein.

Referring now to FIG. 32, a diagram of a neural network 3200 is shown, according to an exemplary embodiment. The neural network 3200 includes four inputs 3202, in particular indoor air temperature $T_{ia}$, indoor relative humidity $RH_{ia}$, outdoor air temperature $T_{oa}$, and time of day (indicated by $\tau_1$-$\tau_{2m}$). Time of day is encoded using the functions:

$$\tau_{2i-1} = \sin\left(\frac{2\pi i \cdot t}{24}\right),$$
$$t = [0\,1\,2 \ldots 23];$$
$$\tau_{2i} = \cos\left(\frac{2\pi i \cdot t}{24}\right),$$
$$t = [0\,1\,2 \ldots 23]$$

where i=[1 2 3 . . . n]. n is the number of sine functions. The neural network 3200 also includes a first hidden layer 3204 and a second hidden layer 3206, both of which have six nodes. The neural network 3200 also has one output 3208 which outputs a value of a predicted setpoint change $\Delta T_{sp}$. The neural network 3200 can be trained and used as described in detail above, for example in process 1800, 2000, or 2700.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for controlling HVAC equipment for a building, comprising:
generating, based on historical building data, a discomfort tolerance defining an acceptable amount of occupant discomfort;
determining a first value of an environmental condition by predicting that the occupant discomfort would exceed the discomfort tolerance in a first direction at the first value of the environmental condition;
determining a second value of the environmental condition by predicting that the occupant discomfort would exceed the discomfort tolerance in a second direction opposite the first direction at the second value of the environmental condition; and
operating the HVAC equipment to maintain the environmental condition between the first value and the second value.

2. The method of claim 1, further comprising widening or narrowing the discomfort tolerance based on a number of user overrides of a setpoint for the environmental condition during the controlling the HVAC equipment.

3. The method of claim 1, wherein the environmental condition is indoor air temperature, the first value of the environmental condition is a first indoor air temperature, and the second value of the environmental condition is a second indoor air temperature, and wherein the determining steps are performed using a neural network trained to predict the occupant discomfort for a plurality of indoor air temperatures comprising the first indoor air temperature and the second indoor air temperature.

4. The method of claim 1, wherein the occupant discomfort is quantified as an expected size of a setpoint change by an occupant.

5. The method of claim 1, wherein generating the discomfort tolerance comprises determining that a preset percentage of setpoint changes occur outside of the discomfort tolerance.

6. The method of claim 1, wherein generating the discomfort tolerance comprises using a neural network model trained using the historical building data to determine a maximum acceptable predicted setpoint increase and a maximum acceptable predicted setpoint decrease defining the discomfort tolerance.

7. The method of claim 1, further comprising:
collecting new building data while controlling the HVAC equipment; and
updating the discomfort tolerance based on a combination of the new building data and the historical building data.

8. The method of claim 7, comprising aggregating the combination of the new building data and the historical building data using a binning process.

9. The method of claim 8, wherein the binning process comprises:
defining a plurality of bins configured to retain a fixed number of data sets;
sorting the historical building data into the plurality of bins;
sorting the new building data into the plurality of bins; and
discarding a subset of the historical building data from a bin of the plurality of bins in response to exceeding the fixed number of data sets for the bin.

10. The method of claim 8, wherein the binning process comprises sorting data sets into a plurality of bins based on measurements of the environmental condition indicated in the data sets.

11. A building system, comprising:
HVAC equipment operable to affect one or more environmental conditions; and
circuitry configured to:
generate, based on historical building data, a discomfort tolerance defining an acceptable amount of occupant discomfort and satisfying or optimizing a predefined criterion;
determine a region of values of the one or more environmental conditions by predicting that the occupant discomfort would be within the discomfort tolerance when the one or more environmental conditions are within the region; and
control the HVAC equipment to maintain the one or more environmental conditions within the region.

12. The building system of claim 11, wherein the circuitry is further configured to widen or narrow the discomfort tolerance based on a number of user overrides of one or more setpoint for the one or more environmental conditions during the control of the HVAC equipment.

13. The building system of claim 11, wherein the circuitry is configured to determine the region using a neural network trained to quantify the occupant discomfort across a test region of values of the one or more environmental conditions, the test region comprising the region.

14. The building system of claim 11, wherein the occupant discomfort is quantified as an expected size of a setpoint change by an occupant.

15. The building system of claim 11, wherein the circuitry is configured to generate the discomfort tolerance by determining that a preset percentage of occupant overrides occur outside of the discomfort tolerance.

16. The building system of claim 11, wherein the circuitry is configured to generate the discomfort tolerance using a neural network model trained using the historical building data to determine a maximum acceptable predicted setpoint increase and a maximum acceptable predicted setpoint decrease defining the discomfort tolerance.

17. The building system of claim 11, wherein the circuitry is further configured to:
collect new building data during the control of the HVAC equipment; and
update the discomfort tolerance based on a combination of the new building data and the historical building data.

18. The building system of claim 17, wherein the circuitry is further configured to aggregate the combination of the new building data and the historical building data using a binning process.

19. The building system of claim 18, wherein the binning process comprises sorting data sets into a plurality of bins based on measurements of the one or more environmental conditions indicated in the data sets.

20. One or more non-transitory computer-readable media storing program instructions that, when executed by one or more processors, cause the one or more processors to perform operations comprising:
generating, based on historical building data, a discomfort tolerance defining an acceptable amount of occupant discomfort;
determining a first value of an environmental condition by predicting that the occupant discomfort would cross a first boundary of the discomfort tolerance at the first value of the environmental condition;
determining a second value of the environmental condition by predicting that the occupant discomfort would cross a second boundary of the discomfort tolerance at the second value of the environmental condition;
operating HVAC equipment to maintain the environmental condition between the first value and the second value.

21. The one or more non-transitory computer-readable media of claim 20, wherein the environmental condition is indoor air temperature, the first value of the environmental condition is a first indoor air temperature, and the second value of the environmental condition is a second indoor air temperature, and the determining operations are performed using a neural network trained to predict the occupant discomfort across a plurality of indoor air temperatures comprising the first value of the indoor air temperature and the second value of the indoor air temperature.

22. The one or more non-transitory computer-readable media of claim 20, wherein generating the discomfort tolerance comprises determining that a preset percentage of setpoint changes occur outside of the discomfort threshold.

* * * * *